United States Patent
Park et al.

(10) Patent No.: US 11,493,726 B2
(45) Date of Patent: Nov. 8, 2022

(54) LENS DRIVING DEVICE, AND CAMERA MODULE AND OPTICAL DEVICE COMPRISING SAME

(71) Applicant: LG INNOTEK CO., LTD., Seoul (KR)

(72) Inventors: Sang Ok Park, Seoul (KR); Sung Guk Lee, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 289 days.

(21) Appl. No.: 16/636,529

(22) PCT Filed: Jul. 30, 2018

(86) PCT No.: PCT/KR2018/008603
§ 371 (c)(1),
(2) Date: Feb. 4, 2020

(87) PCT Pub. No.: WO2019/027199
PCT Pub. Date: Feb. 7, 2019

(65) Prior Publication Data
US 2021/0181455 A1 Jun. 17, 2021

(30) Foreign Application Priority Data

Aug. 4, 2017 (KR) .................. 10-2017-0098882
Aug. 28, 2017 (KR) .................. 10-2017-0108542
Jun. 26, 2018 (KR) .................. 10-2018-0073242

(51) Int. Cl.
*G02B 7/02* (2021.01)
*G02B 7/09* (2021.01)
(Continued)

(52) U.S. Cl.
CPC .............. *G02B 7/09* (2013.01); *G02B 7/021* (2013.01); *G03B 5/02* (2013.01); *G03B 17/12* (2013.01)

(58) Field of Classification Search
CPC . G02B 7/09; G02B 7/021; G03B 5/02; G03B 17/12
(Continued)

(56) References Cited

U.S. PATENT DOCUMENTS 10,338,341 B2 7/2019 Osaka et al.
2008/0304154 A1 12/2008 Lee
(Continued)

FOREIGN PATENT DOCUMENTS

CN 104142553 A 11/2014
CN 104216199 A 12/2014
(Continued)

OTHER PUBLICATIONS

International Search Report, issued in PCT/KR2018/008603, dated Nov. 9, 2018.

*Primary Examiner* — William Choi
(74) *Attorney, Agent, or Firm* — Birch, Stewart, Kolasch & Birch, LLP

(57) ABSTRACT

An embodiment comprises: a housing; a bobbin arranged inside the housing; a first coil arranged on the bobbin; first magnets arranged on first to fourth corner portions of the housing, respectively; a first circuit board which is arranged on a first side portion of the housing, and which comprises a first terminal, a second terminal, a third terminal, and a fourth terminal; a first position sensor arranged on the first circuit board and electrically connected to the first to fourth terminals; a first upper elastic unit arranged on the first corner portion of the housing; a second upper elastic unit arranged on the second corner portion of the housing; a third upper elastic unit arranged on the third corner portion of the housing; and a fourth upper elastic unit arranged on the fourth corner portion of the housing. One end of the first upper elastic unit extends from the first corner portion to the first side portion of the housing and is coupled to the first
(Continued)

terminal. One end of the second upper elastic unit extends from the second corner portion to the first side portion of the housing and is coupled to the second terminal. One end of the third upper elastic unit extends from the third corner portion to the first side portion of the housing and is coupled to the third terminal. One end of the fourth upper elastic unit extends from the fourth corner portion to the first side portion of the housing and is coupled to the fourth terminal.

23 Claims, 55 Drawing Sheets

(51) Int. Cl.
 *G03B 5/02* (2021.01)
 *G03B 17/12* (2021.01)
(58) Field of Classification Search
 USPC .................................. 359/811, 819, 822–824
 See application file for complete search history.

(56) References Cited

U.S. PATENT DOCUMENTS

| | | |
|---|---|---|
| 2014/0355120 A1 | 12/2014 | Yeo |
| 2015/0331251 A1 | 11/2015 | Hu et al. |
| 2016/0241787 A1 | 8/2016 | Sekimoto |
| 2016/0274375 A1 | 9/2016 | Park et al. |
| 2016/0277684 A1 | 9/2016 | Park et al. |
| 2016/0316121 A1 | 10/2016 | Park |
| 2017/0192195 A1 | 7/2017 | Murakami |
| 2017/0235094 A1 | 8/2017 | Osaka et al. |
| 2018/0011284 A1 | 1/2018 | Park et al. |
| 2018/0321459 A1 | 11/2018 | Kim et al. |

FOREIGN PATENT DOCUMENTS

| | | | |
|---|---|---|---|
| CN | 104635401 A | | 5/2015 |
| CN | 105593758 A | | 5/2016 |
| CN | 106067939 A | | 11/2016 |
| CN | 106444218 A | | 2/2017 |
| CN | 106537213 A | | 3/2017 |
| CN | 112346197 A | | 2/2021 |
| CN | 112630925 A | | 4/2021 |
| EP | 3 070 514 A1 | | 9/2016 |
| JP | 2012-5957 A | | 1/2012 |
| JP | 2016-38444 A | | 3/2016 |
| KR | 10-2010-0095760 A | | 9/2010 |
| KR | 10-2013-0015666 A | | 2/2013 |
| KR | 10-2015-0080710 A | | 7/2015 |
| KR | 10-2015-0097998 A | | 8/2015 |
| KR | 10-1552969 B1 | | 9/2015 |
| KR | 10-2015-0128262 A | | 11/2015 |
| KR | 10-2015-0142421 A | | 12/2015 |
| KR | 10-2016-0075100 A | | 6/2016 |
| KR | 20160075100 A | * | 6/2016 |
| KR | 10-2016-0095803 A | | 8/2016 |
| KR | 10-2016-0126587 A | | 11/2016 |
| KR | 10-2016-0139589 A | | 12/2016 |
| KR | 10-2017-0025658 A | | 3/2017 |
| KR | 10-2017-0040133 A | | 4/2017 |
| KR | 10-2017-0050946 A | | 5/2017 |
| KR | 10-2019-0023185 A | | 3/2019 |
| WO | WO 2015/045527 A1 | | 4/2015 |
| WO | WO 2016/099051 A1 | | 6/2016 |
| WO | WO 2017/090940 A1 | | 6/2017 |

* cited by examiner

LENS DRIVING DEVICE, AND CAMERA MODULE AND OPTICAL DEVICE COMPRISING SAME

CROSS REFERENCE TO RELATED APPLICATIONS

This application is the National Phase of PCT International Application No. PCT/KR2018/008603, filed on Jul. 30, 2018, which claims priority under 35 U.S.C. 119(a) to Patent Application No. 10-2017-0098882, filed in the Republic of Korea on Aug. 4, 2017, Patent Application No. 10-2017-0108542, filed in the Republic of Korea on Aug. 28, 2017, and Patent Application No. 10-2018-0073242, filed in the Republic of Korea on Jun. 26, 2018, all of which are hereby expressly incorporated by reference into the present application.

TECHNICAL FIELD

Embodiments relate to a lens moving apparatus, and a camera module and optical instrument including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. A camera for mobile phones is on a trend of increased resolution and miniaturization. As a result, an actuator has also been miniaturized, increased in diameter, and increased in functionality. In order to realize a high-resolution camera for mobile phones, improvement in performance of the camera for mobile phones and additional functions thereof, such as autofocus, handshake compensation, and zooming, are required.

DISCLOSURE

Technical Problem

Embodiments provide a lens moving apparatus capable of reducing magnetic field interference, reducing size, reducing current consumption, and improving sensitivity in OIS driving, and a camera module and optical instrument including the same.

In addition, embodiments provide a lens moving apparatus capable of reducing resistance of a path along which a power signal is provided to a first position sensor, reducing power consumption, and improving solderability between a circuit board, at which the first position sensor is disposed, and upper elastic units, and a camera module and an optical instrument including the same.

Technical Solution

In one embodiment, a lens moving apparatus includes a housing including a first side portion, a second side portion, a third side portion, a fourth side portion, a first corner located between the first side portion and the second side portion, a second corner located between the first side portion and the fourth side portion, a third corner located between the third side portion and the fourth side portion, and a fourth corner located between the second side portion and the third side portion, a bobbin disposed in the housing, a first coil disposed at the bobbin, first magnets disposed at the first to fourth corners of the housing, a first circuit board disposed at the first side portion of the housing, the first circuit board including a first terminal, a second terminal, a third terminal, and a fourth terminal, a first position sensor disposed at the first circuit board, the first position sensor being connected to the first to fourth terminals, a first upper elastic unit disposed at the first corner, a second upper elastic unit disposed at the second corner, a third upper elastic unit disposed at the third corner, and a fourth upper elastic unit disposed at the fourth corner, wherein one end of the first upper elastic unit extends from the first corner to the first side portion so as to be coupled to the first terminal, one end of the second upper elastic unit extends from the second corner to the first side portion so as to be coupled to the second terminal, one end of the third upper elastic unit extends from the third corner to the first side portion so as to be coupled to the third terminal, and one end of the fourth upper elastic unit extends from the fourth corner to the first side portion so as to be coupled to the fourth terminal.

The lens moving apparatus may further include a first lower elastic unit and a second lower elastic unit coupled to a lower portion of the housing and connected to the first coil, wherein the first circuit board may further include a fifth terminal and a sixth terminal coupled respectively to the first lower elastic unit and the second lower elastic unit.

The lens moving apparatus may further include a second circuit board disposed under the first and second lower elastic units, a first supporting member disposed at the first corner to interconnect the first upper elastic unit and the second circuit board, a second supporting member disposed at the second corner to interconnect the second upper elastic unit and the second circuit board, a third supporting member disposed at the third corner to interconnect the third upper elastic unit and the second circuit board, and a fourth supporting member disposed at the fourth corner to interconnect the fourth upper elastic unit and the second circuit board.

The housing may be provided in the first side portion thereof with a first recess in which the first circuit board is disposed and a second recess in which the first position sensor is disposed.

Each of the first to fourth upper elastic units may include a first outer frame including a first coupling portion coupled to a corresponding one of the first to fourth supporting members, a second coupling portion coupled to a corresponding one of the first to fourth corners, a connection portion configured to interconnect the first coupling portion and the second coupling portion, and an extension portion extending from the second coupling portion to a corresponding one of the first to fourth terminals.

Alternatively, the lens moving apparatus may further include a first supporting member disposed at the first corner of the housing, the first supporting member being connected to the first terminal via the first upper elastic unit, and a second supporting member disposed at the second corner of the housing, the second supporting member being connected to the second terminal via the second upper elastic unit, wherein the first terminal and the second terminal of the first circuit board may be terminals configured to provide a power signal of the first position sensor, and the first terminal of the first circuit board may be adjacent to the first corner while the second terminal may be adjacent to the second corner.

In addition, the lens moving apparatus may further include a third supporting member disposed at the third corner of the housing, the third supporting member being connected to the third terminal of the first circuit board, and a fourth supporting member disposed at the fourth corner of the housing, the fourth supporting member being connected to the fourth terminal of the first circuit board, wherein the third terminal and the fourth terminal of the first circuit board may be disposed between the first terminal and the second terminal of the first circuit board, and the third terminal of the first circuit board may be a terminal configured to provide a clock signal while the fourth terminal of the first circuit board may be a terminal configured to provide a data signal.

The first circuit board may include a body portion at which the first terminal and the second terminals are disposed and an extension portion extending downwards from the body portion, and the first terminal and the second terminals may be disposed adjacent to opposite ends of the body portion.

The first position sensor may be disposed at a first surface of the first circuit board facing the bobbin while the first to fourth terminals may be disposed at a second surface of the first circuit board opposite the first surface of the first circuit board, the first circuit board may include a first recess formed between the second terminal and the fourth terminal and a second recess formed between the first terminal and the third terminal, a portion of the third upper elastic unit may be disposed in the first recess of the first circuit board, an end of the portion of the third upper elastic unit being coupled to the third terminal of the first circuit board, and a portion of the fourth upper elastic unit may be disposed in the second recess of the first circuit board, an end of the portion of the fourth upper elastic unit being coupled to the fourth terminal of the first circuit board.

The first and second upper elastic units may be spaced apart from the bobbin.

Advantageous Effects

According to embodiments, it is possible to reduce magnetic field interference, to reduce size, to reduce current consumption, and to improve sensitivity in OIS driving.

In addition, according to embodiments, it is possible to reduce resistance of a path along which a power signal is provided to a first position sensor, to reduce power consumption, and to improve solderability between a circuit board, at which the first position sensor is disposed, and upper elastic units.

BEST MODE

Figure 1:
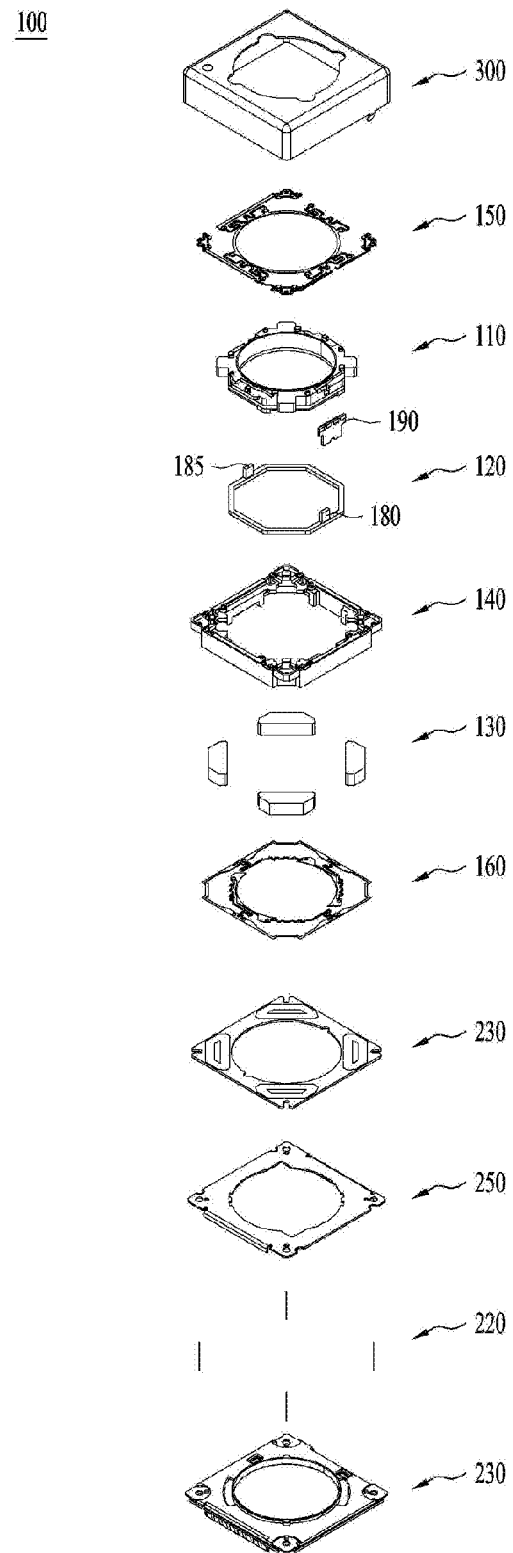
FIG. 1 is an exploded perspective view of a lens moving apparatus according to an embodiment.

Reference will now be made in detail to embodiments, examples of which are illustrated in the accompanying drawings. In the following description of the embodiments, it will be understood that, when a layer (film), region, pattern, or structure is referred to as being "on" or "under" another layer (film), region, pattern, or structure, it can be "directly" on or under the other layer (film), region, pattern, or structure or can be "indirectly" formed such that an intervening element is also present. In addition, terms such as "on" or "under" should be understood on the basis of the drawings.

In the drawings, the sizes of respective elements are exaggerated, omitted, or schematically illustrated for convenience and clarity of description. Further, the sizes of the respective elements do not denote the actual sizes thereof. In addition, wherever possible, the same reference numbers will be used throughout the drawings to refer to the same or like parts.

Hereinafter, a lens moving apparatus according to an embodiment will be described with reference to the accompanying drawings. For convenience of description, the lens moving apparatus according to the embodiment will be described using a Cartesian coordinate system (x, y, z). However, the disclosure is not limited thereto. Other different coordinate systems may be used. In the drawings, an x axis and a y axis are directions perpendicular to a z axis, which is an optical-axis direction. The z-axis direction, which is the optical-axis direction, may be referred to as a "first direction," the x-axis direction may be referred to as a "second direction," and the y-axis direction may be referred to as a "third direction."

The lens moving apparatus according to the embodiment may perform an "autofocus function." Here, the autofocus function means a function of automatically focusing an image of a subject on the surface of an image sensor.

In addition, the lens moving apparatus according to the embodiment may perform a "handshake compensation function." Here, the handshake compensation function means a function of preventing the contour of a captured still image from being blurred due to vibration caused by handshake of a user when capturing the still image.

Figure 2:
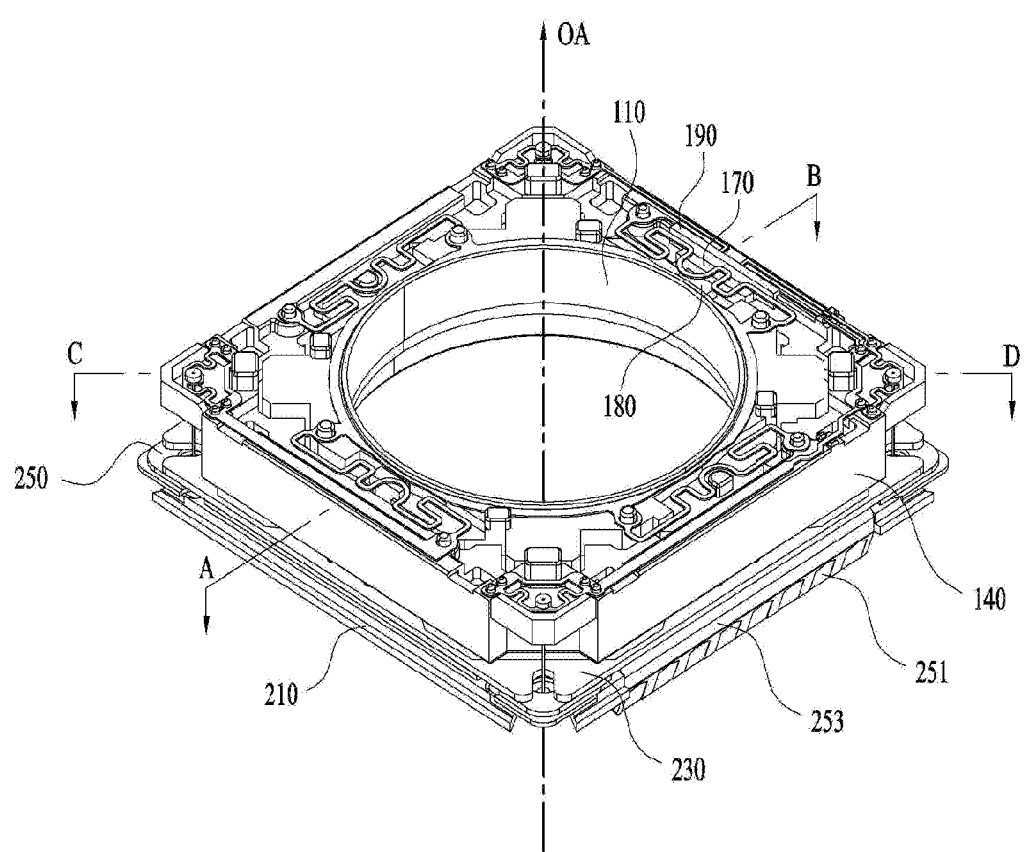
FIG. 2 is an assembled perspective view of the lens moving apparatus of FIG. 1 with a cover member removed.

FIG. 1 is an exploded perspective view of a lens moving apparatus 100 according to an embodiment, and FIG. 2 is an assembled perspective view of the lens moving apparatus 100 of FIG. 1 with a cover member 300 removed.

Referring to FIGS. 1 and 2, the lens moving apparatus 100 includes a bobbin 110, a first coil 120, a first magnet 130, a housing 140, an upper elastic member 150, a lower elastic member 160, a first position sensor 170, and a second magnet 180.

In order to perform a handshake compensation function, the lens moving apparatus 100 may further include a supporting member 220, a second coil 230, and a second position sensor 240.

In addition, the lens moving apparatus 100 may further include a third magnet 185, a circuit board 190, a base 210, a circuit board 250, and a cover member 300.

The cover member 300 receives the bobbin 110, the first coil 120, the first magnet 130, the housing 140, the upper elastic member 150, the lower elastic member 160, the first position sensor 170, the second magnet 180, the circuit board 190, the supporting member 220, the second coil 230, the second position sensor 240, and the circuit board 250 in a receiving space formed together with the base 210.

The cover member 300 may be formed in the shape of a box, the lower portion of which is open and which includes an upper plate and side plates. The lower portion of the cover member 300 may be coupled to the upper portion of the base 210. The shape of the upper plate of the cover member 300 may be polygonal, e.g. quadrangular or octagonal.

The cover member 300 may be provided in the upper plate thereof with an opening, through which a lens (not shown) coupled to the bobbin 110 is exposed to external light. The cover member 300 may be made of a nonmagnetic material, such as SUS, in order to prevent a phenomenon in which the first magnet 130 attracts the cover member. Alternatively, the cover member may be made of a magnetic material so as to perform the function of a yoke that increases electromagnetic force between the first coil 120 and the first magnet 130.

Next, the bobbin 110 will be described.

The bobbin 110 is disposed inside the housing 140, and may be moved in an optical-axis (OA) direction or a first direction (e.g. a Z-axis direction) as the result of electromagnetic interaction between the first coil 120 and the first magnet 130.

Figure 3:
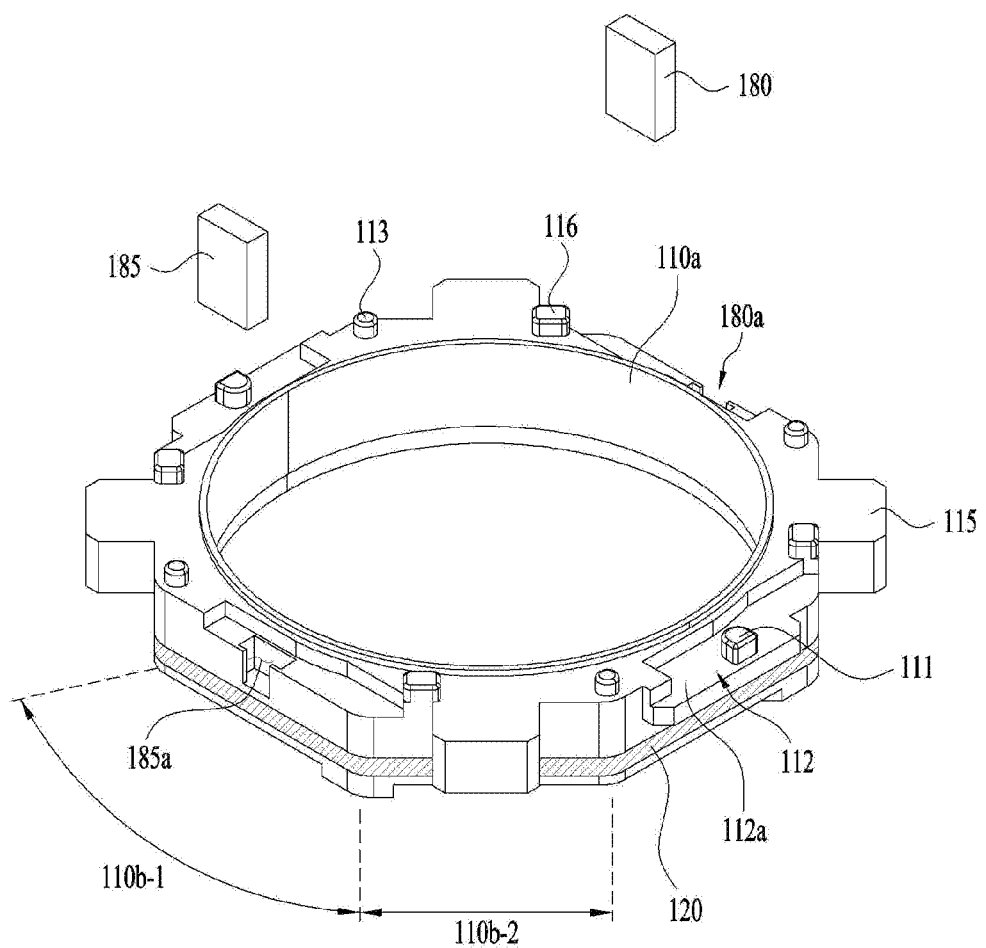
FIG. 3 is a perspective view of a bobbin, a first coil, a second magnet, and a third magnet shown in FIG. 1.

FIG. 3 is a perspective view of the bobbin 110, the first coil 120, the second magnet 180, and a third magnet 185 shown in FIG. 1.

Referring to FIG. 3, the bobbin 110 may have an opening, in which a lens or a lens barrel is mounted. For example, the shape of the opening of the bobbin 110 may be circular, oval, or polygonal. However, the disclosure is not limited thereto.

The lens may be directly mounted in the opening of the bobbin 110. However, the disclosure is not limited thereto. In another embodiment, a lens barrel, in which at least one lens is mounted or coupled, may be coupled or mounted in the opening of the bobbin 110. The lens or the lens barrel may be coupled to an inner circumferential surface 110a of the bobbin 110 in various manners.

The bobbin 110 may include first side portions 110b-1 spaced apart from each other and second side portions 110b-2 spaced apart from each other. Each of the second side portions 110b-2 may interconnect two adjacent first side portions. For example, the horizontal length or the transverse length of each of the first side portions 110b-1 of the bobbin 110 may be larger than the horizontal length of the transverse length of each of the second side portions 110b-2 thereof.

The bobbin 110 may be provided at the upper surface thereof with a guide portion 111 for guiding the installation position of the upper elastic member 150. For example, as shown in FIG. 3, the guide portion 111 of the bobbin 110 may protrude from the upper surface thereof in the first direction (e.g. the Z-axis direction) so as to guide a path along which a frame connection portion 153 of the upper elastic member 150 extends.

In addition, the bobbin 110 may be provided at the outer surface thereof with a protrusion 112 protruding in a second and/or third direction. An inner frame 151 of the upper elastic member 150 may be settled on the upper surface 112a of the protrusion 112 of the bobbin 110.

The protrusion 112 of the bobbin 110 may serve to prevent the bobbin 110 from directly colliding with the housing 140 even in the case in which the bobbin is moved beyond a predetermined range due to external impact when the bobbin 110 is moved in the optical-axis direction in order to perform autofocus.

The protrusion 112 of the bobbin 110 may correspond to a recess 25a of the housing 140, may be inserted or disposed in the recess 25a of the housing 140, and may inhibit or prevent the bobbin 110 from being rotated about the optical axis beyond a predetermined range.

The bobbin 110 may include a first stopper 116 protruding from the upper surface thereof. The stopper 116 may serve to prevent the upper surface of the bobbin 110 from directly colliding with the inside of an upper plate of the cover member 300 even in the case in which the bobbin 110 is moved beyond the predetermined range due to external impact when the bobbin 110 is moved in the first direction in order to perform an autofocus function.

The bobbin 110 may include a second stopper (not shown) protruding from the lower surface thereof, and the second stopper of the bobbin 110 may prevent the lower surface of the bobbin 110 from directly colliding with the base 210, the second coil 230, or the circuit board 250 even in the case in which the bobbin 110 is moved beyond the predetermined range due to external impact when the bobbin 110 is moved in the first direction in order to perform the autofocus function.

The bobbin 110 may include a first coupling portion 113 configured to be coupled and fixed to the upper elastic member 150. For example, in FIG. 3, the first coupling portion 113 is a protrusion. However, the disclosure is not limited thereto. In another embodiment, the first coupling portion 113 of the bobbin 110 may be a recess or a plane. In addition, the bobbin 110 may include a second coupling portion (not shown) configured to be coupled and fixed to the lower elastic member 160, and the second coupling portion of the bobbin 110 may be a protrusion, a recess, or a plane.

A coil settlement recess, in which the first coil 120 is settled, inserted, or disposed, may be provided in the outer circumferential surface of the bobbin 110. The coil settlement recess may be a recess formed inwardly from an outer surface 110b of each of the first and second side portions 110b-1 and 110b-2 of the bobbin 110, and may have a shape coinciding with the shape of the first coil 120 or a closed-loop shape (e.g. a ring shape).

A second magnet settlement recess 180a, in which the second magnet 180 is settled, inserted, fixed, or disposed, may be provided in the outer surface of the bobbin 110.

The second magnet settlement recess 180a of the bobbin 110 may have a structure recessed from the outer surface of the bobbin 110, and may have an opening formed in the upper surface of the bobbin 110. However, the disclosure is not limited thereto.

The second magnet settlement recess 180a of the bobbin 110 may be located at the upper side of the coil settlement recess, in which the first coil 120 is disposed, and may be spaced apart from the coil settlement recess. However, the disclosure is not limited thereto.

In addition, a third magnet settlement recess 185a, in which the third magnet 185 is settled, inserted, fixed, or disposed, may be provided in the upper surface of the bobbin 110.

The third magnet settlement recess 185a may have a structure recessed from the outer circumferential surface 110b of the bobbin 110, and may have an opening formed in the upper surface of the bobbin 110. However, the disclosure is not limited thereto.

The third magnet settlement recess 185a of the bobbin 110 may be located at the upper side of the coil settlement recess, in which the first coil 120 is disposed, and may be spaced apart from the coil settlement recess. However, the disclosure is not limited thereto.

The second magnet settlement recess 180a may be provided at one of the second side portions 110b-2 of the bobbin 110, and the third magnet settlement recess 185a may be provided at another of the second side portions 110b-2 of the bobbin 110.

The third magnet settlement recess 185a may be disposed so as to face the second magnet settlement recess 18. For example, the second and third magnet settlement recesses 180a and 185a may be provided in two facing second side portions of the bobbin 110.

The second magnet 180 and the third magnet 185 may be disposed or aligned in the bobbin 110 so as to face the first position sensor 170. As a result, the second magnet 180 and the third magnet 185 may be balanced in weight, whereby accuracy in autofocus (AF) driving may be improved.

The first coil 120 is disposed on the outer surface of the bobbin 110.

The first coil 120 may be disposed under the second and third magnets 180 and 185. However, the disclosure is not limited thereto. For example, the first coil 120 may not overlap the second and third magnets 180 and 185 in a second direction or a third direction. However, the disclosure is not limited thereto.

For example, the first coil 120 may be disposed in the coil settlement recess, the second magnet 180 may be inserted or disposed in the second magnet settlement recess 180a, and the third magnet 185 may be inserted or disposed in the third magnet settlement recess 185a.

Each of the second magnet 180 and the third magnet 185 disposed at the bobbin 110 may be spaced apart from the first coil 120 in the optical-axis (OA) direction. However, the disclosure is not limited thereto. In another embodiment, each of the second magnet 180 and the third magnet 185 disposed at the bobbin 110 may abut the first coil 120, or may overlap the first coil 120 in the second direction or the third direction.

The first coil 120 may wrap the outer surface of the bobbin 110 in a direction that rotates about the optical axis OA.

The first coil 120 may be directly wound around the outer surface of the bobbin 110. However, the disclosure is not limited thereto. In another embodiment, the first coil 120 may be wound around the bobbin 110 using a coil ring, or may be configured as an angular ring-shaped coil block.

When a driving signal (e.g. driving current) is supplied to the first coil 120, electromagnetic force may be formed through electromagnetic interaction between the first coil and the first magnet 130, and the bobbin 110 may be moved by the formed electromagnetic force in the optical-axis (OA) direction.

At an initial position of an AF operation unit, the bobbin 110 may be moved in an upward or downward direction, which is referred to as bidirectional driving of the AF operation unit. Alternatively, at the initial position of the AF operation unit, the bobbin 110 may be moved in the upward direction, which is referred to as unidirectional driving of the AF operation unit.

At the initial position of the AF operation unit, the first coil 120 may be disposed so as to correspond to the first magnet 130 disposed at the housing 140 or to be aligned with or overlap the first magnet in a direction perpendicular to the optical axis OA.

For example, the AF operation unit may include the bobbin 110 and components coupled to the bobbin 110 (e.g. the first coil 120 and the second and third magnets 180 and 185). The initial position of the AF operation unit may be the original position of the AF operation unit in the state in which no power is applied to the first coil 120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

The second magnet 180 may be disposed in the second magnet settlement recess 180a of the bobbin 110, and a portion of one surface of the second magnet 180 facing the first position sensor 170 may be exposed from the second magnet settlement recess 180a. However, the disclosure is not limited thereto.

For example, the interface between an N pole and an S pole of each of the second and third magnets 180 and 185 disposed at the bobbin 110 may be parallel to a direction perpendicular to the optical axis OA. For example, the surfaces of the second and third magnets 180 and 185 facing the first position sensor 170 may have an N pole and an S pole, respectively. However, the disclosure is not limited thereto.

For example, in another embodiment, the interface between the N pole and the S pole of each of the second and third magnets 180 and 185 disposed at the bobbin 110 may be parallel to the optical axis OA.

For example, each of the second and third magnets 180 and 185 may be a monopolar magnetized magnet or a bipolar magnetized magnet.

The second magnet 180 may be moved together with the bobbin 110 in the optical-axis direction, and the first position sensor 170 may sense the intensity of a magnetic field of the second magnet 180 moved in the optical-axis direction. Since the intensity of the magnetic field sensed by the first position sensor 170 varies depending on the displacement of the bobbin 110 in the optical-axis direction, the displacement of the bobbin 110 in the optical-axis direction may be sensed based on the intensity of the magnetic field sensed by the first position sensor 170.

Next, the housing 140 will be described.

The housing 140 receives the bobbin 110 therein, and supports the first magnet 130 and the circuit board 190, in which the first position sensor 170 is disposed.

The housing 140 may generally have a hollow pillar shape. For example, the housing 140 may have a polygonal (e.g. quadrangular or octagonal) or circular opening.

Figure 4:
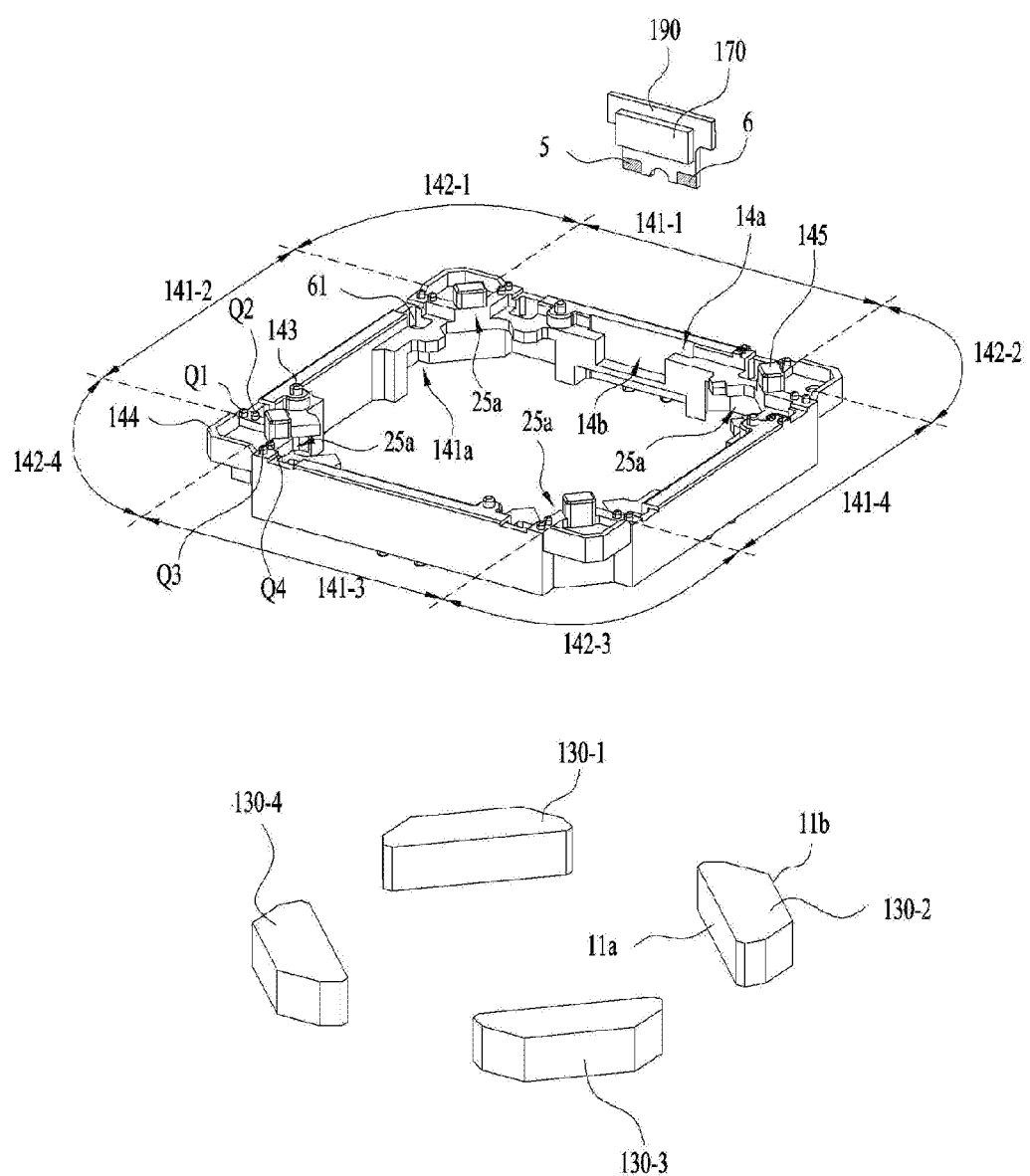
FIG. 4 is a separated perspective view of a housing, a first magnet, a circuit board, and a first position sensor shown in FIG. 1.
Figure 5:
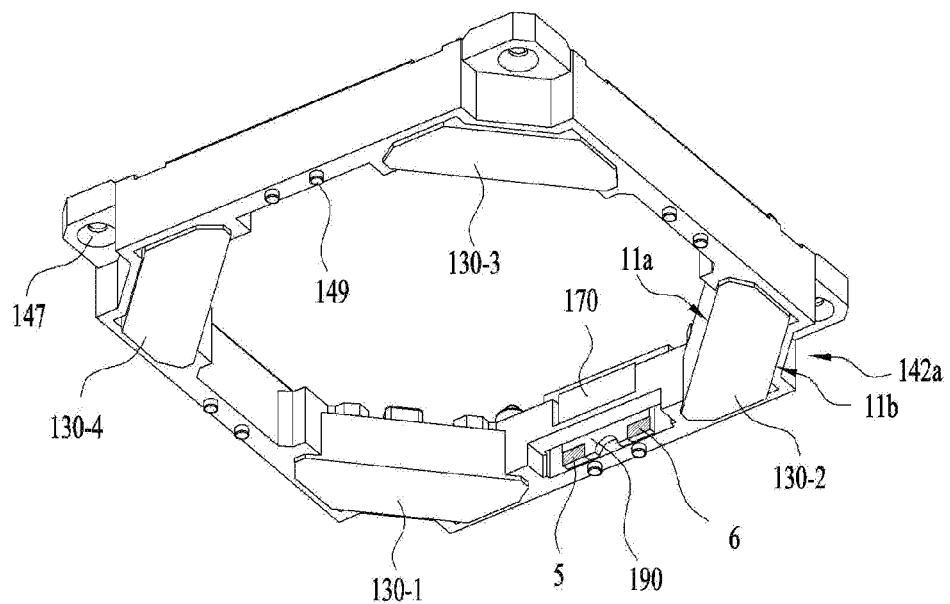
FIG. 5 is a coupled perspective view of the housing, the first magnet, the circuit board, and the first position sensor shown in FIG. 4.

FIG. 4 is a separated perspective view of the housing 140, the first magnet 130, the circuit board 190, and the first position sensor 170 shown in FIG. 1, and FIG. 5 is a coupled perspective view of the housing 140, the first magnet 130, the circuit board 190, and the first position sensor shown in FIG. 4.

Referring to FIGS. 4 and 5, the housing 140 may include a plurality of side portions 141-1 to 141-4 and a plurality of corners 142-1 to 142-4.

For example, the housing 140 may include first to fourth side portions 141-1 to 141-4 spaced apart from each other and first to fourth corners 142-1 to 142-4 spaced apart from each other.

Each of the corners 142-1 to 142-4 of the housing 140 may be disposed or located between two adjacent side portions 141-1 and 141-2, 141-2 and 141-3, 141-3 and 141-4, or 141-4 and 141-1, and may interconnect the side portions 141-1 to 141-4.

For example, the corners 142-1 to 142-4 may be located at the corner portions of the housing 140.

For example, the number of side portions of the housing 140 may be four, and the number of corners thereof may be four. However, the disclosure is not limited thereto.

The transverse length of each of the side portions 141-1 to 141-4 of the housing 140 may be larger than the transverse length of each of the corners 142-1 to 142-4 thereof. However, the disclosure is not limited thereto.

For example, the side portions 141-1 to 141-4 of the housing 140 may correspond to the first side portions 110b-1 of the bobbin 110, and the corners 142-1 to 142-4 of the housing 140 may correspond to the second side portions 110b-2 of the bobbin 110.

The first magnet 130 may be disposed or installed at each of the corners 142-1 to 142-4 of the housing 140.

Supporting members 220-1 to 220-4 may be disposed at the corners 142-1 to 142-4 of the housing 140.

In order to avoid interference with the protrusion 112 of the bobbin 110 when the bobbin 110 is moved in the optical-axis (OA) direction, the housing 140 may be provided, at a position thereof corresponding to the protrusion 112 of the bobbin 110, with a settlement recess 146.

The housing 140 may have a settlement portion 141a for receiving the first magnet 130, a mounting recess 14a for receiving the circuit board 190, and a mounting recess 14b for receiving the first position sensor 170.

The settlement portion 141a of the housing 140 may be provided at the lower end of at least one of the corners 142-1 to 142-4 of the housing 140.

For example, the settlement portion 141a of the housing 140 may be provided at the lower end of each of the four corners 142-1 to 142-4. Each of the first magnets 130-1 to 130-4 may be inserted into and fixed to a corresponding one of the settlement portions 141a of the housing 140.

The settlement portion 141a of the housing 140 may be formed as a concave recess having a size corresponding to the size of the first magnet 130. However, the disclosure is not limited thereto.

Recesses 61, through which an adhesive for attaching the first magnets 130-1 to 130-4 to the settlement portions 141a of the housing 140 is injected, may be provided in the side portions 141-1 to 141-4 of the housing 140. For example, the recesses 61 of the housing 140 may be through holes, and may be connected to the settlement portions 141a of the housing 140.

For example, an opening may be formed in the lower surface of the settlement portion 141a of the housing 140 facing the second coil 230, and an opening may be formed in the side surface of the settlement portion 141a of the housing 140 facing the first coil 120.

For example, the lower surface of the first magnet 130 fixed to the settlement portion 141a of the housing 140 may face the second coil 120 in the optical-axis direction.

The mounting recess 14a of the housing 140 may be provided in the upper portion or the upper end of one of the side portions 141-1 to 141-4 of the housing 140 (for example, 141-1).

The mounting recess 14a of the housing 140 may be a recess, the upper portion of which is open and which has a side surface and a bottom, for easy mounting of the circuit board 190, and may have an opening formed toward the inside of the housing 140. The shape of the mounting recess 14a of the housing 140 may correspond to or coincide with the shape of the circuit board 190.

The mounting recess 14b of the housing 140 may be provided in the inner surface of the first side portion 141-1 of the housing 140, and may be connected to the mounting recess 14a.

In addition, the mounting recess 14b of the housing 140 may be open in the upper portion thereof for easy mounting of the first position sensor 170, and may have an opening formed toward the inner surface of the first side portion 141-1 of the housing 140 in order to increase sensitivity in sensing. The shape of the mounting recess 14b of the housing 140 may correspond to or coincide with the shape of the first position sensor 170.

The first magnet 130 may be fixed to the settlement portion 141a of the housing 140 using an adhesive, and the circuit board 190 may be fixed to the mounting recess 14a of the housing 140 using an adhesive. For example, the adhesive may be epoxy or double-sided tape. However, the disclosure is not limited thereto.

Each of the side portions 141-1 to 141-4 of the housing 140 may be disposed parallel to a corresponding one of the side plates of the cover member 300.

Holes 147 defining paths along which the supporting members 220-1 to 220-4 extend may be provided in the corners 142-1 to 142-4 of the housing 140. For example, the housing 140 may include holes 147 formed through the upper portions of the corners 142-1 to 142-4.

In another embodiment, the holes provided in the corners 142-1 to 142-4 of the housing 140 may be depressed from the outer surfaces of the corners of the housing 140, and at least a portion of each of the holes may be open toward the outer surface of a corresponding one of the corners.

The number of holes 147 of the housing 140 may be equal to the number of supporting members. One end of the supporting member 220 may be connected or bonded to the upper elastic member 150 via a corresponding one of the holes 147.

For example, the diameter of each hole 147 may gradually increase in the direction from the upper surface to the lower surface of the housing 140 for easy application of a damper. However, the disclosure is not limited thereto. In another embodiment, the diameter of each hole 147 may be uniform.

In addition, the housing 140 may be provided at the upper portion, the upper end, or the upper surface thereof with a stopper 145 in order to prevent the housing from directly colliding with the inner surface of the upper plate of the cover member 300 shown in FIG. 1.

For example, the stopper 145 may be provided at the upper surface of each of the corners 142-1 to 142-4 of the housing 140.

For example, the holes 147 of the housing 140 may be located between the outsides of the upper surfaces of the corners 142-1 to 142-4 of the housing 140 and the stoppers 145.

In addition, the housing 140 may be provided on the edge of each of the corners 142-1 to 142-4 thereof with a guide protrusion 144 for preventing overflow of the damper.

The housing 140 may have at least one first coupling portion 143 and Q1 to Q4 coupled to an outer frame 152 of the upper elastic member 150.

For example, each of the first coupling portions 143 and Q1 to Q4 may be a protrusion. However, the disclosure is not limited thereto. In another embodiment, each of the first coupling portions may be a recess or a plane.

The first coupling portions 143 and Q1 to Q4 of the housing 140 may be disposed at at least one of the side portions 141-1 to 141-4 or the corners 142-1 to 142-4 of the housing 140.

For example, the first coupling portions 143 of the housing 140 may be disposed at the side portions 141-1 to 141-4 of the housing 140, and the first coupling portions Q1 to Q4 of the housing 140 may be disposed at the corners 142-1 to 142-4 of the housing 140.

The housing 140 may be provided at the lower surface thereof with a second coupling portion 149 coupled and fixed to an outer frame 162 of the lower elastic member 160. For example, the second coupling portion 149 of the housing 140 may be a protrusion. However, the disclosure is not limited thereto. In another embodiment, the second coupling portion may be a recess or a plane.

In order to define a path along which the supporting member 220 extends and to secure a space for filling with a damping member (for example, gel-type silicone), the housing 140 may have concave recesses 142a formed in the lower portions or the lower ends of the corners 142-1 to 142-4 thereof. That is, in order to alleviate vibration of the supporting member 220, the concave recesses 142a of the housing may be filled with the damping member, such as silicone.

The housing 140 may be provided with at least one stopper (not shown) protruding from the outer surfaces of the side portions 141-1 to 141-4 thereof. The at least one stopper may prevent the housing 140 from colliding with the cover member 300 when moved in the second and/or third direction.

In order to prevent the lower surface of the housing 140 from colliding with the base 210 and/or the circuit board 250, the housing 140 may be further provided with a stopper (not shown) protruding from the lower surface thereof.

At the initial position of the AF operation unit, the first magnets 130-1 to 130-4 may be disposed at the housing 140 such that at least a portion of each of the magnets overlaps the first coil 120 in a direction perpendicular to the optical axis OA.

For example, each of the first magnets 130-1 to 130-4 may be inserted into or disposed in the settlement portion 141a of a corresponding one of the corners 142-1 to 142-4 of the housing 140.

In another embodiment, the first magnets 130-1 to 130-4 may be disposed at the outer surfaces of the corners 142-1 to 142-4 of the housing 140.

The shape of each of the first magnets 130-1 to 130-4 may be polyhedral such that the magnets are easily settled in the corners of the housing 140.

For example, the area of a first surface 11a of each of the first magnets 130-1 to 130-4 may be larger than the area of a second surface 11b thereof. The first surface 11a of each of the first magnets 130-1 to 130-4 may be a surface facing one surface of the first coil 120 (or the outer surface of the bobbin 110), and the second surface 11b may be opposite the first surface 11a.

For example, the transverse length of the second surface 11b of each of the first magnets 130-1 to 130-4 may be smaller than the transverse length of the first surface 11a thereof.

For example, the transverse direction of the first surface 11a may be a direction of the first surface 11a perpendicular to the direction from the lower surface to the upper surface of each of the magnets 130-1 to 130-4 or a direction of the first surface 11a perpendicular to the optical-axis direction.

For example, the transverse direction of the second surface 11b may be a direction of the second surface 11b perpendicular to the direction from the lower surface to the upper surface of each of the magnets 130-1 to 130-4 or a direction of the second surface 11b perpendicular to the optical-axis direction.

For example, the transverse length of each of the first magnets 130-1 to 130-4 may gradually decrease from the center of the housing 140 to the corner 142-1, 142-2, 142-3, or 142-4 of the housing 140.

For example, the transverse length of each of the first magnets 130-1 to 130-4 may decrease from the first surface 11a to the second surface 11b thereof.

Here, the transverse direction may be the transverse direction (or the horizontal direction) of the first surface 11a of each of the first magnets 130-1 to 130-4 perpendicular to the direction from the upper surface to the lower surface of each of the magnets 130-1 to 130-4.

Each of the first magnets 130-1 to 130-4 may be configured as a single body, and may be disposed such that the first surface 11a facing the first coil 120 has an S pole and the second surface 11b has an N pole. However, the disclosure is not limited thereto. In another embodiment, the first surface 11a of each of the first magnets 130-1 to 130-4 may have an N pole, and the second surface 11b thereof may have an S pole.

The first magnets 130-1 to 130-4 may be disposed or installed in the corners of the housing 140 such that at least two thereof face each other.

For example, two pairs of first magnets 130-1 to 130-4 facing each other so as to intersect each other may be disposed at the corners 142-1 to 142-4 of the housing 140. In this case, the planar shape of each of the first magnets 130-1 to 130-4 may be triangular, pentagonal, rhombic, or the like.

In another embodiment, a pair of first magnets facing each other may be disposed at only two corners of the housing 140 facing each other.

Figure 6:
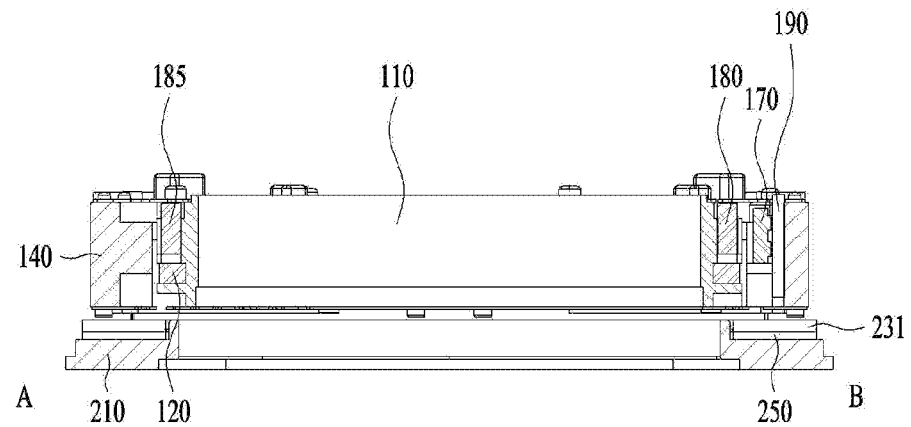
FIG. 6 is a sectional view of the lens moving apparatus shown in FIG. 2 when cut in an AB direction.
Figure 7:
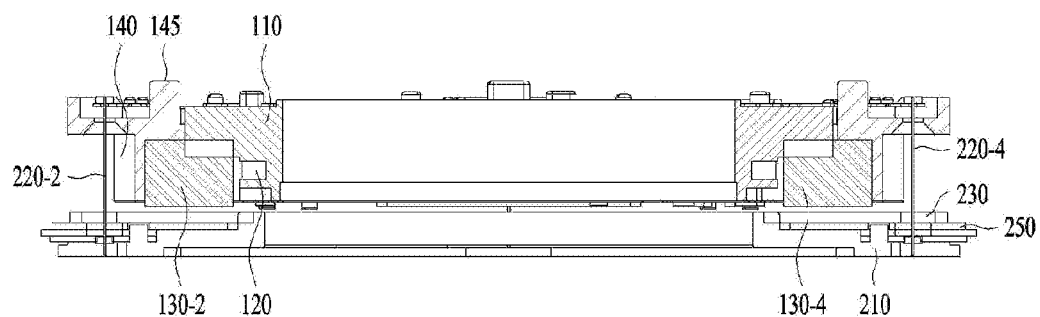
FIG. 7 is a sectional view of the lens moving apparatus shown in FIG. 2 when cut in a CD direction.

FIG. 6 is a sectional view of the lens moving apparatus 100 shown in FIG. 2 when cut in an AB direction, and FIG. 7 is a sectional view of the lens moving apparatus shown in FIG. 2 when cut in a CD direction.

Referring to FIGS. 6 and 7, each of the second and third magnets 180 and 185 may not overlap the first coil 120 in a direction perpendicular to the optical axis OA. However, the disclosure is not limited thereto. In another embodiment, each of the second and third magnets 180 and 185 may overlap the first coil 120 in a direction perpendicular to the optical axis OA.

In addition, at the initial position of the AF operation unit, the second magnet 180 may overlap or be aligned with the third magnet 185 in a direction perpendicular to the optical axis OA.

In addition, at the initial position of the AF operation unit, the first position sensor 170 may overlap each of the second and third magnets 180 and 185 in a direction perpendicular to the optical axis OA. However, the disclosure is not limited thereto. In another embodiment, the first position sensor 170 may not overlap at least one of the second or third magnet 180 or 185 in a direction perpendicular to the optical axis OA.

In addition, the first position sensor 170 may not overlap the first magnets 130-1 to 130-4 in a direction from the first position sensor 170 to the first coil 120 or a direction perpendicular to the outer surface of the first side portion 141-1 of the housing 140.

Next, the first position sensor 170 and the circuit board 190 will be described.

Figure 8:
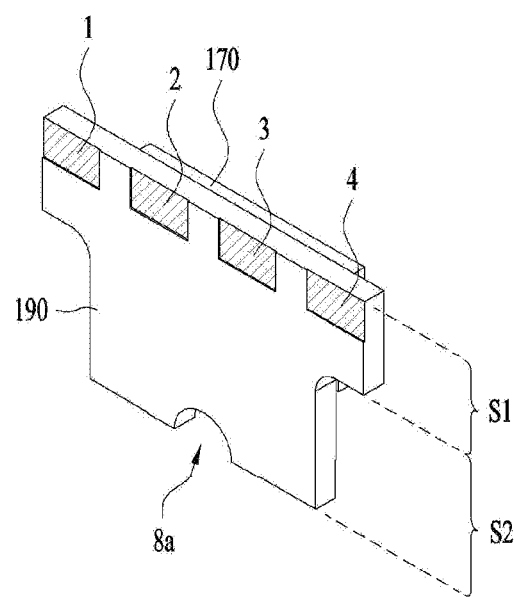
FIG. 8 is an enlarged view of the circuit board and the first position sensor shown in FIG. 4.
Figure 9:
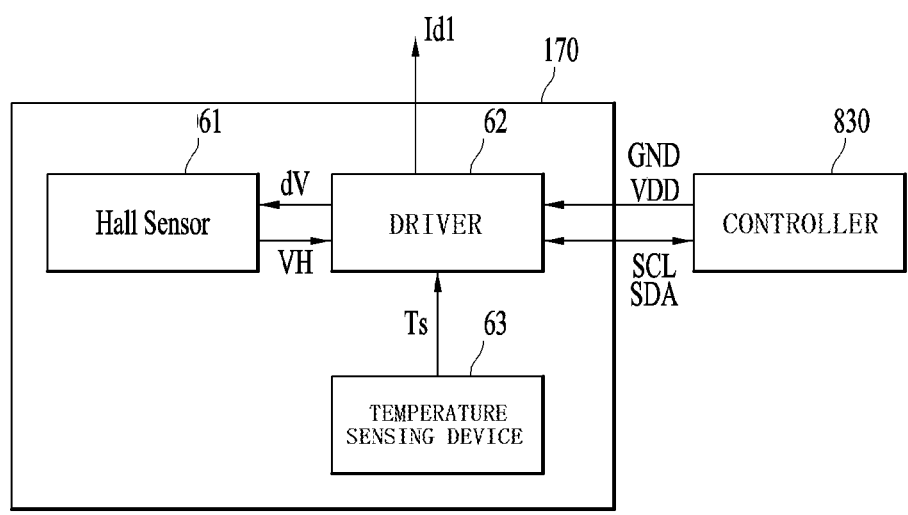
FIG. 9 shows an embodiment of the first position sensor shown in FIG. 8.

FIG. 8 is an enlarged view of the circuit board 190 and the first position sensor 170 shown in FIG. 4, and FIG. 9 shows an embodiment of the first position sensor 170 shown in FIG. 8.

Referring to FIG. 8, the first position sensor 170 may be mounted to the circuit board 190 disposed at the housing 140, and may be fixed to the housing 140. For example, the first position sensor 170 may be moved together with the housing 140 during handshake compensation.

The first position sensor 170 may sense the intensity of a magnetic field of the second magnet 180 mounted to the bobbin 110 when the bobbin 110 is moved, and may output an output signal based on the result of sensing.

The first position sensor 170 may be disposed at a first surface of the circuit board 190. Here, the first surface of the circuit board 190 may be the surface of the circuit board 190 facing the bobbin 110 when the circuit board 190 is mounted to the housing 140.

Referring to FIG. 9, the first position sensor 170 may include a Hall sensor 61 and a driver 62.

For example, the Hall sensor 61 may be made of silicon, and the output VH of the Hall sensor 61 may increase as ambient temperature increases. For example, the ambient temperature may be temperature of the lens moving apparatus, such as temperature of the circuit board 190, temperature of the Hall sensor 61, or temperature of the driver 62.

In another embodiment, the Hall sensor 61 may be made of GaAs, and the output VH of the Hall sensor 61 may have a gradient of about −0.06%/° C. to the ambient temperature.

The first position sensor 170 may further include a temperature sensing element 63 capable of sensing ambient temperature. The temperature sensing element 63 may output a temperature sensing signal Ts based on the result of measuring temperature around the first position sensor 170 to the driver 62.

For example, the Hall sensor 61 of the first position sensor 170 may generate output VH based on the result of sensing the intensity of magnetic force of the second magnet 180.

The driver 62 may output a driving signal dV for driving the Hall sensor 61 and a driving signal Id1 for driving the first coil 120.

For example, the driver 62 may receive a clock signal SCL, a data signal SDA, and power signals VDD and GND from controllers 830 and 780 using data communication using a protocol, such as I2C communication.

The driver 62 may generate the driving signal dV for driving the Hall sensor 61 and the driving signal Id1 for driving the first coil 120 using the clock signal SCL and the power signals VDD and GND.

The first position sensor 170 may include four terminals for transmitting and receiving the clock signal SCL, the data signal SDA, and the power signals VDD and GND and two terminals for providing a driving signal to the first coil 120.

In addition, the driver 62 may receive the output VH of the Hall sensor 61, and may transmit the clock signal SCL and the data signal SDA about the output VH of the Hall sensor 61 to the controllers 830 and 780 using data communication using a protocol, such as I2C communication.

In addition, the driver 62 may receive the temperature sensing signal Ts measured by the temperature sensing element 63, and may transmit the temperature sensing signal Ts to the controllers 830 and 780 using data communication using a protocol, such as I2C communication.

The controllers 830 and 780 may perform temperature compensation on the output VH of the Hall sensor 61 based on a change in ambient temperature measured by the temperature sensing element 63 of the first position sensor 170.

For example, when the driving signal dV or a bias signal of the Hall sensor 61 is 1 [mA], the output VH of the Hall sensor 61 of the first position sensor 170 may be −20 [mV] to +20 [mV].

In the case of temperature compensation on the output VH of the Hall sensor 61 having a negative gradient to a change in ambient temperature, the output VH of the Hall sensor 61 of the first position sensor 170 may be 0 [mV] to +30 [mV].

When the output of the Hall sensor 61 of the first position sensor 170 is shown using an xy coordinate system, the reason that the output range of the Hall sensor 61 of the first position sensor 170 is put in a first quadrant (for example, 0 [mV] to +30 [mV]) is as follows.

Since the output of the Hall sensor 61 in the first quadrant and the output of the Hall sensor 61 in a third quadrant of the xy coordinate system move in opposite directions depending on a change in ambient temperature, accuracy and reliability of the Hall sensor may be reduced in the case in which both the first and third quadrants are used as an AF driving control section. In order to accurately perform compensation based on a change in ambient temperature, therefore, a predetermined range of the first quadrant may be used as an output range of the Hall sensor 61 of the first position sensor 170.

The first position sensor 170 may include first to third terminals for the clock signal SCL and the two power signals VDD and GND, a fourth terminal for the data signal SDA, and fifth and sixth terminals for providing a driving signal to the first coil 120.

Referring to FIGS. 5 and 7, the first to sixth terminals of the first position sensor 170 may be connected to corresponding pads 1 to 6 of the circuit board 190.

The circuit board 190 may include first to fourth pads 1 to 4 provided at the upper portion or the upper end of a second surface thereof and fifth and sixth pads 5 and 6 provided at the lower portion or the lower end of a first surface of the circuit board 190. However, the disclosure is not limited thereto. The pads may be disposed on at least one of the first surface or the second surface of the circuit board 190 in various forms.

In another embodiment, the first position sensor 170 may be realized as a position detection sensor, such as a Hall sensor, alone.

The circuit board 190 may include an upper end portion S1 and a lower end portion S2 located under the upper end portion S1. The side surface of the upper end portion S1 may protrude from the side surface of the lower end portion S2. However, the disclosure is not limited thereto.

For example, the first to fourth pads may be disposed on a second surface of the upper end portion S1 so as to be spaced apart from each other, and the fifth and sixth pads 5 and 6 may be disposed on a first surface of the lower end portion S2 so as to be spaced apart from each other.

In order to avoid spatial interference with one end 164a of a second frame connection portion 163 of a lower spring 162-2 (FIG. 11) of the lower elastic member 160, a recess 8a may be provided in the lower portion or the lower end of the circuit board 190. For example, the recess 8a may be disposed in the middle of the lower end portion S2 of the circuit board 190.

The circuit board 190 may include a circuit pattern or wiring (not shown) for interconnecting the first to sixth pads 1 to 6 and the first to sixth terminals of the first position sensor 170.

For example, the circuit board 190 may be a printed circuit board or an FPCB.

The first to fourth pads 1 to 4 of the circuit board 190 may be connected to terminals 251 of the circuit board 250 via upper springs 150-1 to 150-4 and the supporting members 220-1 to 220-4, whereby the first position sensor 170 may be connected to the circuit board 250.

The fifth pad 5 and the sixth pad 6 of the circuit board 190 may be coupled to lower springs 160-1 and 160-2, and the first position sensor 170 may be connected to the first coil 120 via the lower springs 160-1 and 160-2.

For example, the fifth pad 5 of the circuit board 190 may be coupled to the first lower springs 160-1, and the sixth pad 6 of the circuit board 190 may be coupled to the second lower springs 160-2.

Next, the upper elastic member 150, the lower elastic member 160, and the supporting member 220 will be described.

Figure 10:
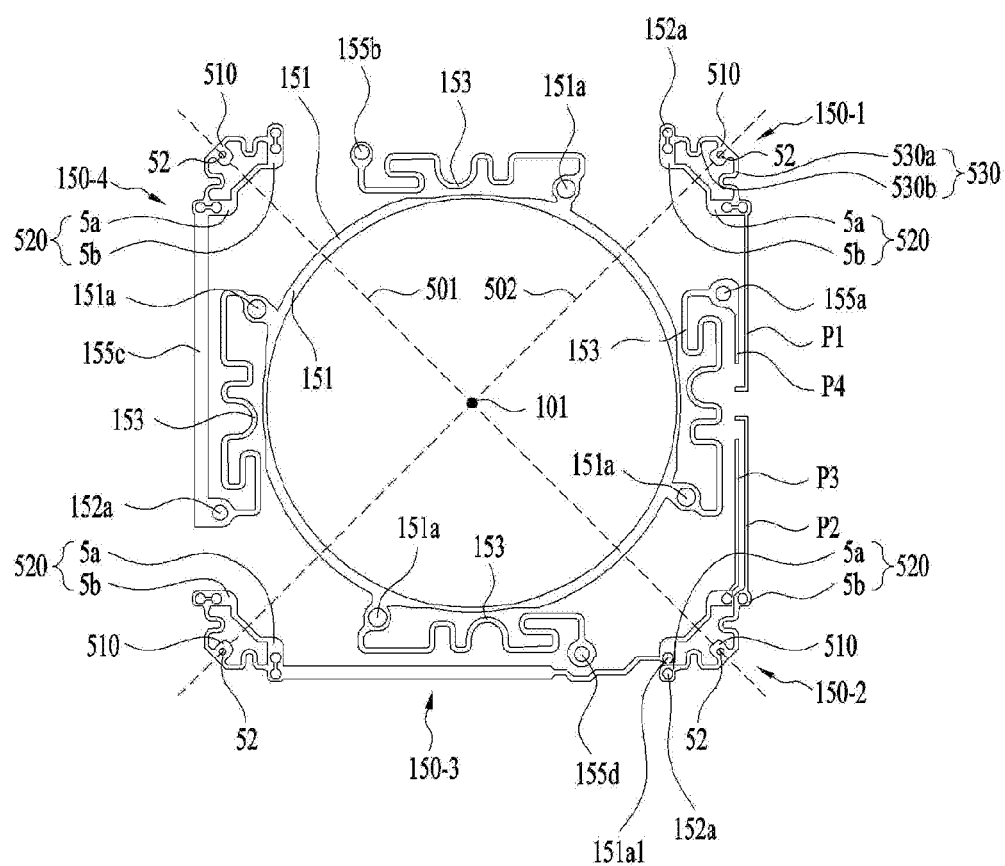
FIG. 10 is a plan view of an upper elastic member shown in FIG. 1.
Figure 11:
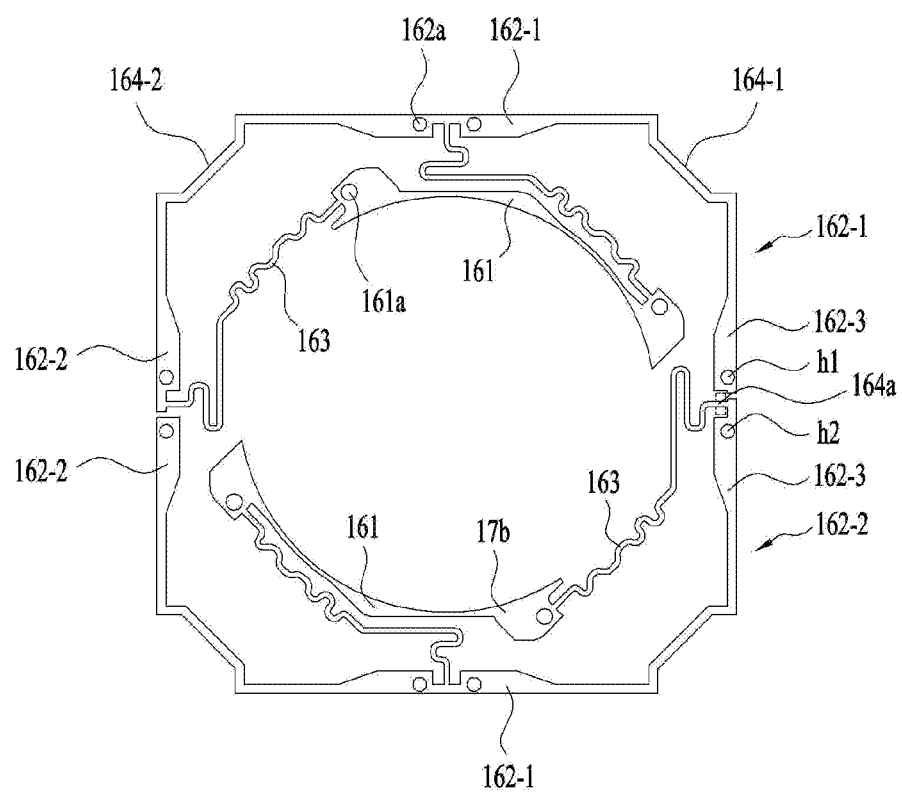
FIG. 11 is a plan view of a lower elastic member shown in FIG. 1.
Figure 12:
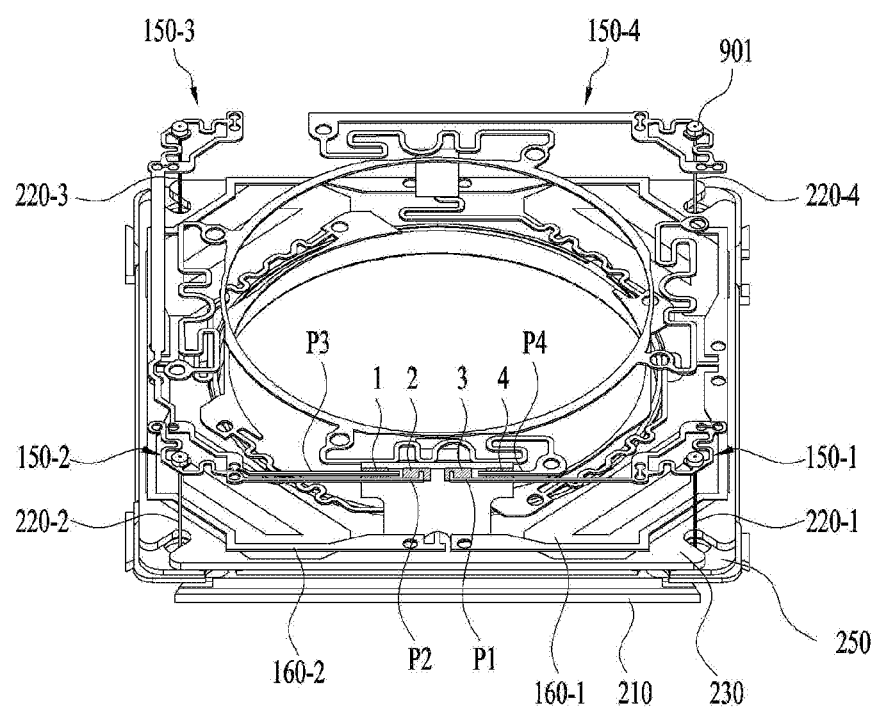
FIG. 12 is a coupled perspective view of the upper elastic member, the lower elastic member, a base, a supporting member, a second coil, and the circuit board shown in FIG. 1.
Figure 13:
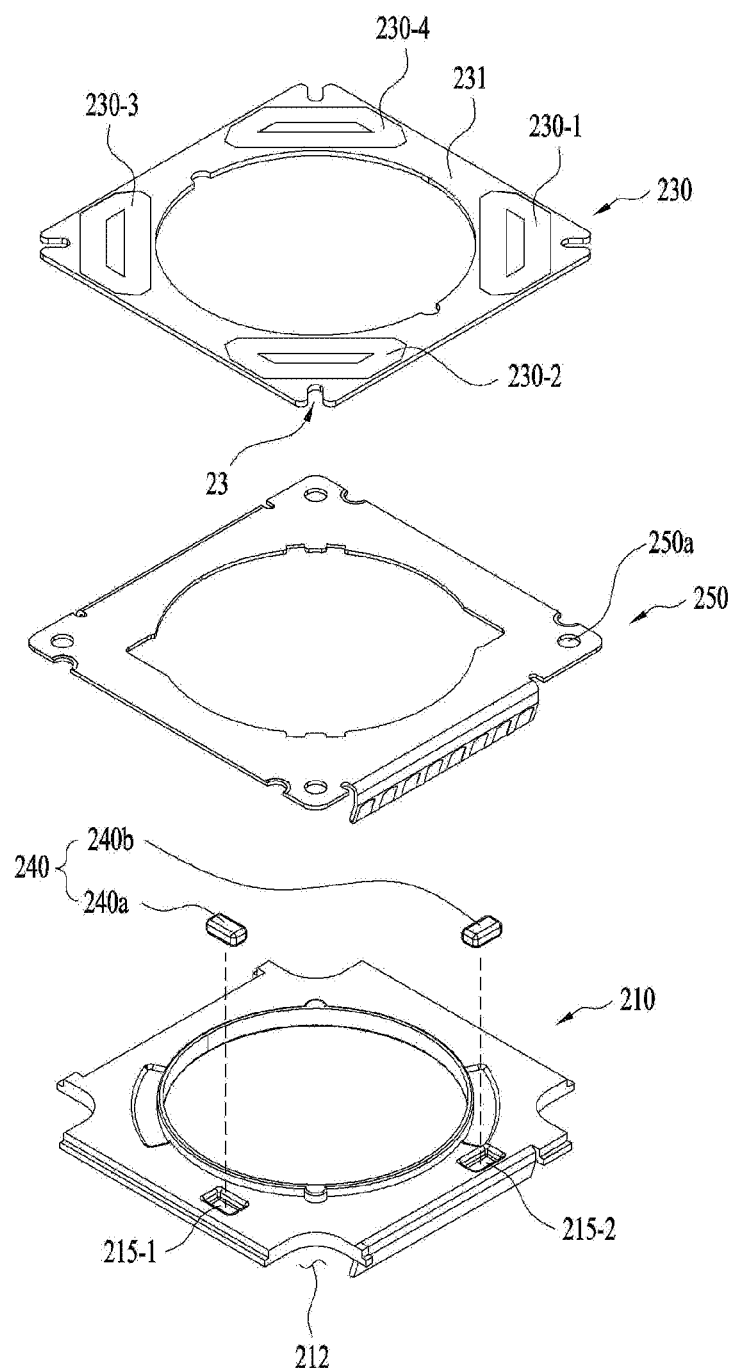
FIG. 13 is a separated perspective view of the second coil, the circuit board, the base, and a second position sensor shown in FIG. 1.
Figure 14:
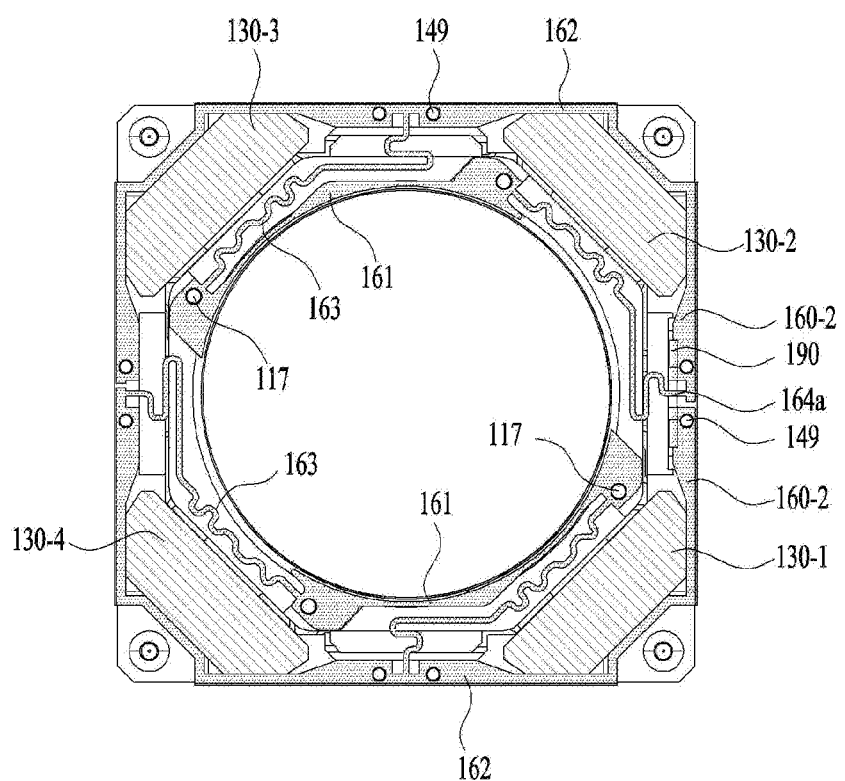
FIG. 14 is a bottom perspective view of a housing, first magnets, the lower elastic member, and the circuit board shown in FIG. 1.

FIG. 10 is a plan view of the upper elastic member 150 shown in FIG. 1, FIG. 11 is a plan view of the lower elastic member 160 shown in FIG. 1, FIG. 12 is a coupled perspective view of the upper elastic member 150, the lower elastic member 160, the base 210, the supporting member 220, the second coil 230, and the circuit board 250 shown in FIG. 1, FIG. 13 is a separated perspective view of the second coil 230, the circuit board 250, the base 210, and the second position sensor 240 shown in FIG. 1, and FIG. 14 is a bottom perspective view of the housing 140, the first magnets 130-1 to 130-4, the lower elastic member 160, and the circuit board 190 shown in FIG. 1.

The upper elastic member 150 may be coupled to the upper portion of the bobbin 110 and to the upper portion of the housing 140 and may support the upper portion of the bobbin 110 and the upper portion of the housing 140.

The lower elastic member 160 may be connected to the lower portion of the bobbin 110 and to the lower portion of the housing 140 in order to support the lower portion of the bobbin 110 and the lower portion of the housing 140.

The upper elastic member 150 and the lower elastic member 160 may elastically support the bobbin 110 relative to the housing 140.

The supporting member 220 may support the housing 140 such that the housing is movable relative to the base 210 in a direction perpendicular to the optical axis, and may connect at least one of the upper or lower elastic member 150 or 160 to the circuit board 250.

Referring to FIG. 10, the upper elastic member 150 may include a plurality of upper springs 150-1 to 150-4 separated from each other. FIG. 10 shows four upper springs separated from each other; however, the disclosure is not limited as to the number thereof. In addition, the upper springs may also be referred to as "upper elastic units."

The upper elastic member 150 may include first to fourth upper springs 150-1 to 150-4 directly bonded to first to fourth pads 191-1 to 191-4 of the circuit board 190 so as to be connected thereto.

A portion of each of the upper springs may be disposed at the first side portion 141-1 of the housing 140 at which the circuit board 190 is disposed, and at least one upper spring may be disposed at each of the second to fourth side portions 141-2 to 141-4, excluding the first side portion 141-1.

Since the four pads 1 to 4 provided at the upper end portion S1 of the circuit board 190 disposed at the first side portion 141-1 of the housing 140 are directly connected to the four upper springs 150-1 to 150-4, a portion of a first outer frame 152 of each of the four upper springs 150-1 to 150-4 may be disposed at the first side portion 141-1 of the housing 140.

Each of the upper springs 150-1 to 150-4 may be disposed at a corresponding one of the corners 142-1 to 142-4 of the housing 140, and may have a corresponding one of extension portions P1 to P4 extending to the first side portion 141-1 of the housing 140.

The extension portions P1 to P4 of the upper springs 150-1 to 150-4 may be directly coupled to the four pads 1 to 4 provided at the upper end portion S1 of the circuit board 190 via a conductive adhesive member, such as solder.

The first upper spring 150-1 may be disposed at the first corner 142-1 of the housing 140, the second upper spring 150-2 may be disposed at the second corner 142-2 of the housing 140, the third upper spring 150-3 may be disposed at the third corner 142-3 of the housing 140, and the fourth upper spring 150-4 may be disposed at the fourth corner 142-4 of the housing 140.

Each of the first to fourth upper springs 150-1 to 150-4 may include a first outer frame coupled to the housing 140. For example, each of the first to fourth upper springs 150-1 to 150-4 may include a first outer frame coupled to a corresponding one of the first to fourth corners 142-1 to 142-4 of the housing 140.

At least one of the first to fourth upper springs 150-1 to 150-4 may further include a first inner frame 151 coupled to the bobbin 110 and a first frame connection portion 153 for interconnecting the first inner frame and the first outer frame.

In FIG. 10, each of the first to third upper springs 150-1 to 150-3 includes only the first outer frame, but does not include the first inner frame and the first frame connection portion. Only the fourth upper spring 150-4 includes the first inner frame 151, the first outer frame, and the first frame connection portion 153. However, the disclosure is not limited thereto.

For example, a hole 151a, to which the first coupling portion 113 of the bobbin 110 is coupled, may be provided in the first inner frame 151. However, the disclosure is not limited thereto.

Holes 152a, to which the first coupling portions 143 and Q1 to Q4 of the housing 140 are coupled, may be provided in the first outer frames of the first to fourth upper elastic members 150-1 to 150-4.

The first outer frame of each of the first to fourth upper springs 150-1 to 150-4 may include a first coupling portion 510 coupled to a corresponding one of the supporting members 220-1 to 220-4, a second coupling portion 520 coupled to a corresponding one of the corners of the housing 140, a connection portion 530 for interconnecting the first coupling portion 510 and the second coupling portion 520, and a corresponding one of extension portions P1 to P4 connected to the first coupling portion 510 and extending to the first side portion 141-1 of the housing 140.

For example, one end of the first supporting member 220-1 may be coupled to the first coupling portion 510 of the first upper spring 150-1, one end of the second supporting member 220-2 may be coupled to the first coupling portion 510 of the second upper spring 150-2, one end of the third supporting member 220-3 may be coupled to the first coupling portion 510 of the third upper spring 150-3, and one end of the fourth supporting member 220-4 may be coupled to the first coupling portion 510 of the fourth upper spring 150-4, via solder or a conductive adhesive member.

The first coupling portion 510 may have a hole 52, through which each of the supporting members 220-1 to 220-4 extends. One end of each of the supporting members 220-1 to 220-4 extending through the hole 52 may be directly coupled to the first coupling portion 510 via a conductive adhesive member or solder 901 (see FIG. 12), and the first coupling portion 510 may be connected to each of the supporting members 220-1 to 220-4.

For example, the first coupling portion 510 is a region in which the solder 901 is disposed for coupling with each of the supporting members 220-1 to 220-4, and may include a hole 52 and a region around the hole 52.

The second coupling portion 520 may include at least one coupling region 5a and 5b coupled to each of the corners 142-1 to 142-4 of the housing 140.

For example, the coupling regions 5a and 5b of the second coupling portion 520 may include at least one hole 152a coupled to the first coupling portions Q1 to Q4 of the housing 140.

In FIG. 10, each of the coupling regions 5a and 5b of the second coupling portion 520 includes two holes 152a, and four first coupling portions Q1 to Q4 corresponding to the holes of the coupling regions 5a and 5b are provided at each of the corners of the housing 140. However, the disclosure is not limited as to the number of holes 152a and the number of first coupling portions. For example, each of the coupling regions 5a and 5b may have one or more holes, and one or more first coupling portions corresponding thereto may be provided in each of the corners 142-1 to 142-4 of the housing 140.

For example, in order to support the housing 140 in a balanced state, the coupling regions 5a and 5b of the second coupling portions 520 of the first to fourth upper springs 150-1 to 150-4 may be symmetrical with respect to reference lines 501 to 504. However, the disclosure is not limited thereto.

In addition, the first coupling portions Q1 to Q4 of the housing 140 may be symmetrical with respect to the reference lines 501 to 504, and two first coupling portions may be provided at each of both sides of each reference line. However, the disclosure is not limited as to the number thereof.

Each of the reference lines 501 to 504 may be a straight line passing through a central point 101 and a corresponding one of the corners 142-1 to 142-4 of the housing 140. Here, the central point 101 may be the center of the housing 140, the center of the bobbin 110, or the center of the upper elastic member 150. In addition, for example, the edges of the corners 142-1 to 142-4 of the housing 140 may be edges aligned with or corresponding to the middles of the corners of the housing 140.

In the embodiment of FIG. 10, each of the coupling regions 5a and 5b of the second coupling portion 520 is realized so as to include a hole. However, the disclosure is not limited thereto. In another embodiment, the coupling regions may be realized in various forms sufficient to be coupled to the housing 140, such as recesses.

For example, the hole 152a of the second coupling portion 520 may have at least one cut portion (not shown), through which an adhesive member permeates a gap between the first coupling portion 143 of the housing 140 and the hole 152a.

The connection portion 530 may interconnect the first coupling portion 510 and the coupling regions 52a and 52b of the second coupling portion 520.

For example, the connection portion 530 may include a first connection portion 530a for interconnecting the first coupling region 52a of the second coupling portion 520 of each of the first to fourth upper springs 150-1 to 150-4 and the first coupling portion 510 and a second connection portion 530b for interconnecting the second coupling region 52b of the second coupling portion 520 and the first coupling portion 510.

Each of the first and second connection portions 530a and 530b may include a bent portion that is bent at least once or a curved portion that is curved at least once. However, the disclosure is not limited thereto. In another embodiment, each connection portion may be straight.

For example, the second coupling portion 510 may contact the upper surface of each of the corners 142-1 to 142-4 of the housing 140, and may be supported by each of the corners 142-1 to 142-4 of the housing 140. For example, the connection portion 530 may not be supported by the upper surface of the housing 140, and may be spaced apart from the housing 140. In addition, an empty space between the connection portion 530 and the housing 140 may be filled with a damper (not shown) in order to prevent oscillation due to vibration.

The width of each of the first and second connection portions 530a and 530b may be smaller than the width of the second coupling portion 520, whereby the connection portion 530 may be easily moved in the first direction, and therefore stress applied to the upper springs 150-1 to 150-4 and stress applied to the supporting members 220-1 to 220-4 may be dispersed.

Each of the extension portions P1 to P4 of the first outer frames of the first to fourth upper springs 150-1 to 150-4 may extend from the second coupling portion 520 toward a corresponding one of the first to fourth pads 1 to 4 of the circuit board 190 disposed at the first side portion 141-1 of the housing 140.

One end of each of the extension portions P1 to P4 may be coupled to a corresponding one of the pads 1 to 4 of the circuit board 190 via solder or a conductive adhesive member.

In another embodiment, the extension portions of the first outer frames of the first to fourth upper springs may extend from the first coupling portion.

One end of each of the first and second extension portions P1 and P2 may be bent inwardly from the outer surface of the first side portion 141-1 of the housing 140 so as to be easily coupled to a corresponding one of the pads of the circuit board 190. However, the disclosure is not limited thereto.

The first outer frame of the third upper spring 150-3 may further include an extension frame 154 connected between the second coupling portion 520 and the extension portion P3 and disposed at the fourth side portion 141-4 and the fourth corner 142-4 of the housing 140. In order to increase force of coupling with the housing 140 and thus to prevent loosening of the third upper spring 150-3, the extension frame 154 may have a hole 152a1, to which a first coupling portion provided at the fourth corner 142-4, e.g. a protrusion, is coupled.

The first outer frame of the fourth upper spring 150-4 may further include first to fourth frames 155a to 155d disposed at the first to fourth side portions 141-1 to 141-4 of the housing 140, and each of the first to fourth frames 155a to 155d may have at least one hole, to which the first coupling portion 143 of the housing 140 is coupled.

The third frame 155c disposed at the third side portion 141-3 of the housing may be connected to the second coupling portion 520 of the fourth upper spring 150-4, and may extend to the third side portion 141-3 of the housing 140.

The fourth upper spring 150-4 may include four frame connection portions 153, and each of the frame connection portions 153 may interconnect a corresponding one of the first to fourth frames 155a to 155d and the first inner frame 151.

The extension portion P4 of the fourth upper spring 150-4 may be connected to the first frame 155a disposed at the first side portion 141-1 of the housing 140.

As described above, the first to fourth upper springs may include extension portions P1 to P4 disposed on the first side portion 141-1 of the housing 140, and the upper springs 150-1 to 150-4 may be easily coupled to the four pads 1 to 4 provided at the upper end portion S1 of the circuit board 190 via the extension portions P1 to P4.

Referring to FIG. 11, the lower elastic member 160 may include a plurality of lower springs 160-1 and 160-2. The lower springs may also be referred to as "lower elastic units."

For example, each of the first and second lower springs 160-1 and 160-2 may include a second inner frame 161 coupled or fixed to the lower portion, the lower surface, or the lower end of the bobbin 110, second outer frames 162-1 to 162-3 coupled or fixed to the lower portion, the lower surface, or the lower end of the housing 140, and a second frame connection portion 163 for interconnecting the second inner frame 161 and the second outer frames 162-1 to 162-3.

The second inner frame 161 may be provided with a hole 161a, to which the second coupling portion of the bobbin 110 is coupled, and each of the second outer frames 162-1 to 162-3 may be provided with a hole 162a, to which the second coupling portion 149 of the housing 140 is coupled.

For example, each of the first and second lower springs 160-1 and 160-2 may include three second outer frames and two second frame connection portions. However, the disclosure is not limited thereto. In another embodiment, each of the first and second lower springs 160-1 and 160-2 may include one or more second outer frames and one or more second frame connection portions.

Each of the first and second lower springs 160-1 and 160-2 may include connection frames 164-1 and 164-2 for interconnecting the second outer frames 162-1 to 162-3.

The width of each of the connection frames 164-1 and 164-2 may be smaller than the width of each of the first inner frames. However, the disclosure is not limited thereto.

The connection frames 164-1 and 164-2 may be located outside second coils 230-1 to 230-4 and the first magnets 130-1 to 130-4 based on the OIS coils 230-1 to 230-4 and the magnets 130-1 to 130-4 in order to avoid spatial interference with the second coils 230 and the first magnets 130-1 to 130-4. In this case, the outside of the second coils 230-1 to 230-4 and the first magnets 130-1 to 130-4 may be opposite a region in which the center of the bobbin 110 or the center of the housing 140 is located based on the second coils 230-1 to 230-4 and the first magnets 130-1 to 130-4.

In addition, for example, the connection frames 164-1 and 164-2 may be located so as not to overlap the second coils 230-1 to 230-4 and/or the first magnets 130-1 to 130-4 in the optical-axis direction. However, the disclosure is not limited thereto. In another embodiment, at least portions of the connection frames 164-1 and 164-2 may be aligned with or overlap the second coils 230-1 to 230-4 and/or the first magnets 130-1 to 130-4 in the optical-axis direction.

Each of the upper springs 150-1 to 150-4 and the lower springs 160-1 and 160-2 may be realized as a leaf spring; however, the disclosure is not limited thereto. Each of the upper springs and the lower springs may be realized as a coil spring or the like.

Next, the supporting members 220-1 to 220-4 will be described.

The supporting members 220-1 to 220-4 may be disposed so as to correspond to the corners 142-1 to 142-4 of the housing 140, and may interconnect the upper springs 150-1 to 150-4 and the circuit board 250.

The supporting members 220-1 to 220-4 may independently interconnect the first to fourth upper springs 150-1 to 150-4 and the circuit board 250.

The supporting members 220-1 to 220-4 may be spaced apart from the housing 140, not fixed to the housing 140, and one end of each of the supporting members 220-1 to 220-4 may be directly connected or coupled to the first coupling portion 510. In addition, the other end of each of the supporting members 220-1 to 220-4 may be directly connected or coupled to the circuit board 250.

For example, each of the supporting members 220-1 to 220-4 may extend through the hole 147 formed in a corresponding one of the corners 142-1 to 142-4 of the housing 140. However, the disclosure is not limited thereto. In another embodiment, the supporting members may be disposed adjacent to boundary lines between the side portions 141-1 to 141-4 and the corners 142 of the housing 140, and may not extend through the corners 142-1 to 142-4 of the housing 140.

The first coil 120 may be directly connected or coupled to a corresponding one of the second inner frames of the first and second lower springs 160-1 and 160-2.

The four pads 1 to 4 of the circuit board 190 may be connected to the circuit board 250 via the four upper springs 150-1 to 150-4 corresponding thereto and the supporting members 220-1 to 220-4 connected to the upper springs 150-1 to 150-4.

In addition, each of the two pads 5 and 6 of the circuit board 190 may be connected or coupled to the second outer frame 162-3 of a corresponding one of the first and second lower springs 160-1 and 160-2.

For example, the fifth and sixth pads 5 and 6 of the circuit board 190 may be coupled to holes h1 and h2 provided in the second outer frames 162-3 of the first and second lower springs 160-1 and 160-2 via solder or a conductive adhesive member.

The first position sensor 170 may transmit or receive signals GND, VDD, SCL, and SDA for data communication to or from the circuit board 250 through the upper springs 150-1 to 150-4 and the supporting members 220-1 to 220-4.

In addition, the first coil 120 may be connected to the first and second lower springs 160-1 and 160-2, and the fifth and sixth pads 5 and 6 of the circuit board 190 may be directly connected to the first and second lower springs 160-1 and 160-2, whereby the first position sensor 170 and the first coil 120 may be connected to each other, and the first position sensor 170 may provide a driving signal to the first coil 120.

The supporting member 220 may be realized as an elastic supporting member, such as a suspension wire, a leaf spring, or a coil spring. Also, in another embodiment, the supporting member 220 may be integrally formed with the upper elastic member 150.

Next, the base 210, the circuit board 250, and the second coil 230 will be described.

Referring to FIG. 13, the base 210 may have an opening corresponding to the opening of the bobbin 110 and/or the opening of the housing 140, and may be configured in a shape coinciding with or corresponding to the shape of the cover member 300, such as a quadrangular shape.

The base 210 may be provided with a stair 211, which may be coated with an adhesive when fixing the cover member 300 by adhesion. In this case, the stair 211 may guide the side plate of the cover member 300 coupled to the upper side thereof, and the lower end of the side plate of the cover member 300 may contact the stair 211. The stair 211 of the base 210 may be fixed to the lower end of the side plate of the cover member 300 by adhesion using an adhesive.

A prop portion 255 may be provided at a region of the base 210 facing the terminal 251 of the circuit board 250. The prop portion 255 may support a terminal surface 253 of the circuit board 250 at which the terminal 251 is formed.

The base 210 may be provided in the corners thereof corresponding to the corners of the cover member 300 with concave recesses 212. In the case in which the corners of the cover member 300 protrude, protrusions of the cover member 300 may be fastened to the base 210 in the concave recesses 212.

In addition, the base 210 may be provided in the upper surface thereof with settlement recesses 215-1 and 215-2, in which the second position sensor 240 is disposed. A settlement portion (not shown), at which a filter 610 of a camera module 200 is installed, may be formed in the lower surface of the base 210.

The second coil 230 may be disposed at the upper portion of the circuit board 250, and OIS position sensors 240*a* and 240*b* may be disposed in the settlement recesses 215-1 and 215-2 of the base 210 located under the circuit board 250.

The second position sensor 240 may include first and second OIS position sensors 240*a* and 240*b*, and the OIS position sensors 240*a* and 240*b* may sense displacement of an OIS operation unit in a direction perpendicular to the optical axis. Here, the OIS operation unit may include the AF operation unit and components mounted to the housing 140.

For example, the OIS operation unit may include the AF operation unit and the housing 140. In some embodiments, the magnets 130-1 to 130-4 may be further included. For example, the AF operation unit may include the bobbin 110 and components mounted to the bobbin 110 so as to be movable with the bobbin 110. For example, the AF operation unit may include the bobbin 110 and the lens (not shown) and the first coil 120 mounted to the bobbin 110.

The circuit board 250 is disposed on the upper surface of the base 210, and may have an opening corresponding to the opening of the bobbin 110, the opening of the housing 140, and/or the opening of the base 210. The circuit board 250 may be configured in a shape coinciding with or corresponding to the shape of the upper surface of the base 210, such as a quadrangular shape.

The circuit board 250 may be provided with at least one terminal surface 253 which is bent from the upper surface thereof and at which a plurality of terminals 251 or pins for receiving electrical signals from outside is provided.

The second coil 230 is disposed at the upper portion of the circuit board 250 so as to correspond to the first magnets 130-1 to 130-4 disposed at the housing 140.

The second coil 230 may be disposed so as to be opposite or overlap the first magnets 130-1 to 130-4 disposed at the corners 142-1 to 142-4 of the housing 140 in the optical-axis direction.

For example, the second coil 230 may include four second coils 230-1 to 230-4 disposed or formed at four corners of a quadrangular circuit member 231.

For example, the second coil 230 may include two second coils 230-1 and 230-3 for the second direction and two second coils 230-2 and 230-4 for the third direction. However, the disclosure is not limited thereto. In another embodiment, the second coil 230 may include a single second coil for the second direction and a single second coil for the third direction, or may include four or more second coils.

The housing 140 may be moved in the second and/or third direction, e.g. in the x-axis and/or y-axis direction, due to interaction between the first magnets 130-1 to 130-4 and the second coils 230-1 to 230-4, whereby handshake compensation may be performed.

In FIG. 13, the second coils 230-1 to 230-4 may be provided at the circuit member 231, rather than the circuit board 250. However, the disclosure is not limited thereto. In another embodiment, each of the second coils 230-1 to 230-4 may be configured in the form of a ring-shaped coil block or an FP coil. In a further embodiment, each of the second coils may be configured in the form of a circuit pattern formed on the circuit board 250.

The circuit board 250 and the circuit member 231 are separate components, which are referred to individually. However, the disclosure is not limited thereto. In another embodiment, the circuit board 250 and the circuit member 231 may be commonly referred to as a "circuit member." In this case, the other end of each of the supporting members may be coupled to the "circuit member" (e.g. the lower surface of the circuit member).

In order to avoid spatial interference with the supporting members 220-1 to 220-4, recesses 23 may be provided in the corners of the circuit member 231, and the supporting members may extend through the recesses 23. In another embodiment, the circuit member may be provided with holes formed through the circuit member 231 instead of the recesses 23.

Each of the OIS position sensors 240*a* and 240*b* may be a Hall sensor. Any sensor may be used as long as the sensor is capable of sensing the intensity of a magnetic field. For example, each of the OIS position sensors 240*a* and 240*b* may be configured in the form of a driver including a Hall sensor, or may be realized as a position detection sensor, such as a Hall sensor, alone.

Terminals 251 may be provided at the terminal surface 253 of the circuit board 250.

Signals SCL, SDA, VDD, and GND for data communication with the first position sensor 190 may be transmitted and received through a plurality of terminals 251 installed at the terminal surface 253 of the circuit board 250, driving signals may be supplied to the OIS position sensors 240*a* and 240*b*, and signals output from the OIS position sensors 240*a* and 240*b* may be received and output to the outside.

According to the embodiment, the circuit board 250 may be an FPCB. However, the disclosure is not limited thereto. The terminals of the circuit board 250 may be directly formed on the surface of the base 210 using a surface electrode method or the like.

The circuit board 250 may include holes 250*a* through which the supporting members 220-1 to 220-4 extend. The position and number of holes 250*a* may correspond to or coincide with the position and number of supporting members 220-1 to 220-4.

The supporting members 220-1 to 220-4 may extend through the holes 250*a* of the circuit board 250 and may be connected to circuit patterns disposed on the lower surface of the circuit board 250 through soldering. However, the disclosure is not limited thereto.

In another embodiment, the circuit board 250 may have no holes, and the supporting members 220-1 to 220-4 may be connected to circuit patterns or pads formed on the upper surface of the circuit board 250 through soldering.

Alternatively, in another embodiment, the supporting members 220-1 to 220-4 may be connected to the circuit member 231, and the circuit member may be connected to the circuit board.

Since a driving signal is directly provided from the first position sensor 170 to the first coil 120 in the embodiment, it is possible to reduce the number of supporting members and to simplify the connection structure, compared to the case in which a driving signal is directly provided to the first coil 120 through the circuit board 250.

In addition, since the first position sensor 170 may be realized as a driver IC capable of measuring temperature, the output of the Hall sensor may be compensated so as to have the minimum change depending on a change in temperature, or the output of the Hall sensor may be compensated so as to have a uniform gradient depending on a change in temperature, whereby it is possible to improve accuracy of AF driving irrespective of a change in temperature.

Figure 15:
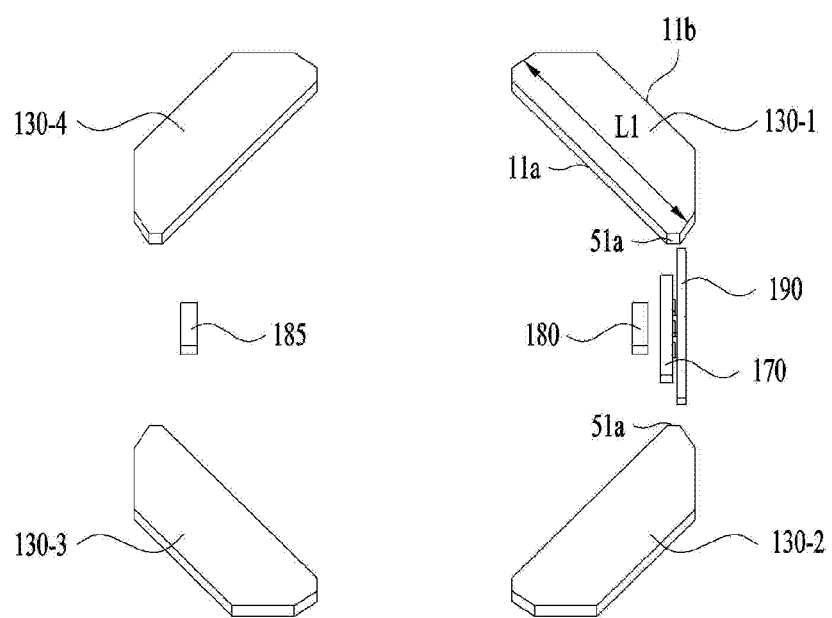
FIG. 15 shows arrangement of the first magnets, second and third magnets, the first position sensor, and the circuit board.

FIG. 15 shows arrangement of the first magnets 130-1 to 130-4, the second and third magnets 180 and 185, the first position sensor 170, and the circuit board 190.

Referring to FIG. 15, the first position sensor 170 may be located between two magnets 130-1 and 130-2 disposed at two corners 142-1 and 142-2 of the housing 140.

For example, at least one of the first position sensor 170 or the circuit board 190 may be disposed between the first magnet 130-1 disposed at the first corner 142-1 and the second magnet 130-2 disposed at the second corner 142-2.

In addition, the second magnet 180 may be disposed between the first magnet 130-1 disposed at the first corner 142-1 and the second magnet 130-2 disposed at the second corner 142-4.

The second magnet 180 may overlap the first surface 11a of each of the first and second magnets 130-1 and 130-2 in a direction parallel to the direction from the first corner 142-1 to the second corner 142-2 of the housing 140.

In addition, the third magnet 185 may be disposed between a second magnet 130-2 disposed at the second corner 142-2 and a third magnet 130-3 disposed at the third corner 142-3.

The third magnet 185 may overlap the first surface 11a of each of the third and fourth magnets 130-3 and 130-4 in a direction parallel to the direction from the third corner 143-1 to the fourth corner 142-4 of the housing 140.

The first position sensor 170 may overlap the first magnet 130-1 and the second magnet 130-2 in a direction parallel to the direction from the first corner 142-1 to the second corner 142-2 of the housing 140, and may not overlap the first and second magnets 130-1 and 130-2 in a direction perpendicular to the direction from the first corner 142-1 to the second corner 142-2 of the housing 140.

For example, the first position sensor 170 may overlap a corner 51a of each of the first and second magnets 130-1 and 130-2 in a direction parallel to the direction from the first corner 142-1 to the second corner 142-2 of the housing 140.

Since the transverse lengths L1 and L2 of the first magnets 130-1 and 130-2 decrease in directions from the center of the housing 140 to the corners 142-1 and 142-2 of the housing 140, magnetic field interference between the second magnet 180 and the first magnets 130-1 and 130-2 may be reduced.

Since magnetic field interference between the second magnet 180 and the first magnets 130-1 and 130-2 is alleviated in the embodiment, it is possible to prevent a reduction in AF driving force due to magnetic field interference and thus to obtain desired AF driving force without a separate yoke.

Since the transverse lengths of the first magnets 130-3 and 130-4 decrease in directions from the center of the housing 140 to the corners 142-3 and 142-4 of the housing 140, magnetic field interference between the third magnet 185 and the first magnets 130-3 and 130-4 may be reduced.

In the embodiment, as described above, it is possible to reduce the number of supporting members and to reduce the size of the lens moving apparatus due to a reduction in the number of supporting members.

In addition, since the number of supporting members is reduced, it is possible to reduce resistance of the supporting members, whereby it is possible to reduce consumption of current and to improve sensitivity of OIS driving.

In addition, it is possible to increase the thickness of the supporting members in order to obtain the same elastic force instead of reducing the number of supporting members, and it is possible to reduce the influence of external impact on the OIS operation unit as the thickness of the supporting members is increased.

In another embodiment, the first coil 120 may be connected to the circuit board 190 via the lower springs, the supporting members, and the upper springs. For such connection, the upper elastic member may include six upper springs, and the lower elastic member may include two lower springs.

Six supporting members may be included. Two supporting members may be disposed at each of two corners of the housing 140 so as to face each other, and one supporting member may be disposed at each of the other two corners so as to face each other.

Figure 16A:
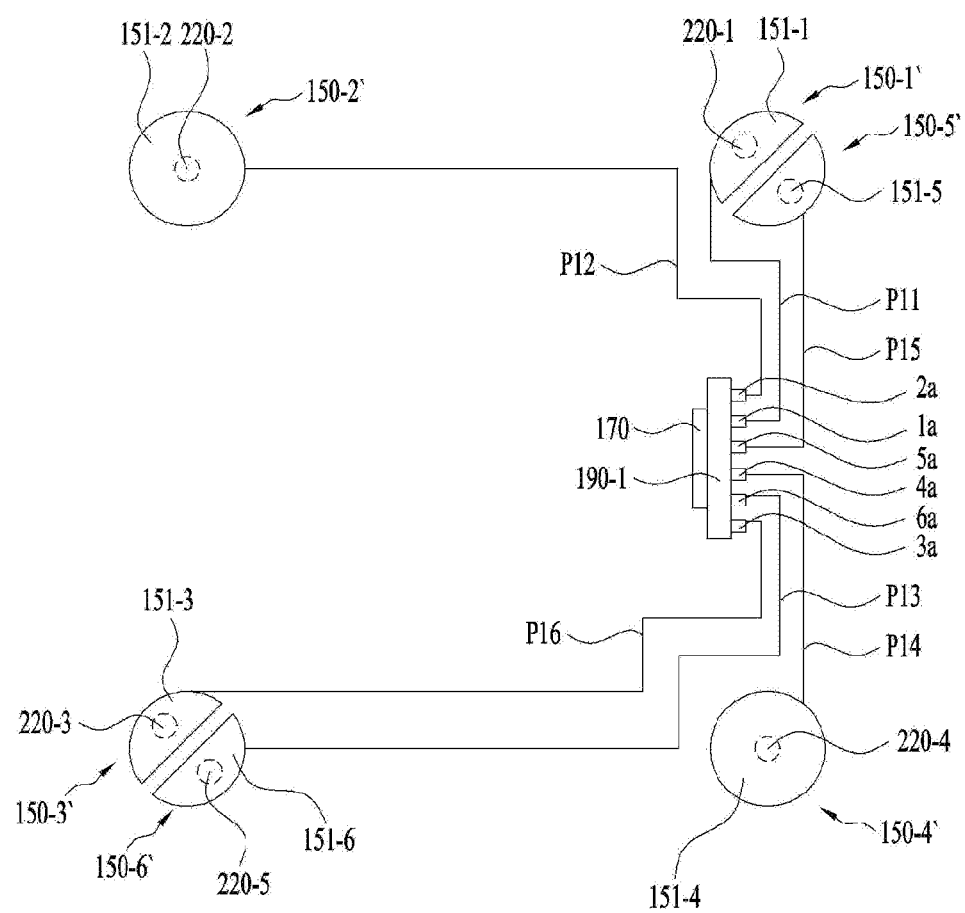
FIG. 16A is a conceptual view showing a connection relationship among first outer frames of first to sixth upper springs, a first coil, and a circuit board according to another embodiment.

FIG. 16A is a conceptual view showing a connection relationship among first outer frames of first to sixth upper springs 150-1' to 150-6', a first coil 120, and a circuit board 190-1 according to another embodiment.

Referring to FIG. 16A, the circuit board 190-1 may be disposed at the first side portion 141-1 of the housing, and may include six pads 1a to 6a. The six pads 1a to 6a may be disposed on at least one of a first surface or a second surface of the circuit board 190-1, and may be located at an upper end portion S1 thereof.

For example, first outer frames 151-1 to 151-4 of the first to fourth upper springs 150-1' to 150-4' may be disposed at the first to fourth corners 142-1 to 142-4 of the housing 140.

A first outer frame 151-5 of the fifth upper spring 150-5' may be disposed at one of the first to fourth corners 142-1 to 142-4, and a first outer frame 151-6 of the sixth upper spring 150-6' may be disposed at another of the first to fourth corners 142-1 to 142-4.

For example, the first outer frames 151-1 and 151-5 of the first and fifth upper springs 150-1' and 150-5' may be disposed at the first corner 142-1 of the housing 140 so as to be spaced apart from each other, and the first outer frames 151-3 and 151-6 of the third and sixth upper springs 150-3' and 150-6' may be disposed at the third corner 142-3 of the housing 140 so as to be spaced apart from each other.

The first outer frames 151-1 to 151-6 of the first to sixth upper springs 150-1' to 150-6' may include first coupling portions coupled to supporting members 220-1 to 220-6, second coupling portions coupled to the corners of the housing 140, connection portions for interconnecting the first coupling portions and the second coupling portions, and extension portions P11 to P16 extending from the first coupling portions toward the pads 1a to 6a of the circuit board 190-1.

Although not shown in FIG. 16A, at least one of the first to sixth upper springs 150-1' to 150-6' may include a first inner frame coupled to the bobbin 110 and a first frame connection portion for interconnecting the first inner frame and the first outer frame.

For direct coupling to the pads 1a to 6a of the circuit board 190-1, at least a portion of each of the first to sixth extension portions P11 to P16 may be disposed at the first side portion 141-1 of the housing 140 (for example, the upper portion, the upper surface, or the upper end of the first side portion 141-1).

One end of each of the first to fourth supporting members 220-1 to 220-4 may be coupled to the first coupling portion of a corresponding one of the first outer frames 151-1 to 151-4 of the first to fourth upper springs 150-1' to 150-4'. The other end of each of the first to fourth supporting members 220-1 to 220-4 may be coupled to the circuit board 250, and may be connected to a corresponding one of the terminals of the circuit board 250.

One end of each of the fifth and sixth supporting members 220-5 and 220-6 may be coupled to the first coupling portion of a corresponding one of the first outer frames 151-5 and 151-6 of the fifth and sixth upper springs 150-5' and 150-6'. The other end of each of the fifth and sixth supporting members 220-5 and to 220-6 may be coupled to the second outer frame of a corresponding one of the first and second lower springs.

The first coil 120 may be coupled to the second inner frames of the first and second lower springs, and may be connected thereto. Consequently, the first coil 120 may be connected to the first and second lower springs, to the fifth and sixth supporting members 220-5 and 220-6 connected thereto, and to the fifth and sixth upper springs 150-5' and 150-6', and the first coil 120 may be connected to the pads 5a and 6a of the circuit board 190-1 via the extension portions P15 and P16.

Figure 16B:
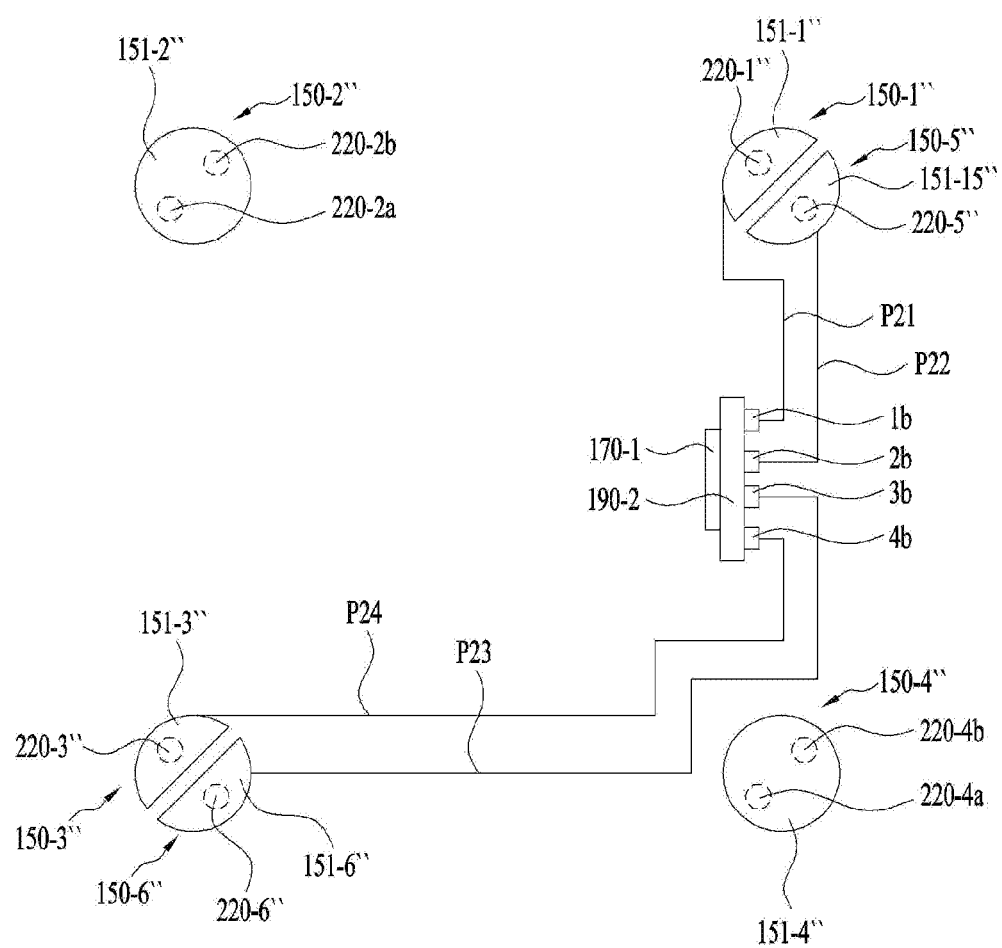
FIG. 16B is a conceptual view showing a connection relationship among first outer frames of first to sixth upper springs, a first coil, and a circuit board according to another embodiment.

FIG. 16B is a conceptual view showing a connection relationship among first outer frames of first to sixth upper springs 150-1" to 150-6", a first coil 120, and a circuit board 190-2 according to another embodiment.

Referring to FIG. 16B, a first position sensor 170-1 may be realized as a position detection sensor, such as a Hall sensor including no driver, alone. The circuit board 190-1 may be disposed at the first side portion 141-1 of the housing 140, and may include four pads 1b to 4b.

The upper elastic member 150 may include first to sixth upper springs 150-1" to 150-6".

The first to fourth upper springs 150-1" to 150-4" may include first outer frames 151-1" to 151-4" disposed at the corners 142-1 to 142-4 of the housing 140, and the fifth and sixth upper springs 150-5" and 150-6" may include first outer frames 151-5" and 151-6" disposed at the first and third corners 142-1 and 142-3 of the housing 140.

The first upper springs 150-1", the third upper springs 150-3", the fifth upper springs 150-5", and the sixth upper springs 150-6" may include extension portions P21 to P24 extending from the first outer frames 151-1", 151-3", 151-5", and 151-6" to the pads 1b to 4b of the circuit board 190-2. Each of the extension portions P21 to P24 may be coupled to a corresponding one of the pads 1b to 4b.

The supporting member 220 may include eight supporting members 220-1", 220-2a, 220-2b, 220-3", 220-4a, 220-4b, 220-5", and 220-6".

Two supporting members may be disposed at each of the corners 142-1 to 142-4 of the housing 140.

Each of the four supporting members 220-1", 220-3", 220-5", and 220-6" may connect a corresponding one of the first upper springs 150-1", the third upper springs 150-3", the fifth upper springs 150-5", and the sixth upper springs 150-6" to the circuit board 250, and the first position sensor 170-1 and the circuit board 250 may be connected to each other.

One end of each of the two supporting members 220-2a and 220-2b may be connected to the first outer frame 151-2" of the second upper springs 150-2". For example, the first outer frame 151-2" of the second upper springs 150-2" may include two first coupling portions, and one end of each of the two supporting members 220-2a and 220-2b may be coupled to a corresponding one of the first coupling portions of the first outer frame 151-2".

One end of each of the two supporting members 220-4a and 220-4b may be connected to the first outer frame 151-4" of the fourth upper springs 150-4". For example, the first outer frame 151-4" of the fourth upper springs 150-4" may include two first coupling portions, and one end of each of the two supporting members 220-4a and 220-4b may be may be coupled to a corresponding one of the first coupling portions of the first outer frame 151-4".

In addition, the first coil 120 may be connected to two lower springs 160-1 and 160-2. The other end of the supporting member 220-2a may be connected to a second outer frame of the first lower spring 160-1, and the other end of the supporting member 220-2b may be connected to the circuit board 250 and may be connected to a corresponding one of the terminals of the circuit board.

The other end of the supporting member 220-4a may be connected to a second outer frame of the second lower spring 160-2, and the other end of the supporting member 220-4b may be connected to the circuit board 250 and may be connected to a corresponding one of the terminals of the circuit board 250.

That is, the first coil 120 may be connected to the circuit board 250 via the supporting members 220-2a, 220-2b, 220-4a, and 220-4b and the upper springs 150-2" and 150-4", and may directly receive a driving signal from the circuit board 250.

Figure 17:
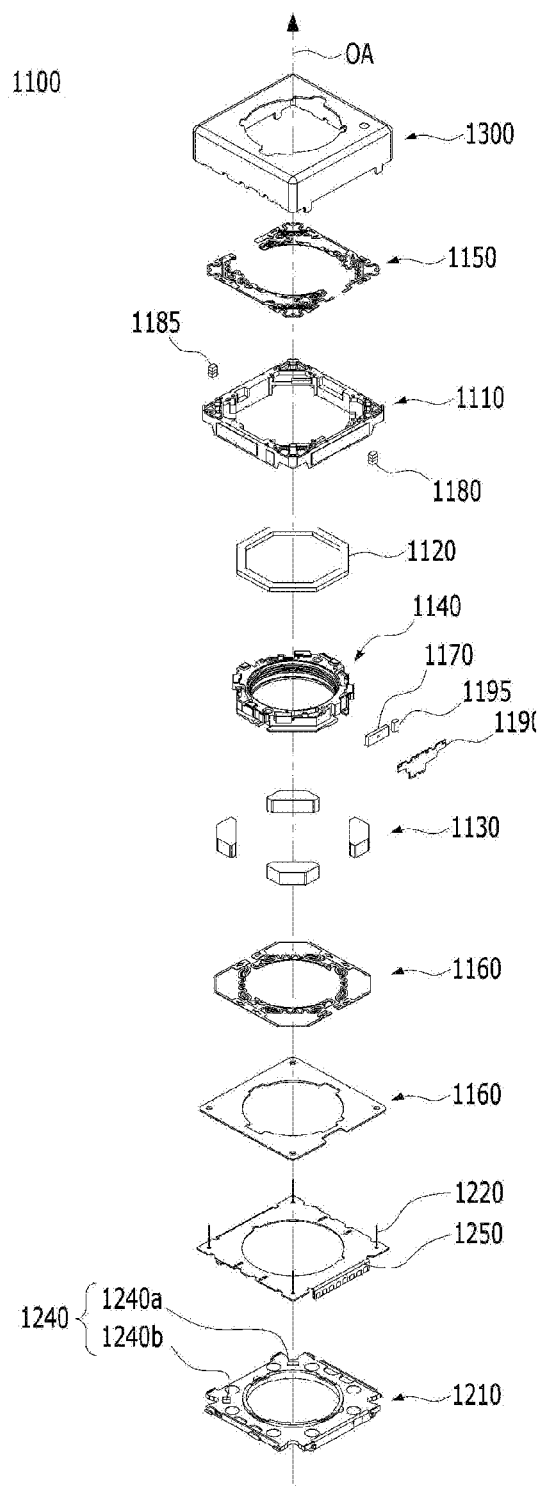
FIG. 17 is an exploded perspective view of a lens moving apparatus according to another embodiment.
Figure 18:
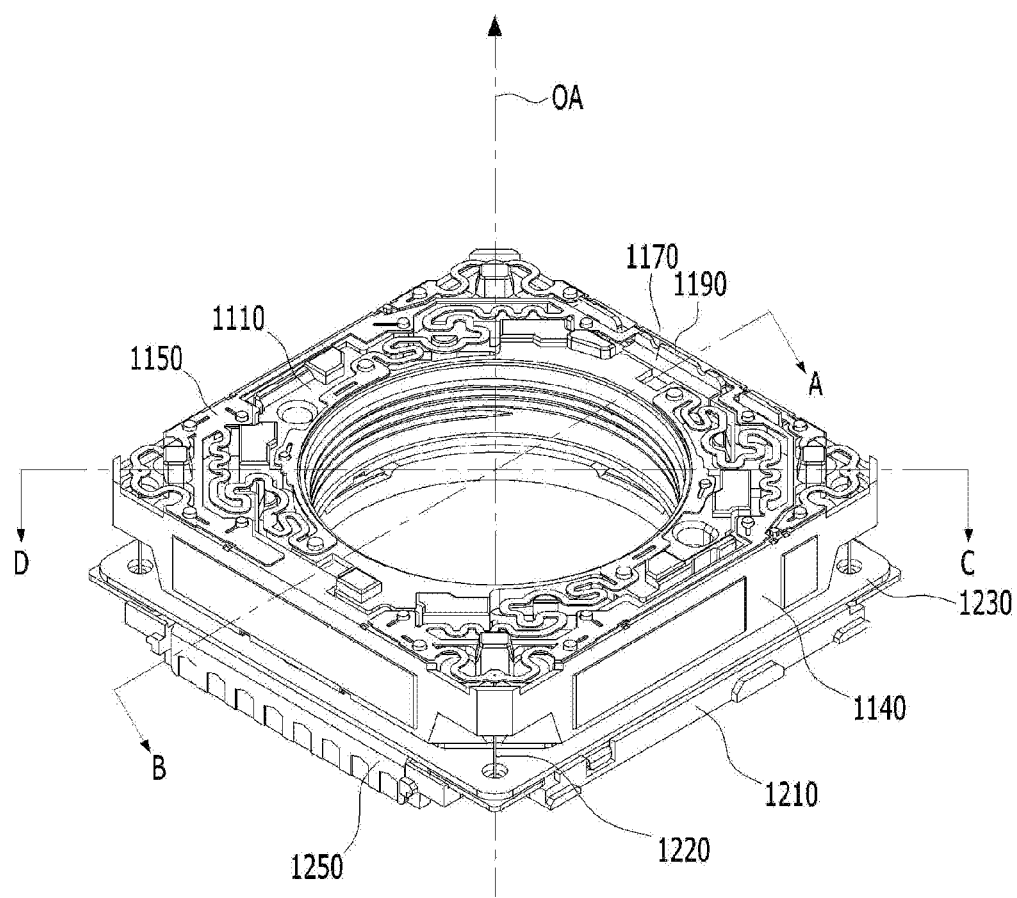
FIG. 18 is an assembled perspective view of the lens moving apparatus of FIG. 17 with a cover member removed.

FIG. 17 is an exploded perspective view of a lens moving apparatus 1100 according to another embodiment, and FIG. 18 is an assembled perspective view of the lens moving apparatus 1100 of FIG. 17 with a cover member 1300 removed.

Referring to FIGS. 17 and 18, the lens moving apparatus 1100 includes a bobbin 1110, a first coil 1120, a first magnet 1130, a housing 1140, an upper elastic member 1150, a lower elastic member 1160, a first position sensor 1170, a circuit board 1190, and a second magnet 1180.

In order to perform a handshake compensation function, the lens moving apparatus 1100 may further include a supporting member 1220, a second coil 1230, and a second position sensor 1240.

In addition, the lens moving apparatus 1100 may further include a third magnet 1185, a base 1210, a circuit board 1250, and a cover member 1300.

In addition, the lens moving apparatus 1100 may further include a capacitor 1195 mounted to the circuit board 1190.

Hereinafter, the "coil" may also be referred to as a coil unit, and the "elastic member" may also be referred to as an elastic unit or a spring.

The bobbin 1110 is disposed inside the housing 1140, and may be moved in the optical-axis (OA) direction or the first direction (e.g. the Z-axis direction) as the result of electromagnetic interaction between the first coil 1120 and the first magnet 1130.

Figure 19A:
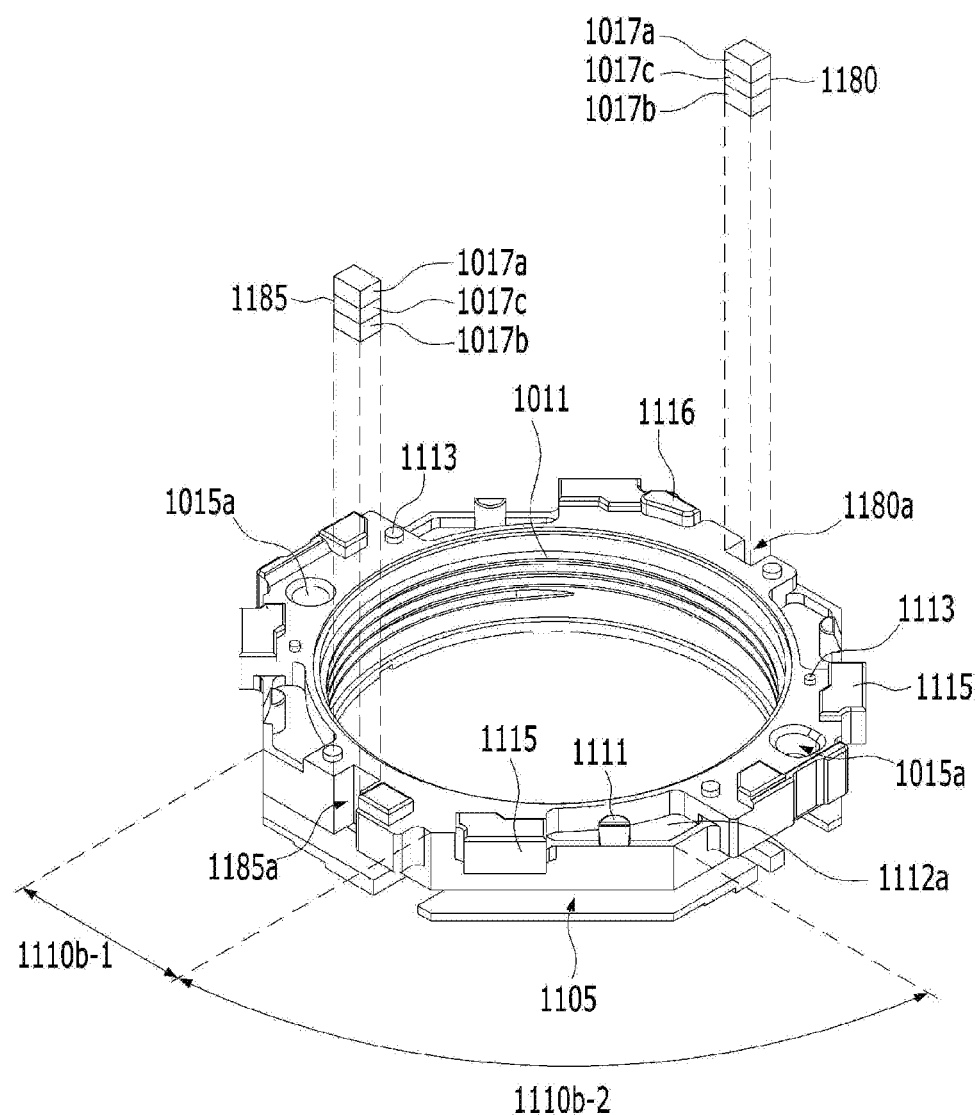
FIG. 19A is a perspective view of a bobbin, a second magnet, and a third magnet shown in FIG. 17.
Figure 19B:
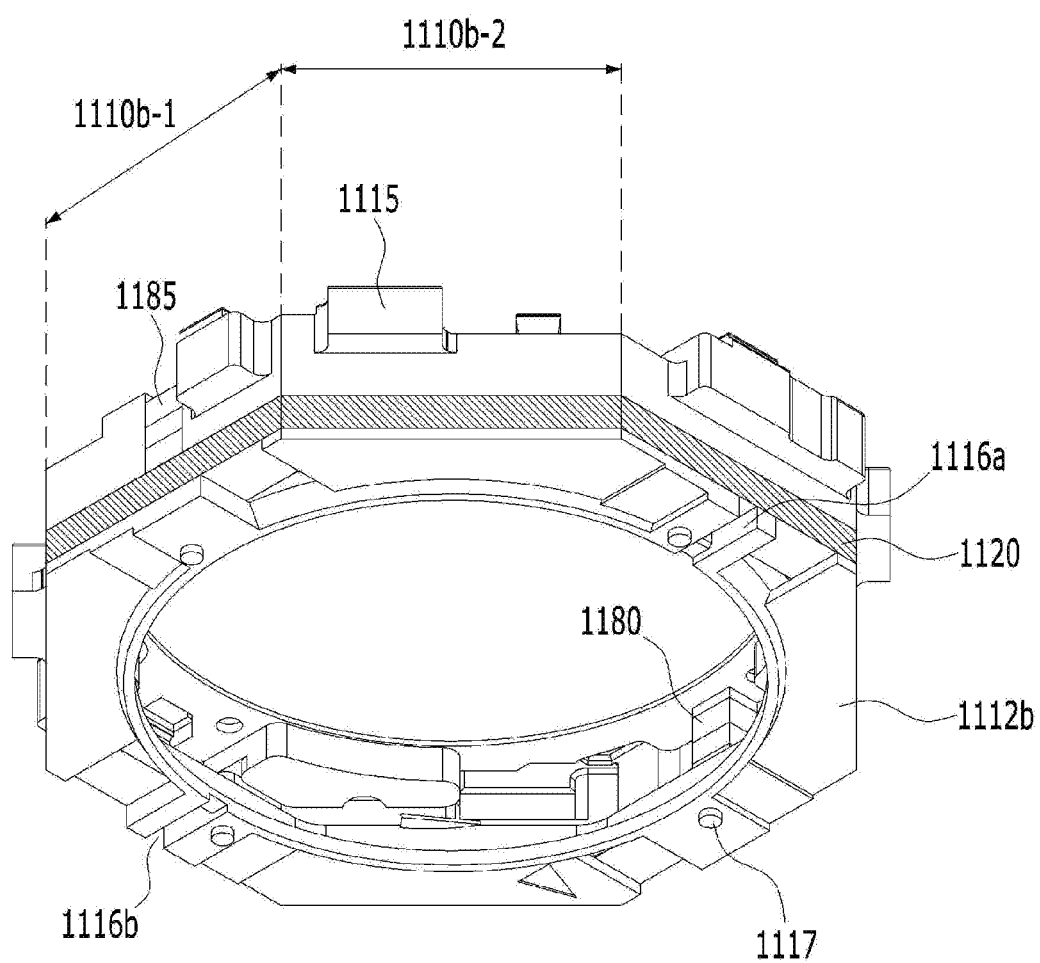
FIG. 19B shows a first coil coupled to a bobbin.

FIG. 19A is a perspective view of the bobbin 1110, the second magnet 1180, and the third magnet 1185 shown in FIG. 17, and FIG. 19B shows the first coil 1120 coupled to the bobbin 1110. In another embodiment, the description of the bobbin 1110, the second magnet 1180, the third magnet 1185, and the first coil 1120 may be applied to the bobbin 110, the second magnet 180, the third magnet 185, and the first coil 120 of FIG. 1, and vice versa.

Referring to FIGS. 19A and 19B, the bobbin 1110 may have an opening, in which a lens or a lens barrel is mounted. For example, the opening of the bobbin 1110 may be a through hole formed through the bobbin 1110 in the optical-axis direction, and the shape of the opening of the bobbin 1110 may be circular, oval, or polygonal. However, the disclosure is not limited thereto.

The lens may be directly mounted in the opening of the bobbin 1110. However, the disclosure is not limited thereto. In another embodiment, a lens barrel, in which at least one lens is mounted or coupled, may be coupled or mounted in the opening of the bobbin 1110. The lens or the lens barrel may be coupled to the inner circumferential surface of the bobbin 1110 in various manners.

The bobbin 1110 may include first side portions 1110b-1 spaced apart from each other and second side portions 1110b-2 spaced apart from each other. Each of the second side portions 1110*b*-2 may interconnect two adjacent first side portions. For example, the horizontal length or the transverse length of each of the first side portions 1110*b*-1 of the bobbin 1110 may be different from the horizontal length or the transverse length of each of the second side portions 1110*b*-2 thereof.

The bobbin 1110 may be provided at the outer surface thereof with a protrusion 1115. For example, the protrusion 1115 may be disposed at the outer surface of each of the second side portions 1110*b*-2 of the bobbin 1110. However, the disclosure is not limited thereto. The protrusion 1115 may protrude in a direction parallel to a straight line that passes through the center of the opening of the bobbin 1110 and is perpendicular to the optical axis. However, the disclosure is not limited thereto.

The protrusion 1115 of the bobbin 1110 may correspond to a recess 1025*a* of the housing 1140, may be inserted into or disposed in the recess 1025*a* of the housing 1140, and may inhibit or prevent the bobbin 1110 from being rotated about the optical axis while deviating from a predetermined range.

In addition, the protrusion 115 may serve as a stopper for inhibiting and preventing the lower surface of the bobbin 1110 from directly colliding with the base 1210, the second coil 1230, or the circuit board 1250 even when the bobbin 1110 is moved in the optical-axis direction (e.g. the direction from the upper elastic member 1150 to the lower elastic member 1160) while deviating from the predetermined range due to external impact.

A first escape recess 1112*a* for avoiding spatial interference with a first frame connection portion 1153 of the upper elastic member 1150 may be provided in the upper surface of the bobbin 1110. For example, the first escape recess 1112*a* may be disposed at each of the second side portions 1110*b*-2 of the bobbin 1110. However, the disclosure is not limited thereto.

The bobbin 1110 may be provided at the upper surface thereof with a guide portion 1111 for guiding the installation position of the upper elastic member 1150. For example, as shown in FIG. 19A, the guide portion 1111 of the bobbin 1110 may be disposed in the first escape recess 1112*a* in order to guide a path along which the frame connection portion 1153 of the upper elastic member 1150 extends. For example, the guide portion 1111 may protrude from the bottom surface of the first escape recess 1112*a* in the optical-axis direction.

The bobbin 1110 may include a stopper 1116 protruding from the upper surface thereof.

The stopper 1116 of the bobbin 1110 may serve to prevent the upper surface of the bobbin 1110 from directly colliding with the inside of an upper plate of the cover member 1300 even in the case in which the bobbin 1110 is moved while deviating from the predetermined range due to external impact when the bobbin 1110 is moved in the first direction in order to perform an autofocus function.

The bobbin 1110 may include a first coupling portion 1113, which is coupled and fixed to the upper elastic member 1150. For example, in FIG. 19A, the first coupling portion 1113 of the bobbin 1110 is a protrusion. However, the disclosure is not limited thereto. In another embodiment, the first coupling portion of the bobbin 1110 may be a recess or a plane.

In addition, the bobbin 1110 may include a second coupling portion 1117, which is coupled and fixed to the lower elastic member 1160. In FIG. 19B, the second coupling portion 1117 of the bobbin 1110 is a protrusion. However, the disclosure is not limited thereto. In another embodiment, the second coupling portion of the bobbin 1110 may be a recess or a plane.

A settlement recess 1105, in which the first coil 1120 is settled, inserted, or disposed, may be provided in the outer surface of the bobbin 1110. The settlement recess 1105 may be a recess formed inwardly from the outer surface of each of the first and second side portions 1110*b*-1 and 1110*b*-2 of the bobbin 1110, and may have a shape coinciding with the shape of the first coil 1120 or a closed-loop shape (e.g. a ring shape).

In addition, guide recesses 1116*a* and 1116*b* may be provided in the lower surfaces of two first side portions 1110*b*-1 or two second side portions 1110*b*-2 of the bobbin 1110 located so as to be opposite each other in order to inhibit separation of the coil 1120 and to guide both ends of the coil 1120 when the coil is connected to lower elastic members 1160-1 and 1160-2.

In addition, a settlement recess 1180*a*, in which the second magnet 1180 is settled, inserted, fixed, or disposed, may be provided in the outer surface of the bobbin 1110.

The settlement recess 1180*a* of the bobbin 1110 may have a structure recessed from the outer surface of the bobbin 1110, and may have an opening formed in at least one of the upper surface or the lower surface of the bobbin 1110. However, the disclosure is not limited thereto.

In addition, a settlement recess 1185*a*, in which the third magnet 1185 is settled, inserted, fixed, or disposed, may be provided in the outer surface of the bobbin 1110.

The settlement recess 1185*a* of the bobbin 1110 may have a structure recessed from the outer surface of the bobbin 1110, and may have an opening formed in at least one of the upper surface or the lower surface of the bobbin 1110. However, the disclosure is not limited thereto.

Each of the settlement recesses 1180*a* and 1185*a* of the bobbin 1110 may be located at the upper side of the settlement recess 1105, in which the first coil 1120 is disposed, and may be connected to or may abut the settlement recess 1105. However, the disclosure is not limited thereto. In another embodiment, both may be spaced apart from each other.

The settlement recess 1180*a* of the bobbin 1110 may be provided at one of the first side portions 1110*b*-1 of the bobbin 1110, and the settlement recess 1185*a* of the bobbin 1110 may be provided at another of the first side portions 1110*b*-1 of the bobbin 1110.

For example, the settlement recesses 1180*a* and 1185*a* may be disposed at two facing first side portions or two opposite first side portions.

Since the second magnet 1180 and the third magnet 1185 are disposed in the settlement recesses 1180*a* and 1185*a* provided in two first side portions of the bobbin 1110 located so as to be opposite each other, the second magnet 1180 and the third magnet 1185 may be balanced in weight, influence on AF driving force due to magnetic field interference between the first magnet 1130 and the second magnet 1180 and influence on AF driving force due to magnetic field interference between the first magnet 1130 and the third magnet 1185 may be offset, whereby accuracy in autofocus (AF) driving may be improved in the embodiment.

A screw thread 1011 for coupling with the lens or the lens barrel may be provided in the inner circumferential surface of the bobbin 1110. The screw thread 1011 may be formed in the inner circumferential surface of the bobbin 1110 in the state in which the bobbin 1110 is fixed using a jig. Jig fixing recesses 1015*a* and 1015*b* may be provided in the upper surface of the bobbin 1110. For example, the jig fixing recesses 1015a and 1015b may be provided in the upper surfaces of two first side portions 1110b-1 or two second side portions 1110b-2 of the bobbin 1110 located so as to be opposite each other. However, the disclosure is not limited thereto. The jig fixing recesses 1015a and 1015b may also perform the function of a foreign matter collection unit for collecting foreign matter.

The first coil 1120 is disposed on the outer surface of the bobbin 1110.

The first coil 1120 may be disposed under the second and third magnets 1180 and 1185. However, the disclosure is not limited thereto. For example, the first coil 1120 may be disposed under the protrusion 1115 of the bobbin 1110. However, the disclosure is not limited thereto.

For example, the first coil 1120 may not overlap the second and third magnets 1180 and 1185 in a direction perpendicular to the optical axis. However, the disclosure is not limited thereto.

For example, the first coil 1120 may be disposed in the settlement recess 1105 of the bobbin 1110, the second magnet 1180 may be inserted into or disposed in the settlement recess 1180a of the bobbin 1110, and the third magnet 1185 may be inserted into or disposed in the settlement recess 1185a of the bobbin 1110.

Each of the second magnet 1180 and the third magnet 1185 disposed at the bobbin 1110 may be spaced apart from the first coil 1120 in the optical-axis (OA) direction. However, the disclosure is not limited thereto. In another embodiment, each of the second magnet 1180 and the third magnet 1185 disposed at the bobbin 1110 may abut the first coil 1120, or may overlap the first coil 1120 in a direction perpendicular to the optical axis.

The first coil 1120 may wrap the outer surface of the bobbin 1110 in a direction that rotates about the optical axis OA.

The first coil 1120 may be directly wound around the outer surface of the bobbin 1110. However, the disclosure is not limited thereto. In another embodiment, the first coil 1120 may be wound around the bobbin 1110 using a coil ring, or may be configured as an angular ring-shaped coil block.

A power or driving signal may be provided to the first coil 1120. The power or driving signal provided to the first coil 1120 may be a direct-current signal or an alternating-current signal, or may include the direct-current signal and the alternating-current signal, and may have the form of voltage or current.

When a driving signal (e.g. driving current) is supplied to the first coil 1120, electromagnetic force may be formed through electromagnetic interaction between the first coil and the first magnet 1130, and the bobbin 1110 may be moved in the optical-axis (OA) direction by the formed electromagnetic force.

At an initial position of an AF operation unit, the bobbin 1110 may be moved in an upward or downward direction, which is referred to as bidirectional driving of the AF operation unit. Alternatively, at the initial position of the AF operation unit, the bobbin 1110 may be moved in the upward direction, which is referred to as unidirectional driving of the AF operation unit.

At the initial position of the AF operation unit, the first coil 1120 may be disposed so as to correspond to or overlap the first magnet 1130 disposed at the housing 1140 the first magnet in a direction perpendicular to the optical axis OA and parallel to a straight line passing through the optical axis.

For example, the AF operation unit may include the bobbin 1110 and components coupled to the bobbin 1110 (e.g. the first coil 1120 and the second and third magnets 1180 and 1185).

The initial position of the AF operation unit may be the original position of the AF operation unit in the state in which no power is applied to the first coil 1120 or the position at which the AF operation unit is located as the result of the upper and lower elastic members 1150 and 1160 being elastically deformed due only to the weight of the AF operation unit.

In addition, the initial position of the bobbin 1110 may be the position at which the AF operation unit is located when gravity acts in the direction from the bobbin 1110 to the base 1210 or when gravity acts in the direction from the base 1210 to the bobbin 1110.

The second magnet 1180 may also be referred to as a "sensing magnet" in that the second magnet provides a magnetic field that is sensed by the first position sensor 1170, and the third magnet 1185 may also be referred to as a "balancing magnet" in that the third magnet offsets the effect of a magnetic field of the sensing magnet 1180 and is provided for balancing in weight with the sensing magnet 1180.

The second magnet 1180 may be disposed in the settlement recess 1180a of the bobbin 1110, and may be disposed so as to face the first position sensor 1170.

A portion of one surface of the second magnet 1180 facing the first position sensor 1170 may be exposed from the settlement recess 1180a. However, the disclosure is not limited thereto. In another embodiment, a portion of one surface of the second magnet 1180 facing the first position sensor 1170 may not be exposed from the settlement recess 1180a.

For example, the interface between an N pole and an S pole of each of the second and third magnets 1180 and 1185 disposed at the bobbin 1110 may be parallel to a direction perpendicular to the optical axis OA. For example, the surfaces of the second and third magnets 1180 and 1185 facing the first position sensor 1170 may have an N pole and an S pole, respectively. However, the disclosure is not limited thereto.

For example, in another embodiment, the interface between the N pole and the S pole of each of the second and third magnets 1180 and 1185 disposed at the bobbin 1110 may be parallel to the optical axis OA.

For example, each of the second and third magnets 1180 and 1185 may be a monopolar magnetized magnet having a single N pole and a single S pole. However, the disclosure is not limited thereto. In another embodiment, each of the second and third magnets 1180 and 1185 may be a bipolar magnetized magnet or a four-polar magnet having two N poles and two S poles.

Each of the second and third magnets 1180 and 1185 may include a first magnet portion 1017a, a second magnet portion 1017b, and a partition 1017c disposed between the first magnet portion 1017a and the second magnet portion 1017b. Here, the partition 1017c may also be referred to as a "nonmagnetic partition."

The first magnet portion 1017a may include an N pole, an S pole, and a first border portion between the N pole and the S pole. The first border portion may be a portion having substantially no magnetism, may include a section having little polarity, and may be a portion that is naturally generated in order to form a magnet including a single N pole and a single S pole.

The second magnet portion 1017b may include an N pole, an S pole, and a second border portion between the N pole and the S pole. The second border portion may be a portion having substantially no magnetism, may include a section having little polarity, and may be a portion that is naturally generated in order to form a magnet including a single N pole and a single S pole.

The partition 1017c may be a portion that separates or isolates the first magnet portion 1017a and the second magnet portion 1017b, may be a portion having substantially no magnetism, and may be a portion having little polarity. For example, the partition may be a nonmagnetic material or air. The nonmagnetic partition may also be referred to as a "neutral zone."

The partition 1017c is a portion that is artificially formed when the first magnet portion 1017a and the second magnet portion 1017b are magnetized, and the width of the partition 1017c may be larger than the width of the first border portion (or the width of the second border portion). Here, the width of the partition 1017c may be the length of the partition in the direction from the first magnet portion 1017a to the second magnet portion 1017b. The width of the first border portion (or the width of the second border portion) may be the length of the first border portion in the direction from the N pole to the S pole of each of the first and second magnet portions 1017a and 1017b.

The second magnet 1180 may be moved together with the bobbin 1110 in the optical-axis direction, and the first position sensor 1170 may sense the intensity of a magnetic field or magnetic force of the second magnet 1180 moved in the optical-axis direction, and may output an output signal based on the result of sensing.

For example, the intensity of the magnetic field or the magnetic force sensed by the first position sensor 1170 may vary depending on the displacement of the bobbin 1110 in the optical-axis direction, the first position sensor 1170 may output an output signal proportional to the sensed intensity of the magnetic field, and the displacement of the bobbin 1110 in the optical-axis direction may be sensed using the output signal of the first position sensor 1170.

The housing 1140 receives the bobbin 1110 therein, and supports the first magnet 1130, the first position sensor 1170, and the circuit board 1190.

Figure 20A:
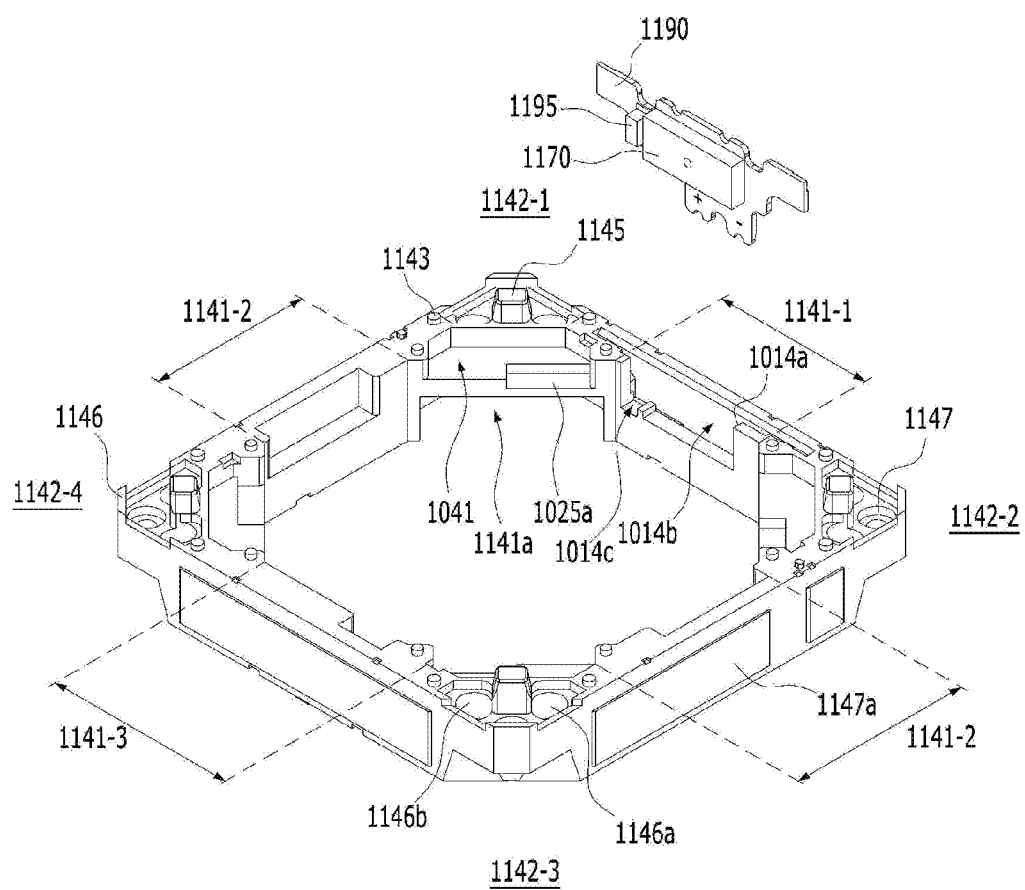
FIG. 20A is a perspective view of a housing, a circuit board, a first position sensor, and a capacitor shown in FIG. 17.
Figure 20B:
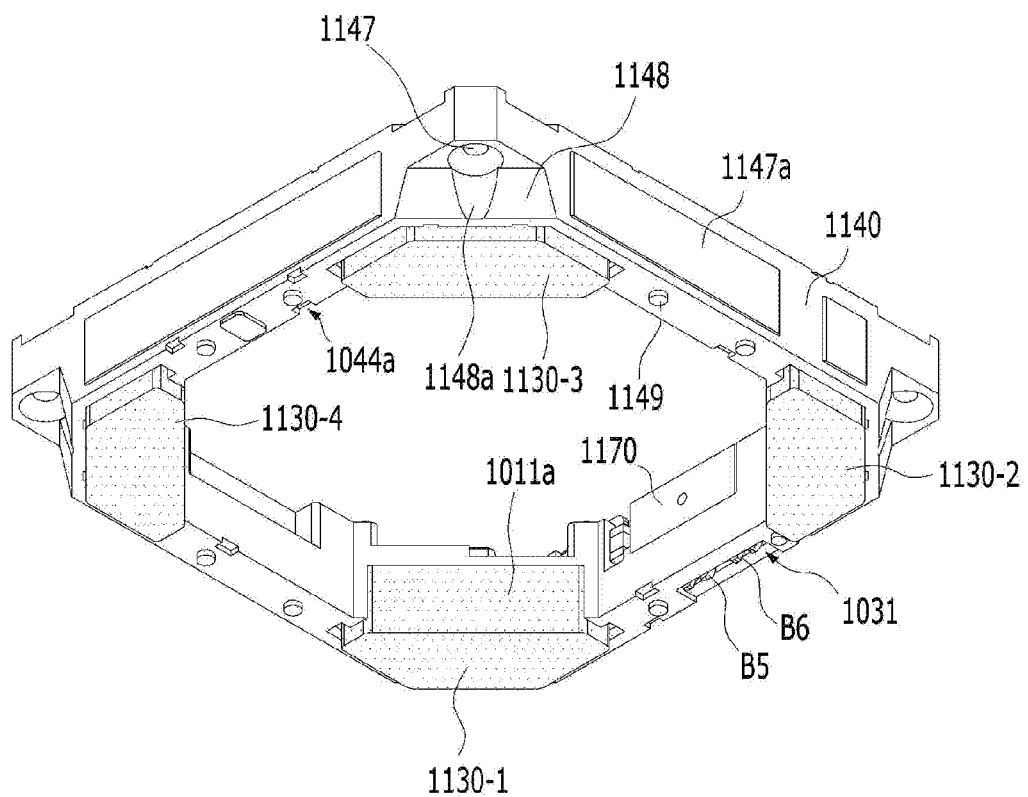
FIG. 20B is a coupled perspective view of the housing, a first magnet, the circuit board, the first position sensor, and the capacitor.

FIG. 20A is a perspective view of the housing 1140, the circuit board 1190, the first position sensor 1170, and the capacitor 1195 shown in FIG. 17, and FIG. 20B is a coupled perspective view of the housing 1140, the first magnet 1130, the circuit board 1190, the first position sensor 1170, and the capacitor 1195. In another embodiment, the description of the housing 1140, the circuit board 1190, the first position sensor 1170, and the capacitor 1195 may be applied to the housing 140, the circuit board 190, the first position sensor 170, and a capacitor of FIG. 1, and vice versa.

Referring to FIGS. 20A and 20B, the housing 1140 may generally have a hollow pillar shape. For example, the housing 1140 may have a polygonal (e.g. quadrangular or octagonal) or circular opening, and an opening of the housing 1140 may be a through hole formed through the housing 1140 in the optical-axis direction.

The housing 1140 may include a plurality of side portions 1141-1 to 1141-4 and a plurality of corners 1142-1 to 1142-4.

For example, the housing 1140 may include first to fourth side portions 1141-1 to 1141-4 spaced apart from each other and first to fourth corners 1142-1 to 1142-4 spaced apart from each other.

Each of the corners 1142-1 to 1142-4 of the housing 1140 may be disposed or located between two adjacent side portions 1141-1 and 1141-2, 1141-2 and 1141-3, 1141-3 and 1141-4, or 1141-4 and 1141-1, and may interconnect the side portions 1141-1 to 1141-4.

For example, the corners 1142-1 to 1142-4 may be located at the corner portions of the housing 1140. For example, the number of side portions of the housing 1140 may be four, and the number of corners thereof may be four. However, the disclosure is not limited thereto. The number of side portions may be five or more, and the number of corners may be five or more.

Each of the side portions 1141-1 to 1141-4 of the housing 1140 may be disposed parallel to a corresponding one of the side plates of the cover member 1300.

For example, the side portions 1141-1 to 1141-4 of the housing 1140 may correspond to the first side portions 1110b-1 of the bobbin 1110, and the corners 1142-1 to 1142-4 of the housing 1140 may correspond to or may be opposite the second side portions 1110b-2 of the bobbin 1110.

The first magnet 1130 may be disposed or installed at each of the corners 1142-1 to 1142-4 of the housing 1140.

For example, a settlement portion 1141a or a receiving portion for receiving the magnet 1130 may be provided in each of the corner portions or the corners 1142-1 to 1142-4 of the housing 1140.

The settlement portion 1141a of the housing 1140 may be provided in the lower portion or the lower end of at least one of the corners 1142-1 to 1142-4 of the housing 1140.

For example, the settlement portion 1141a of the housing 1140 may be provided inside the lower portion or the lower end of each of the four corners 1142-1 to 1142-4.

The settlement portion 1141a of the housing 1140 may be a recess having a shape corresponding to the first magnet 1130, e.g. a concave recess. However, the disclosure is not limited thereto.

For example, a first opening may be formed in the side surface of the settlement portion 1141a of the housing 1140 facing the first coil 1120, and a second opening may be formed in the lower surface of the settlement portion 1141a of the housing 1140 facing the second coil 1230, for easy mounting of the first magnet 1130.

For example, a first surface 1011a of the first magnet 1130 fixed or disposed in the settlement portion 1141a of the housing 1140 may be exposed through the first opening of the settlement portion 1141a. In addition, a lower surface 1011c of the first magnet 1130 fixed or disposed in the settlement portion 1141a of the housing 1140 may be exposed through the second opening of the settlement portion 1141a.

The housing 1140 may have an escape recess 1041 provided in the upper surface of each of the corners in order to avoid spatial interference with the first frame connection portion 1153 of the upper elastic member 1150.

For example, the escape recess 1041 of the housing 1140 may be depressed from the upper surface of the housing 1140, and may be located so as to be closer to the center of the housing 1140 than a stopper 1145 or an adhesive injection hole 1147. For example, the escape recess 1041 may be located inside the stopper 1145 of the housing 1140, which is a direction toward the center of the housing 1140, and adhesive injection holes 1146a and 1146b may be located outside the stopper, which is the opposite direction.

A recess 1025a may be provided in each of the corners 1142-1 to 1142-4 of the housing 1140 so as to correspond to or to be opposite the protrusion 1115 of the bobbin 1110. The recess 1025a of the housing 1140 may be located on the settlement portion 1141a of the housing 1140. For example, the recess 1025a of the housing 1140 may be formed at the bottom surface of the escape recess 1041. For example, the bottom surface of the recess 1025a may be located lower than the bottom surface of the escape recess 1041. The settlement portion 1141a of the housing 1140 may be located lower than the bottom surface of the escape recess 1041.

The first magnet 1130 may be fixed to the settlement portion 1141a using an adhesive. However, the disclosure is not limited thereto.

For example, at least one adhesive injection hole 1146a and 1146b for injecting an adhesive may be provided in each of the corners 1142-1 to 1142-4 of the housing 1140. The at least one adhesive injection hole 1146a and 1146b may be depressed from the upper surface of each of the corners 1142-1 to 1142-4.

The at least one adhesive injection hole 1146a and 1146b may include a through hole formed through each of the corners 1142-1 to 1142-4, and the adhesive injection holes 1146a and 1146b may be connected to or may communicate with the settlement portion 1141a of the housing 1140 and may expose at least a portion of the first magnet 1130 (for example, a portion of the upper surface of the magnet 1130). The adhesive injection holes 1146a and 1146b may expose at least a portion of the first magnet 1130 (for example, a portion of the upper surface of the magnet 1130), whereby the adhesive may be sufficiently coated on the first magnet 1130 and thus force of fixing between the first magnet 1130 and the housing 1140 may be increased.

The housing 1140 may be provided with at least one stopper 1147a protruding from the outer surfaces of the side portions 1141-1 to 1141-4. The at least one stopper 1147a may prevent the housing 1140 from colliding with the side plate of the cover member 1300 when moved in a direction perpendicular to the optical axis.

In order to prevent the lower surface of the housing 1140 from colliding with the base 1210 and/or the circuit board 1250, the housing 1140 may be further provided with a stopper (not shown) protruding from the lower surface thereof.

The housing 1140 may have a mounting recess 1014a (or a settlement recess) for receiving the circuit board 1190, a mounting recess 1014b (or a settlement recess) for receiving the first position sensor 1170, and a mounting recess 1014c (or a settlement recess) for receiving the capacitor 1195.

The mounting recess 1014a of the housing 1140 may be provided in the upper portion or the upper end of one of the side portions 1141-1 to 1141-4 of the housing 1140 (for example, 1141-1).

The mounting recess 1014a of the housing 1140 may be a recess, the upper portion of which is open and which has a side surface and a bottom, for easy mounting of the circuit board 1190, and may have an opening formed toward the inside of the housing 1140. The shape of the mounting recess 1014a of the housing 1140 may correspond to or coincide with the shape of the circuit board 1190.

The mounting recess 1014b of the housing 1140 may be provided in the inner surface of the first side portion 1141-1 of the housing 1140, and may be connected to the mounting recess 1014a.

The mounting recess 1014c of the housing 1140 may be disposed at one side of the mounting recess 1014b, and a protrusion or a projection for separating or isolating the capacitor 1195 and the first position sensor 1170 from each other may be provided between the mounting recess 1014b and the mounting recess 1014c. The reason for this is that the capacitor 1195 and the first position sensor 1170 are located adjacent to each other in order to reduce the length of a path for connection therebetween, thereby reducing noise due to an increase in length of the path.

The capacitor 1195 may be disposed or mounted on a second surface 1019a of the circuit board 1190.

The capacitor 1195 may have the form of a chip. In this case, the chip may include a first terminal corresponding to one end of the capacitor 1195 and a second terminal corresponding to the other end of the capacitor 1195. The capacitor 1195 may also be referred to as a "capacitive element" or a condenser.

In another embodiment, the capacitor may be realized so as to be included in the circuit board 1190. For example, the circuit board 1190 may have a capacitor including a first conductive layer, a second conductive layer, and an insulating layer (for example, a dielectric layer) disposed between the first conductive layer and the second conductive layer.

The capacitor 1195 may be connected in parallel to first and second terminals B1 and B2 of the circuit board 1190 for providing power (or a driving signal) to the position sensor 1170 from the outside.

Alternatively, the capacitor 1195 may be connected in parallel to terminals of the first position sensor 1170 connected to the first and second terminals B1 and B2 of the circuit board 1190.

For example, one end of the capacitor 1195 (or the first terminal of the capacitor chip) may be connected to the first terminal B1 of the circuit board 1190, and the other end of the capacitor 1195 (or the second terminal of the capacitor chip) may be connected to the second terminal B2 of the circuit board 1190.

Since the capacitor 1195 is connected in parallel to the first and second terminals B1 and B2 of the circuit board 1190, the capacitor may serve as a smoothing circuit for removing a ripple component from power signals GND and VDD provided to the first position sensor 1170 from the outside, whereby a stable and uniform power signal may be provided to the first position sensor 1170.

Since the capacitor 1195 is connected in parallel to the first and second terminals B1 and B2 of the circuit board 1190, the capacitor may protect the first position sensor 1170 from high-frequency noise or ESD introduced from the outside.

In addition, the capacitor 1195 may prevent overcurrent caused by high-frequency noise or ESD introduced from the outside from being applied to the first position sensor 1170, and may prevent a phenomenon in which a value of calibration about displacement of the bobbin 1110 acquired based on an output signal of the first position sensor 1170 is reset due to the overcurrent.

In addition, the mounting recess 1014b of the housing 1140 may be open in the upper portion thereof for easy mounting of the first position sensor 1170, and may have an opening formed toward the inner surface of the first side portion 1141-1 of the housing 1140 in order to increase sensitivity in sensing. The shape of the mounting recess 1014b of the housing 1140 may correspond to or coincide with the shape of the first position sensor 1170.

For example, the circuit board 1190 may be fixed to the mounting recess 1014a of the housing 1140 using an adhesive. For example, the adhesive may be epoxy or double-side tape. However, the disclosure is not limited thereto.

Supporting members 1220-1 to 1220-4 may be disposed at the corners 1142-1 to 1142-4 of the housing 1140.

Holes 1147 defining paths along which the supporting members 1220-1 to 1220-4 extend may be provided in the corners 1142-1 to 1142-4 of the housing 1140. For example, the housing 1140 may include holes 1147 formed through the upper portions of the corners 1142-1 to 1142-4.

In another embodiment, the holes provided in the corners 1142-1 to 1142-4 of the housing 1140 may be depressed from the outer surfaces of the corners of the housing 1140, and at least a portion of each of the holes may be open toward the outer surface of a corresponding one of the corners. The number of holes 1147 of the housing 1140 may be equal to the number of supporting members.

One end of the supporting member 1220 may be connected or bonded to the upper elastic member 1150 via a corresponding one of the holes 1147.

For example, the diameter of each hole 1147 may gradually increase in the direction from the upper surface to the lower surface of the housing 1140 for easy application of a damper. However, the disclosure is not limited thereto. In another embodiment, the diameter of each hole 1147 may be uniform.

In order to define paths along which the supporting members 1220-1 to 1220-4 extend and to avoid spatial interference between the supporting members 1220-1 to 1220-4 and the corners 1142-1 to 1142-4 of the housing 1140, an escape recess 1148a may be provided in the outer surface 1148 of each of the corners 1142-1 to 1142-4. The escape recess 1148a may be connected to the hole 1147 of the housing 1140, and may be hemispherical or semi-oval. However, the disclosure is not limited thereto. The lower portion or the lower end of the escape recess 1148a may be connected to the lower surface of the housing 1140.

For example, the diameter of the escape recess 1148a may gradually decrease in the direction from the upper portion to the lower portion thereof. However, the disclosure is not limited thereto.

In addition, the housing 1140 may be provided on the upper portion, the upper end, or the upper surface thereof with a stopper 1145 in order to prevent the housing from directly colliding with the inner surface of the upper plate of the cover member 1300.

For example, the stopper 1145 may be provided at the upper surface of each of the corners 1142-1 to 1142-4 of the housing 1140. However, the disclosure is not limited thereto.

In addition, the housing 1140 may be provided on the lower portion, the lower end, or the lower surface thereof with a stopper (not shown) in order to prevent the lower surface of the housing 1140 from colliding with the base 1210 and/or the circuit board 1250.

In addition, the housing 1140 may be provided on the edge of the upper surface of each of the corners 1142-1 to 1142-4 thereof with a guide protrusion 1144 for preventing overflow of the damper.

For example, the hole 1147 of the housing 1140 may be located between the edge of the upper surface of each of the corners 1142-1 to 1142-4 of the housing 1140 (for example, the guide protrusion 1144) and the stopper 1145.

The housing 1140 may be provided on the upper portion, the upper end, or the upper surface thereof with at least one first coupling portion 1143 coupled to a first outer frame 1152 of the upper elastic member 1150.

The first coupling portion 1143 of the housing 1140 may be disposed at at least one of the side portions 1141-1 to 1141-4 or the corners 1142-1 to 1142-4 of the housing 1140.

The housing 1140 may be provided on the lower portion, the lower end, or the lower surface thereof with at least one second coupling portion 1149 coupled and fixed to a second outer frame 1162 of the lower elastic member 1160.

For example, each of the first and second coupling portions 1143 and 1149 of the housing 1140 may be a protrusion. However, the disclosure is not limited thereto. In another embodiment, the coupling portion may be a recess or a plane.

For example, the first coupling portion 1143 of the housing 1140 may be coupled to a hole 1152a of the first outer frame 1152 of the upper elastic member 1150, and the second coupling portion 1149 of the housing 1140 may be coupled to a hole 1162a of the second outer frame 1162 of the lower elastic member 1160, using an adhesive member (for example, solder) or thermal fusion.

In order to avoid spatial interference between each of second outer frames 1162-1 to 1162-3 and a second frame connection portion 1163 of the lower elastic member 1160, an escape recess 1044a may be provided in the lower surface of at least one of the side portions 1141-1 to 1141-4 of the housing 1140.

The first magnet 1130 may be disposed at at least one of the corner portions (or the corners 114201 to 1142-4) of the housing 1140. For example, the first magnet 1130 may be disposed at each of the corner portions of the housing 1140.

At the initial position of the AF operation unit, the first magnets 1130 (1130-1 to 1130-4) may be disposed at the housing 1140 such that at least a portion of each thereof overlaps the first coil 1120 in a direction perpendicular to the optical axis OA and parallel to a straight line passing through the optical axis OA.

For example, each of the first magnets 1130 (1130-1 to 1130-4) may be inserted into or disposed in the settlement portion 1141a of a corresponding one of the corners 1142-1 to 1142-4 of the housing 1140.

In another embodiment, the first magnet 1130 may be disposed at the outer surface of each of the corners 1142-1 to 1142-4 of the housing 1140.

The shape of the first magnet 1130 may be polyhedral such that the first magnet is easily settled at each corner of the housing 1140.

For example, the area of the first surface 1011a of the first magnet 1130 may be larger than the area of a second surface 1011b thereof. The first surface 1011a of the first magnet 1130 may be a surface facing one surface of the first coil 1120 (or the outer surface of the bobbin 1110), and the second surface 1011b thereof may be opposite the first surface 1011a.

For example, the transverse length of the second surface 1011b of the first magnet 1130 may be smaller than the transverse length of the first surface 1011a thereof.

For example, the transverse direction of the first surface 1011a of the first magnet 1130 may be a direction of the first surface 1011a of the first magnet 1130 perpendicular to the direction from the lower surface to the upper surface of the first magnet 1130 or a direction of the first surface 1011a of the first magnet 1130 perpendicular to the optical-axis direction.

For example, the transverse direction of the second surface 1011b of the first magnet 1130 may be a direction of the second surface 1011b of the first magnet 1130 perpendicular to the direction from the lower surface to the upper surface of the first magnet 1130 or a direction of the second surface 1011b of the first magnet 1130 perpendicular to the optical-axis direction.

For example, the first magnet 1130 may include a portion Q2 having a transverse length L2 gradually decreasing from the center of the housing 1140 to the corner 1142-1, 1142-2, 1142-3, or 1142-4 of the housing 1140.

For example, the first magnet 1130 may include a portion Q2 having a transverse length L2 decreasing from the first surface 1011a to the second surface 1011b of the first magnet 1130. For example, the transverse direction of the first magnet 1130 may be a direction parallel to the first surface 1011a of the first magnet 1130.

Each of the first magnets 1130-1 to 1130-4 may be configured in a single body, and may be disposed such that the first surface 1011a facing the first coil 1120 has an S pole and the second surface 1011b has an N pole. However, the disclosure is not limited thereto. In another embodiment, the first surface 1011a of each of the first magnets 1130-1 to 1130-4 may have an N pole, and the second surface 1011b thereof may have an S pole.

The first magnets may be disposed or installed at the corners of the housing 1140 such that at least two thereof face each other.

For example, two pairs of first magnets facing each other so as to intersect each other may be disposed at the corners 1142-1 to 1142-4 of the housing 1140. In this case, the planar shape of each of the first magnets 1130-1 to 1130-4 in the horizontal direction thereof may be polygonal, such as triangular, pentagonal, hexagonal, or rhombic.

In another embodiment, a pair of first magnets facing each other may be disposed at only two corners of the housing 1140 facing each other.

In another embodiment, the description of the first magnet 1130 may be applied to the first magnet 130 of FIG. 1, and vice versa.

Figure 21:
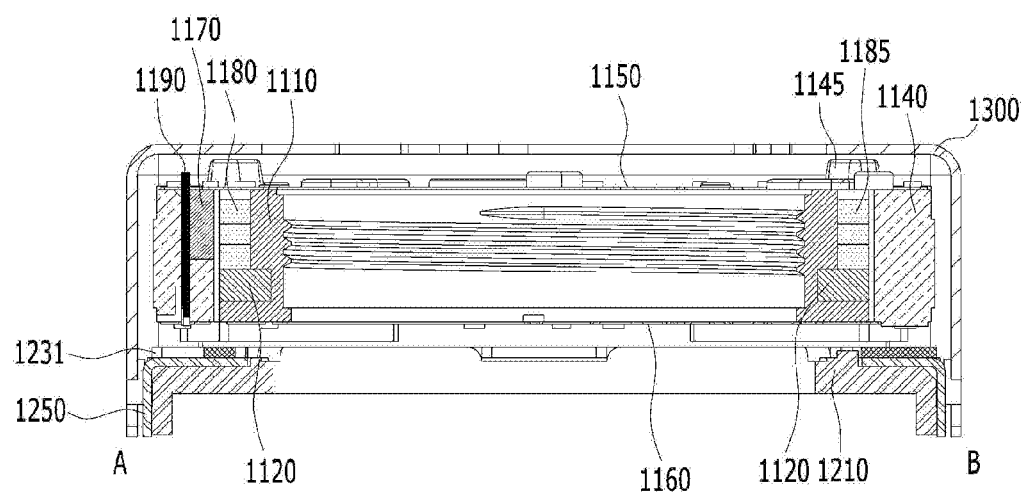
FIG. 21 is a sectional view of the lens moving apparatus shown in FIG. 18 in an AB direction.

FIG. 21 is a sectional view of the lens moving apparatus 1100 shown in FIG. 18 in an AB direction, and FIG. is a sectional view of the lens moving apparatus 1100 shown in FIG. 18 in a CD direction.

Figure 22:
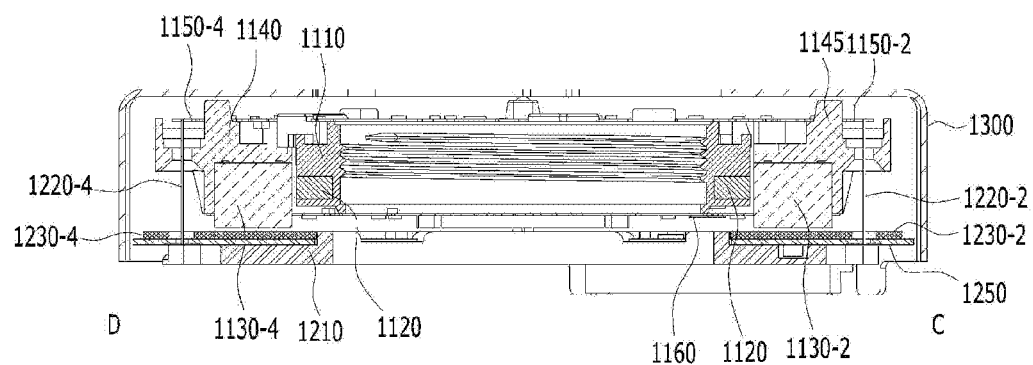
FIG. 22 is a sectional view of the lens moving apparatus shown in FIG. 18 in a CD direction.

Referring to FIGS. 21 and 22, each of the second and third magnets 1180 and 1185 may not overlap the first coil 1120 in a direction perpendicular to the optical axis OA or in a direction perpendicular to the optical axis and parallel to a straight line passing through the optical axis. However, the disclosure is not limited thereto. In another embodiment, each of the second and third magnets 1180 and 1185 may overlap the first coil 1120.

In addition, at the initial position of the AF operation unit, the second magnet 1180 may overlap or be aligned with the third magnet 1185 in a direction perpendicular to the optical axis OA or in a direction perpendicular to the optical axis and parallel to a straight line passing through the optical axis. However, the disclosure is not limited thereto.

In addition, at the initial position of the AF operation unit, the first position sensor 1170 may overlap each of the second and third magnets 1180 and 1185 in a direction perpendicular to the optical axis OA or in a direction perpendicular to the optical axis and parallel to a straight line passing through the optical axis. However, the disclosure is not limited thereto. In another embodiment, the first position sensor 1170 may not overlap at least one of the second or third magnet 1180 or 1185.

In addition, the first position sensor 1170 may not overlap the first magnet 1130 in a direction perpendicular to the optical axis OA or in a direction perpendicular to the optical axis and parallel to a straight line passing through the optical axis.

For example, the first position sensor 1170 may not overlap the first magnet 1130 in a direction from the first position sensor 1170 to the first coil 1120 or in a direction perpendicular to the outer surface of the first side portion 1141-1 of the housing 1140.

The circuit board 1190 may be disposed at the side portion 1141-1 of the housing 1140, and the first position sensor 1170 may be disposed or mounted on the circuit board 1190.

For example, the circuit board 1190 may be disposed in the mounting recess 1014a of the housing 1140.

For example, the circuit board 1190 may be disposed between the first corner 1142-1 and the second corner 1142-2 of the housing 1140, and first to fourth terminals B1 to B4 of the circuit board 1190 may be connected to the first position sensor 1170.

For example, the circuit board 1190 may not overlap an imaginary line that links one of the corners (for example, the first corner 1142-1) (or one of the corner portions) and the optical axis OA. The reason for this is that it is necessary to prevent spatial interference between the supporting member 1220 and the circuit board 1190.

Figure 23:
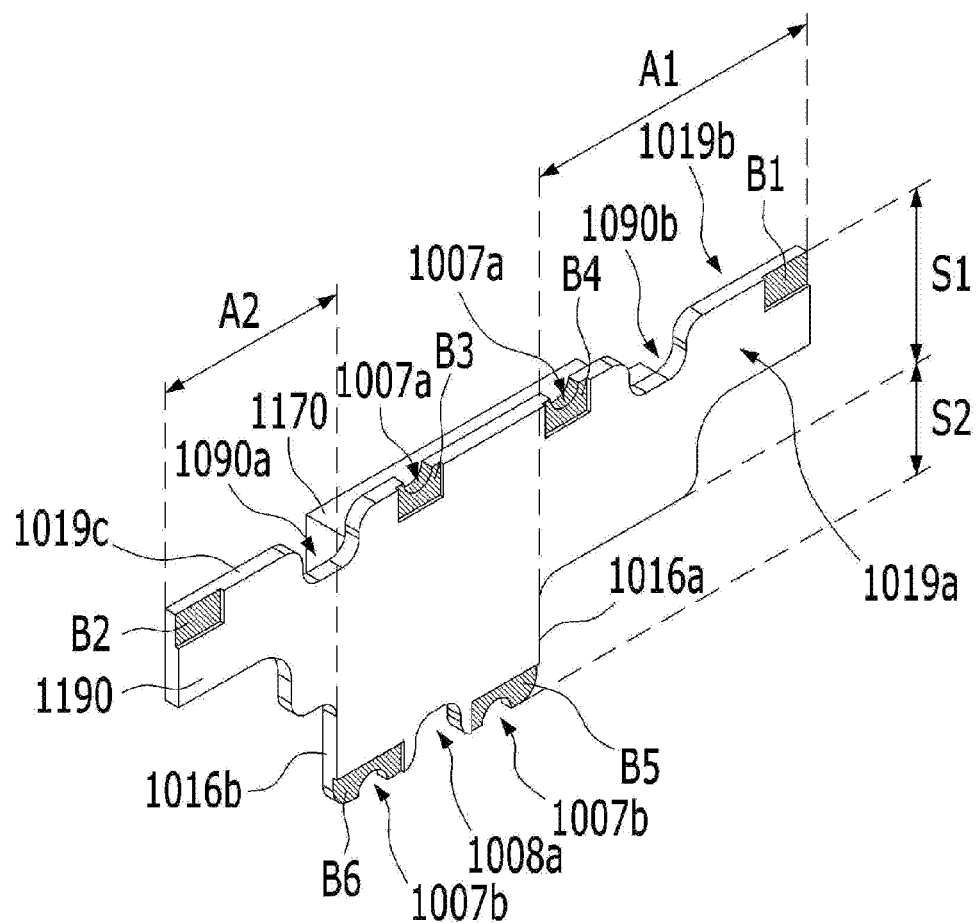
FIG. 23 is an enlarged view of the circuit board and the first position sensor of FIG. 17.

FIG. 23 is an enlarged view of the circuit board 1190 and the first position sensor 1170 of FIG. 17.

Referring to FIG. 23, the circuit board 1190 may have terminals B1 to B6 configured to be connected to external terminals or external apparatuses.

The first position sensor 1170 may be disposed at a first surface 1019b of the circuit board 1190, and the terminals B1 to B6 may be disposed at a second surface 1019a of the circuit board 1190.

Here, the second surface 1019a of the circuit board 1190 may be opposite the first surface 1019b of the circuit board 1190. For example, the second surface 1019a of the circuit board 1190 may be the surface of the circuit board 1190 that faces the bobbin 1110.

The circuit board 1190 may include a body portion S1 and an extension portion S2 located under the body portion S1. The body portion S1 may also be referred to as an "upper end portion," and the extension portion S2 may also be referred to as a "lower end portion."

The extension portion S2 may extend downwards from the body portion S1.

The body portion S1 may protrude from side surfaces 1016a and 1016b of the extension portion S2. For example, the side surfaces 1016a and 1016b of the extension portion S2 may be surfaces that interconnect a first surface 19b and a second surface 19a of the extension portion S2.

The body portion S1 may include a first extension region A1 extending toward the first corner 1142-1 of the housing 1140 and a second extension region A2 extending toward the second corner 1142-2 of the housing 1140.

For example, the first extension region A1 may extend or protrude from the first side surface 1016a of the extension portion S2, and the second extension region A2 may extend or protrude from the second side surface 1016b of the extension portion S2.

For example, in FIG. 23, the transverse length of the first extension region A1 is larger than the transverse length of the second extension region A2. However, the disclosure is not limited thereto. In another embodiment, the transverse length of the first extension region A1 may be equal to or smaller than the transverse length of the second extension region A2.

For example, the transverse length of the body portion S1 of the circuit board 1190 may be larger than the transverse length of the extension portion S2.

For example, the first to fourth terminals B1 to B4 of the circuit board 1190 may be disposed at the first surface 1019b of the body portion S1 so as to be spaced apart from each other. For example, the four terminals B1 to B4 may be arranged in a line in the transverse direction of the circuit board 1190.

The first terminal B1 and the second terminal B2 may be disposed at opposite ends of the body portion S1 of the circuit board 1190 so as to be adjacent thereto. That is, each of the first terminal B1 and the second terminal B2 may be disposed at a corresponding one of the opposite ends of the body portion S1 of the circuit board 1190 so as to be adjacent thereto.

For example, the first terminal B1 of the circuit board 1190 may be disposed at one end of the circuit board 1190 (for example, one end of the upper end portion), the second terminal B2 may be disposed at the other end of the circuit board 1190, the third terminal B3 may be disposed between the first terminal B1 and the second terminal B2, and the fourth terminal B4 may be disposed between the third terminal B3 and the first terminal B1.

The first terminal B1 of the circuit board 1190 may be disposed at the first extension region A1 of the body portion S1 of the circuit board 1190, and the second terminal B2 may be disposed at the second extension region A2 of the body portion S1 of the circuit board 1190.

The first to fourth terminals B1 to B4 may be disposed so as to be closer to the upper surface 1019c than the lower surface of the circuit board 1190.

For example, the first to fourth terminals B1 to B4 may be formed so as to abut the second surface 1019a of the circuit board 1190 and the upper surface 1019c of the body portion S1 of the circuit board 1190 that abuts the second surface 1019a.

In addition, for example, at least one of the first to fourth terminals B1 to B4 may include a recess 1007a or a via formed in the upper surface 1019c of the circuit board 1190.

For example, each of the third terminal B3 and the fourth terminal B4 may include a curved portion, such as a semi-circular via or recess 1007a, recessed from the upper surface 1019c of the circuit board 1190.

The area of contact between solder and the terminals B3 and B4 may be increased by the recess 1007a, whereby adhesive force and solderability may be improved.

The fifth terminal B5 and the sixth terminal B6 of the circuit board 1190 may be disposed at the first surface 1019b of the extension portion S2 of the circuit board 1190 so as to be spaced apart from each other.

The circuit board 1190 may have a recess 1008a or a hole provided between the fifth terminal B5 and the sixth terminal B6. The recess 1008a may be depressed from the lower surface of the circuit board 1190, and may be open to the first surface 1019b and the second surface 1019a of the circuit board 1190.

The distance between the fifth terminal B5 and the sixth terminal B6 may be smaller than the distance between two adjacent ones of the first to fourth terminals B1 to B4. At the time of soldering for connection with the outside, no solder may be formed between the fifth terminal B5 and the sixth terminal B6 due to the recess 1008a, whereby short circuit between the fifth terminal B5 and the sixth terminal B6 may be prevented.

In addition, for example, at least one of the fifth or sixth terminal B5 or B6 may include a recess 1007b or a via formed in the lower surface of the circuit board 1190.

For example, each of the fifth terminal B5 and the sixth terminal B6 may include a curved portion, such as a semi-circular via or recess, recessed from the lower surface of the circuit board 1190.

The area of contact between solder and the fifth and sixth terminals B5 and B6 may be increased by the recess 1007b, whereby adhesive force and solderability may be improved.

The circuit board 1190 may have a recess 1090a disposed between the second terminal B2 and the third terminal B3 and a recess 1090b disposed between the first terminal B1 and the fourth terminal B4. Here, each of the recesses 1090a and 1090b may also be referred to as an "escape recess."

Each of the first recess 1090a and the second recess 1090b may be depressed from the upper surface 1019c of the circuit board 1190, and may be open to the first surface 1019b and the second surface 1019a of the circuit board 1190.

The first recess 1090a of the circuit board 1190 may be formed in order to avoid spatial interference with a first outer frame 1152 of a third upper elastic unit 1150-3, and the second recess 1090b of the circuit board 1190 may be formed in order to avoid spatial interference with a first outer frame 1151 of a fourth upper elastic unit 1150-4.

For example, the circuit board 1190 may be a printed circuit board or an FPCB.

The circuit board 1190 may include a circuit pattern or wiring (not shown) for interconnecting the first to sixth terminals B1 to B6 and the first position sensor 1170.

The first position sensor 1170 may sense a magnetic field of the second magnet 1180 mounted to the bobbin 1110 or the intensity of the magnetic field when the bobbin 1110 is moved, and may output an output signal based on the result of sensing.

The first position sensor 1170 may be mounted to the circuit board 1190 disposed at the housing 1140, and may be fixed to the housing 1140. For example, the first position sensor 1170 may be disposed in the mounting recess 1014b of the housing 1190, and may be moved together with the housing 1140 at the time of handshake compensation.

The first position sensor 1170 may be disposed at the second surface 1019a of the circuit board 1190. In another embodiment, the first position sensor 1170 may be disposed at the first surface 1019b of the circuit board 1190.

The first position sensor 1170 may be configured in the form of a driver shown in FIG. 9, and the description given with reference to FIG. 9 may be applied thereto.

The first position sensor 1170 may include first to fourth terminals for two power signals VDD and GND, a clock signal SCL, and data SDA and fifth and sixth terminals for providing a driving signal to the first coil 1120.

Each of the first to fourth terminals of the first position sensor 1170 may be connected to a corresponding one of the first to fourth terminals B1 to B4 of the circuit board 1190, and each of the fifth and sixth terminals of the first position sensor 1170 may be connected to a corresponding one of the fifth and sixth terminals B5 and B6 of the circuit board 1190.

In another embodiment, the first position sensor 1170 may be realized as a position detection sensor, such as a Hall sensor, alone.

The first to fourth terminals B1 to B4 of the circuit board 1190 may be connected to terminals 1251-1 to 1251-n (n being a natural number greater than 1) of the circuit board 1250 via upper elastic units 1150-1 to 1150-4 and the supporting members 1220-1 to 1220-4, whereby the first position sensor 1170 may be connected to the terminals 1251-1 to 1251-n (for example, n=4) of the circuit board 1250.

In addition, the fifth and sixth terminals B5 and B6 of the circuit board 1190 may be coupled to the lower elastic members 1160-1 and 1160-2, and the first position sensor 1170 may be connected to the first coil 1120 via the lower elastic members 1160-1 and 1160-2.

For example, the fifth terminal B5 of the circuit board 1190 may be coupled to the first lower elastic member 1160-1, and the sixth terminal B6 of the circuit board 1190 may be coupled to the second lower elastic member 1160-2.

Next, the upper elastic member 1150, the lower elastic member 1160, and the supporting member 1220 will be described.

Figure 24:
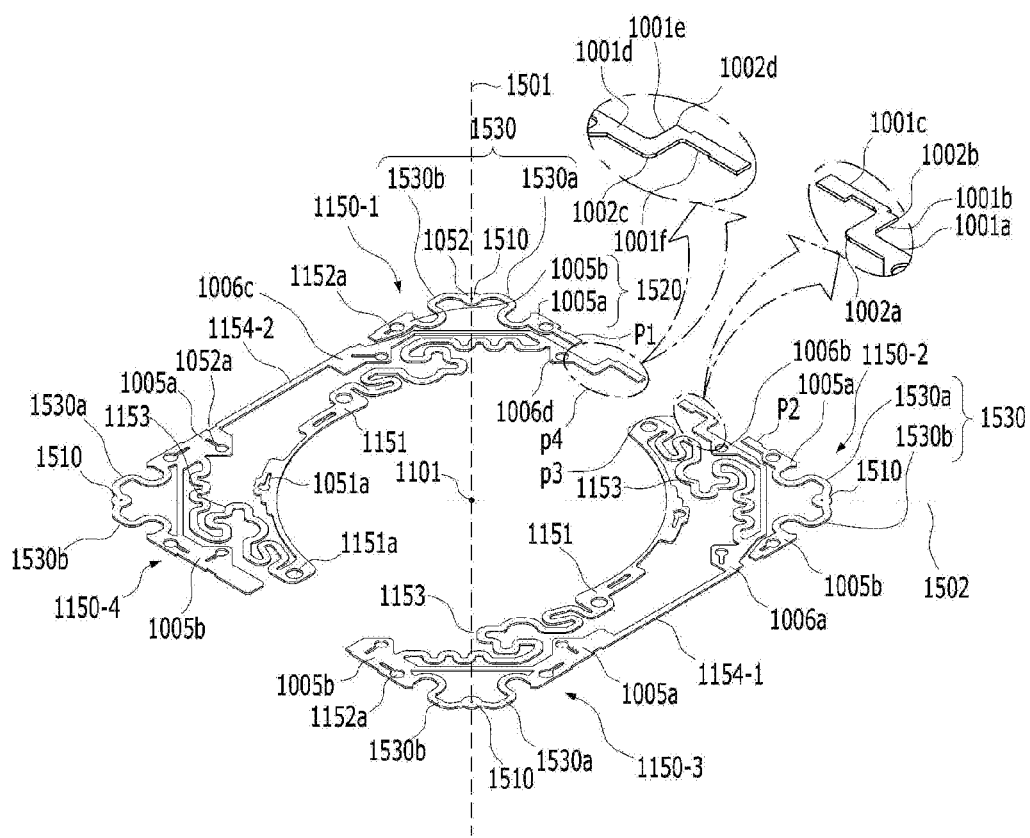
FIG. 24 shows an upper elastic member shown in FIG. 17.
Figure 25:
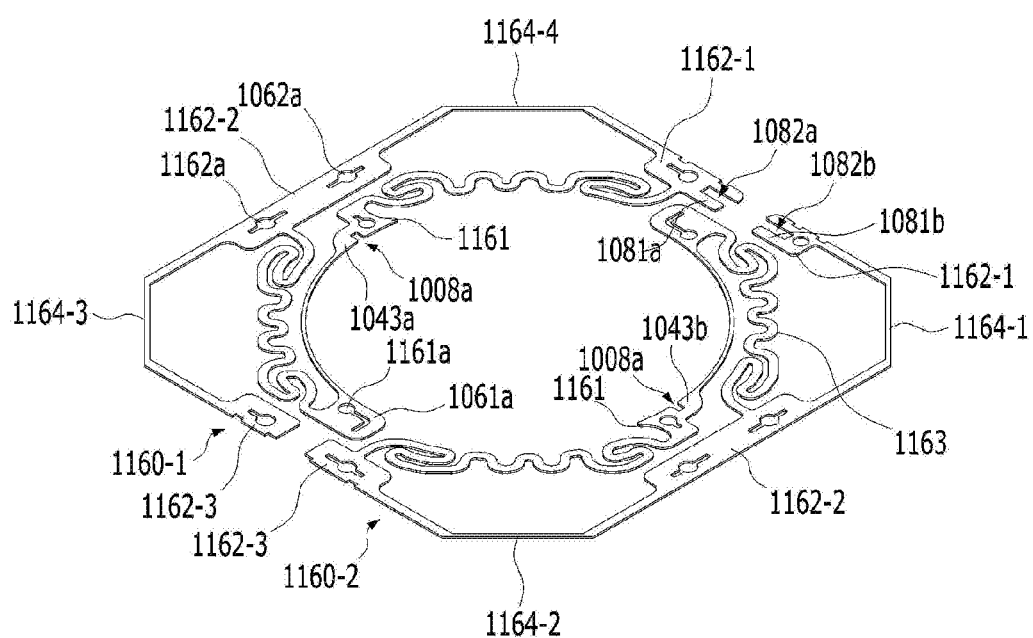
FIG. 25 shows a lower elastic member shown in FIG. 17.
Figure 26:
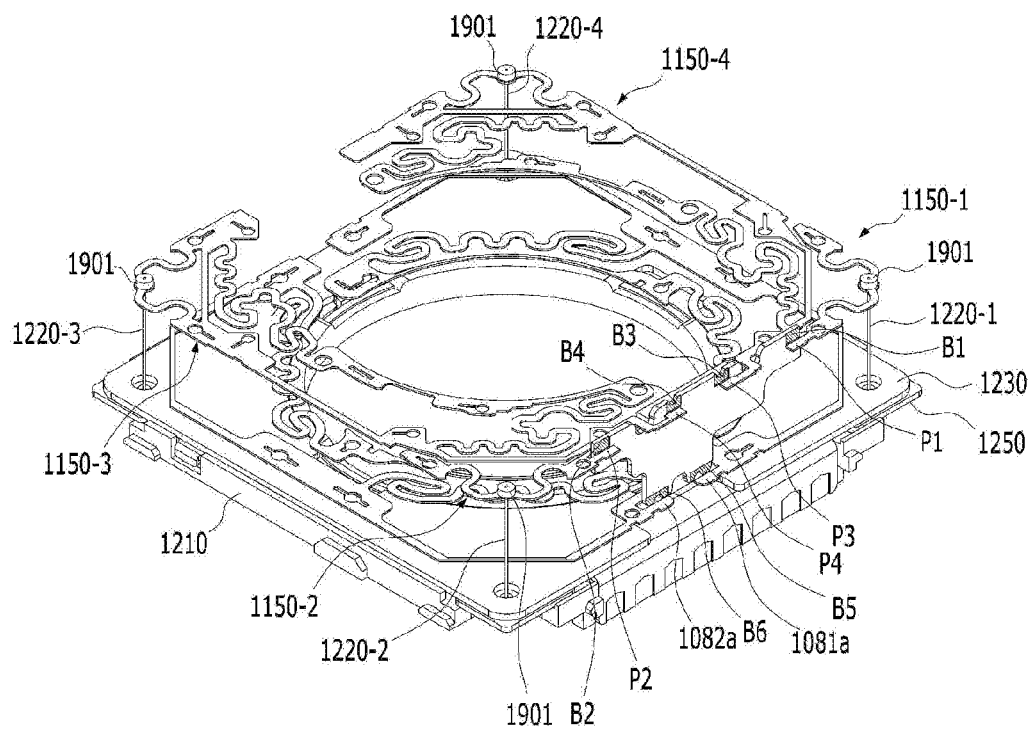
FIG. 26 is a coupled perspective view of the upper elastic member, the lower elastic member, a base, a supporting member, a second coil, and the circuit board.
Figure 27:
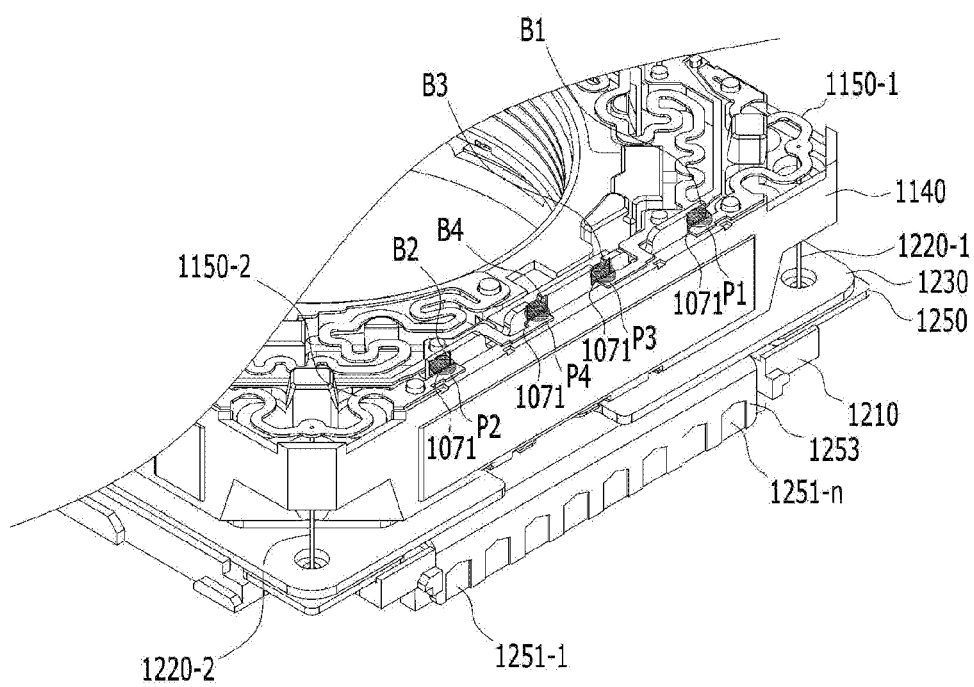
FIG. 27 shows coupling between first to fourth terminals of the circuit board and upper elastic units.
Figure 28:
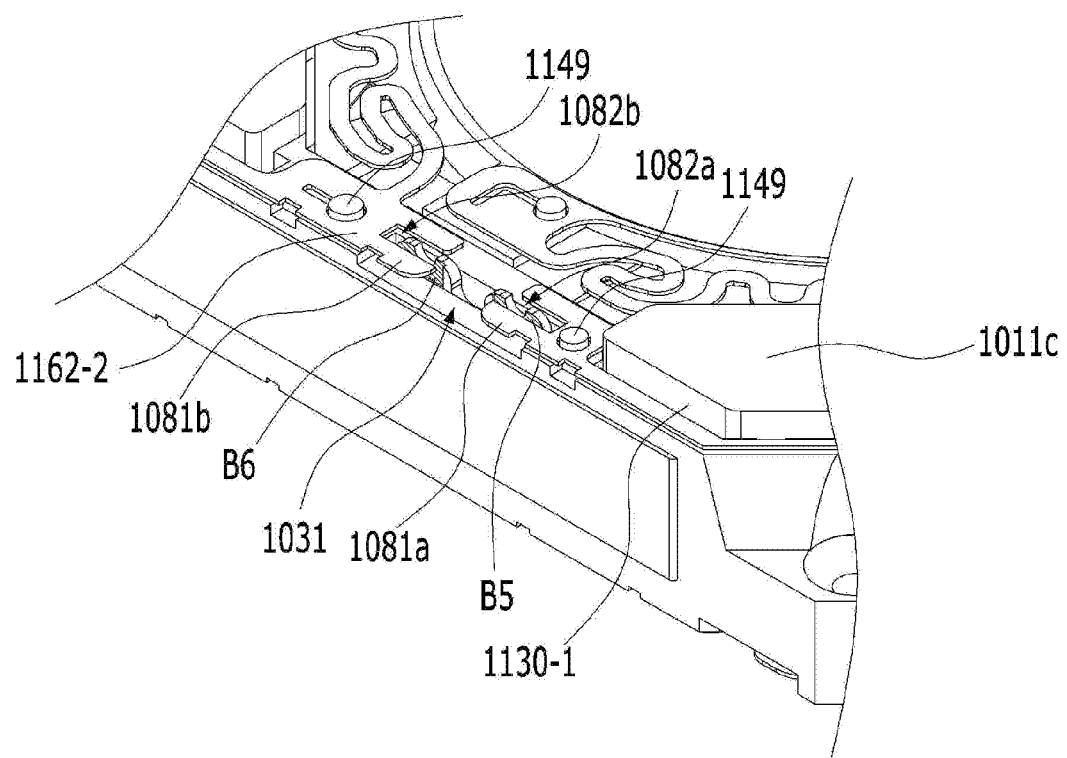
FIG. 28 is a bottom view of fifth and sixth terminals of the circuit board and lower elastic units.
Figure 29:
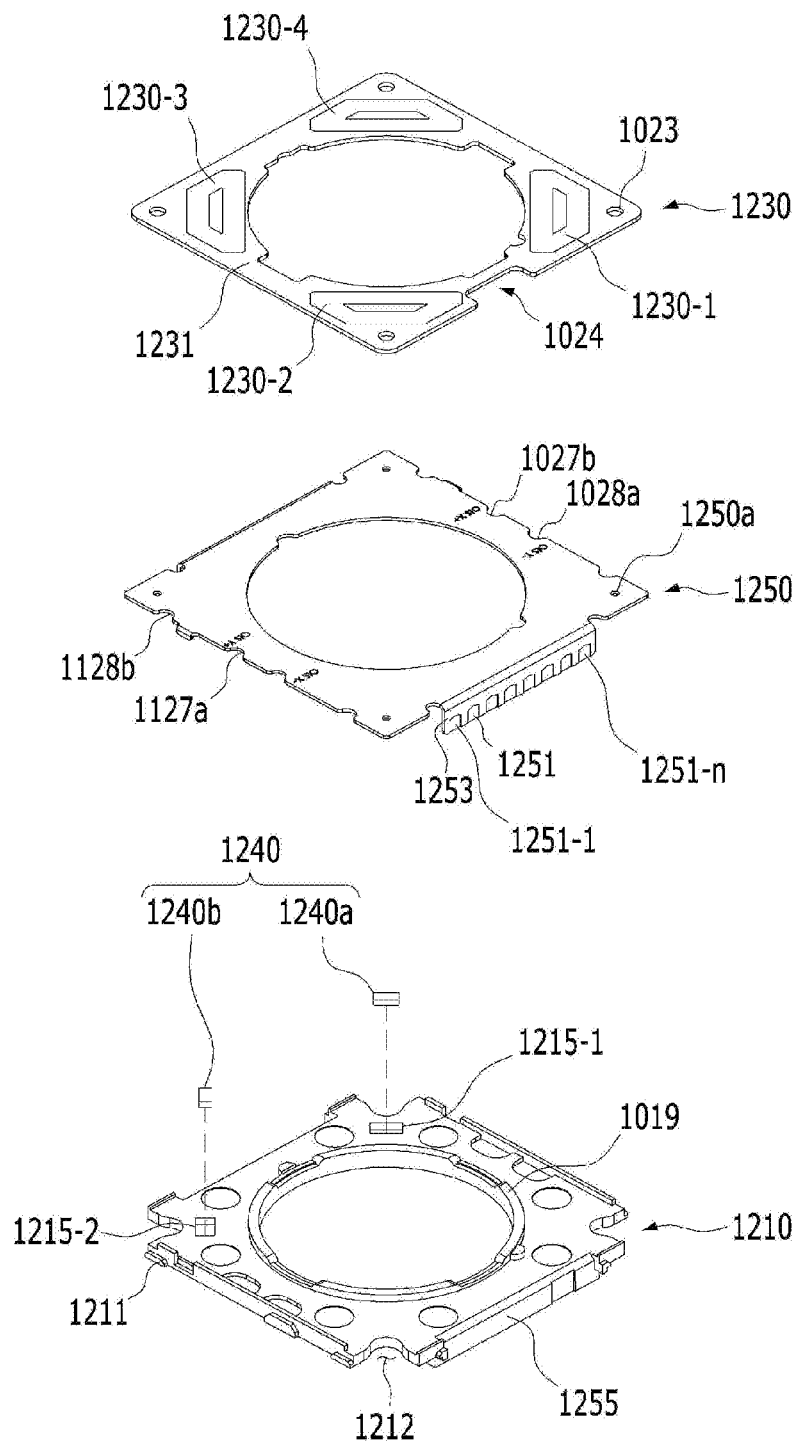
FIG. 29 is a separated perspective view of a second coil, the circuit board, the base, and a second position sensor.
Figure 30:
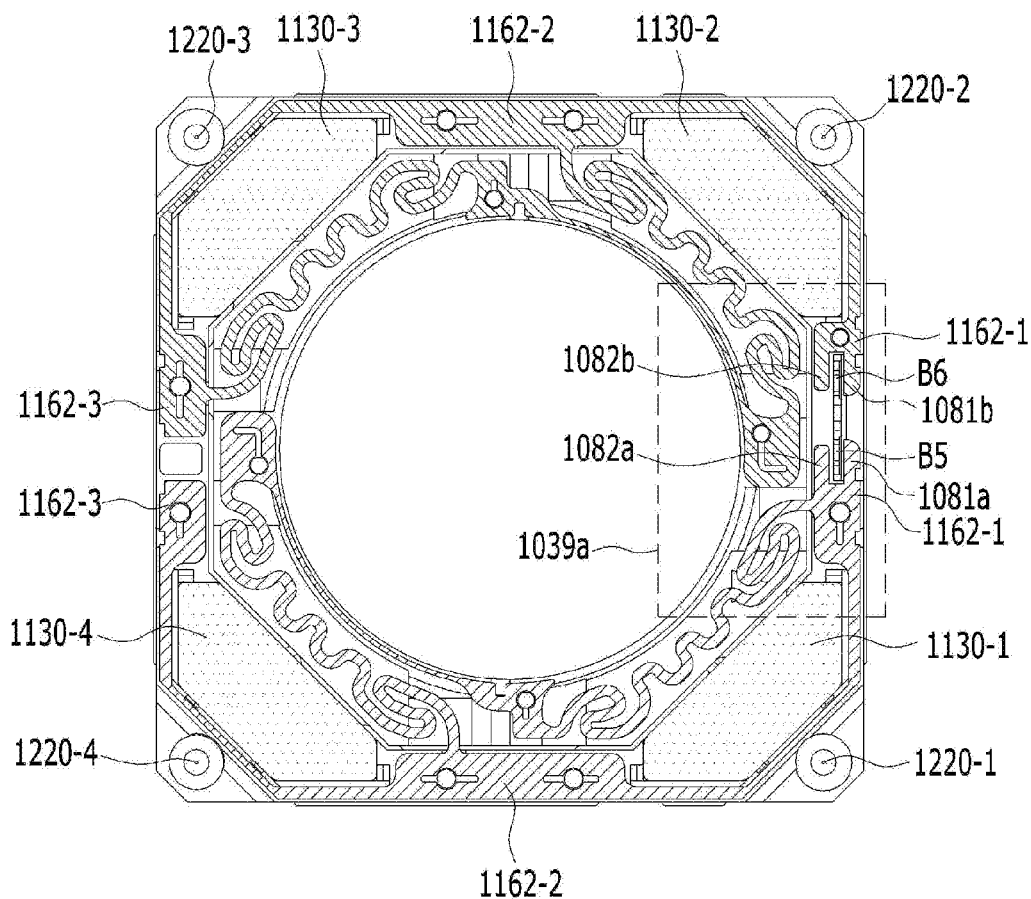
FIG. 30 is a bottom view of the housing, the first magnet, the lower elastic member, and the circuit board.

FIG. 24 shows the upper elastic member 1150 shown in FIG. 17, FIG. 25 shows the lower elastic member 1160 shown in FIG. 17, FIG. 26 is a coupled perspective view of the upper elastic member 1150, the lower elastic member 1160, the base 1210, the supporting member 1220, the second coil 1230, and the circuit board 1250, FIG. 27 shows coupling between the first to fourth terminals B1 to B4 of the circuit board 1190 and the upper elastic units 1150-1 to 1150-4, FIG. 28 is a bottom view of the fifth and sixth terminals B5 and B6 of the circuit board 1190 and the lower elastic units 1160-1 and 1160-2, FIG. 29 is a separated perspective view of the second coil 1230, the circuit board 1250, the base 1210, and the second position sensor 1240, and FIG. 30 is a bottom view of the housing 1140, the first magnet 1130, the lower elastic member 1160, and the circuit board 1190. FIG. 28 is a perspective view of a dotted-line portion 1039a of FIG. 30.

Referring to FIGS. 24 to 30, the upper elastic member 1150 may be coupled to the upper portion, the upper end, or the upper surface of the bobbin 1110, and the lower elastic member 1160 may be coupled to the lower portion, the lower end, or the lower surface of the bobbin 1110.

For example, the upper elastic member 1150 may be coupled to the upper portion, the upper end, or the upper surface of the bobbin 1110 and to the upper portion, the upper end, or the upper surface of the housing 1140, and the lower elastic member 1160 may be coupled to the lower portion, the lower end, or the lower surface of the bobbin 1110 and to the lower portion, the lower end, or the lower surface of the housing 1140.

The upper elastic member 1150 and the lower elastic member 1160 may elastically support the bobbin 1110 relative to the housing 1140.

The supporting member 1220 may support the housing 1140 so as to be movable relative to the base 1210 in a direction perpendicular to the optical axis, and may connect at least one of the upper or lower elastic member 1150 or 1160 to the circuit board 1250.

Referring to FIG. 24, the upper elastic member 1150 may include a plurality of upper elastic units 1150-1 to 1150-4 separated from each other. FIG. 26 shows four upper elastic units separated from each other; however, the disclosure is not limited as to the number thereof. The number of upper elastic units may be three or more.

The upper elastic member 1150 may include first to fourth upper elastic units 1150-1 to 1150-4 directly bonded to the first to fourth terminals B1 to B4 of the circuit board 1190 so as to be connected thereto.

A portion of each of the upper elastic units may be disposed at the first side portion 1141-1 of the housing 1140 at which the circuit board 1190 is disposed, and at least one upper elastic unit may be disposed at each of the second to fourth side portions 1141-2 to 1141-4, excluding the first side portion 1141-1 of the housing 1140.

Each of the first to fourth upper elastic units 1150-1 to 1150-4 may include a first outer frame 1152 coupled to the housing 1140.

At least one of the first to fourth upper elastic units 1150-1 to 1150-4 may further include a first inner frame 1151 coupled to the bobbin 1110 and a first frame connection portion 1153 for interconnecting the first inner frame 1151 and the first outer frame 1152.

In the embodiment of FIG. 24, each of the first and second upper elastic units 1150-1 and 1150-2 includes only the first outer frame, but does not include the first inner frame and the first frame connection portion. Each of the first and second upper elastic units 1150-1 and 1150-2 may be spaced apart from the bobbin 1110.

Each of the third and fourth upper elastic units 1150-3 and 1150-4 includes the first inner frame 1151, the first outer frame, and the first frame connection portion 1153. However, the disclosure is not limited thereto.

For example, a hole 1151a, to which the first coupling portion 1113 of the bobbin 1110 is coupled, may be provided in the first inner frame 1151 of each of the third and fourth upper elastic units 1150-3 and 1150-4. However, the disclosure is not limited thereto. For example, the hole 1152a of the first inner frame 1151 may have at least one cut portion 1051a, through which an adhesive member permeates a gap between the first coupling portion 1143 of the bobbin 1110 and the hole 1151a.

A hole 1152a, to which the first coupling portion 1143 of the housing 1140 is coupled, may be provided in the first outer frame 1152 of each of the first to fourth upper elastic units 1150-1 to 1150-4.

The first outer frames 1151 of the first to fourth upper elastic units 1150-1 to 1150-4 may include body portions coupled to the housing 1140 and connection terminals P1 to P4 connected to the first to fourth terminals B1 to B4 of the circuit board 1190. Here, the connection terminals P1 to P4 may also be referred to as "extension portions."

The first outer frame 1151 of the first to fourth upper elastic units 1150-1 to 1150-4 may include first coupling portions 1520 coupled to the housing 1140, second coupling portions 1510 coupled to the supporting members 1220-1 to 1220-4, connection portions 1530 for interconnecting the first coupling portions 1520 and the second coupling portions 1510, and extension portions P1 to P4 connected to the second coupling portions 1510 and extending to the first side portion 1141-1 of the housing 1140.

The body portion of each of the first to fourth upper elastic units 1150-1 to 1150-4 may include a first coupling portion 1520. In addition, the body portion of each of the first to fourth upper elastic units 1150-1 to 1150-4 may further include at least one of a second coupling portion 1510 or a connection portion 1530.

For example, one end of the first supporting member 1220-1 may be coupled to the second coupling portion 1510 of the first upper elastic unit 1150-1, one end of the second supporting member 1220-2 may be coupled to the second coupling portion 1510 of the second upper elastic unit 1150-2, one end of the third supporting member 1220-3 may be coupled to the second coupling portion 1510 of the third upper elastic unit 1150-3, and one end of the fourth supporting member 1220-4 may be coupled to the second coupling portion 1510 of the fourth upper elastic unit 1150-4, via solder or a conductive adhesive member.

The second coupling portion 1510 may have a hole 1052 through which each of the supporting members 1220-1 to 1220-4 extends. One end of each of the supporting members 1220-1 to 1220-4 extending through the hole 1052 may be directly coupled to the second coupling portion 1510 via a conductive adhesive member or solder 1901 (see FIG. 26), and the second coupling portion 1510 may be connected to each of the supporting members 1220-1 to 1220-4.

For example, the second coupling portion 1510 is a region in which the solder 1901 is disposed for coupling with each of the supporting members 1220-1 to 1220-4, and may include a hole 1052 and a region around the hole 1052.

The first coupling portion 1520 may include at least one coupling region 1005a and 1005b coupled to the housing 1140 (for example, each of the corners 1142-1 to 1142-4).

For example, the coupling regions 1005a and 1005b of the first coupling portion 1520 may include at least one hole 1152a coupled to the first coupling portion 1143 of the housing 1140.

For example, each of the coupling regions 1005a and 1005b may have one or more holes, and one more first coupling portions corresponding thereto may be provided at each of the corners 1142-1 to 1142-4 of the housing 1140.

For example, in order to support the housing 1140 in a balanced state, the coupling regions 1005a and 1005b of the first coupling portions 1520 of the first to fourth upper elastic units 1150-1 to 1150-4 may be symmetrical with respect to reference lines 1501 and 1502. However, the disclosure is not limited thereto.

In addition, the first coupling portions 1143 of the housing 1140 may be symmetrical with respect to the reference lines 1501 and 1502, and two first coupling portions may be provided at each of both sides of each reference line. However, the disclosure is not limited as to the number thereof.

Each of the reference lines 1501 and 1502 may be a straight line passing through a central point 1101 and a corresponding one of the corners 1142-1 to 1142-4 of the housing 1140. For example, each of the reference lines 1501 and 1502 may be a straight line passing through the central point 1101 and two side portions facing each other in a diagonal direction of the housing 1140, among the edges of the corners 1142-1 to 1142-4 of the housing 1140.

Here, the central point 1101 may be the center of the housing 1140, the center of the bobbin 1110, or the center of the upper elastic member 1150. In addition, for example, the edges of the corners of the housing 1140 may be edges aligned with or corresponding to the middles of the corners of the housing 1140.

In the embodiment of FIG. 24, each of the coupling regions 1005a and 1005b of the first coupling portion 1520 is realized so as to include a hole 1152a. However, the disclosure is not limited thereto. In another embodiment, the coupling regions may be realized in various forms sufficient to be coupled to the housing 1140, such as recesses.

For example, the hole 1152a of the first coupling portion 1520 may have at least one cut portion 1052a, through which an adhesive member permeates a gap between the first coupling portion 1143 of the housing 1140 and the hole 1152a.

The connection portion 1530 may interconnect the second coupling portion 1510 and the first coupling portion 1520. For example, the connection portion 1530 may interconnect the second coupling portion 1510 and the coupling regions 1005a and 1005b of the first coupling portion 1520.

For example, the connection portion 1530 may include a first connection portion 1530a for interconnecting the first coupling region 1005a of the first coupling portion 1520 of each of the first to fourth upper springs 1150-1 to 1150-4 and the second coupling portion 1510 and a second connection portion 1530b for interconnecting the second coupling region 1005b of the first coupling portion 1520 and the second coupling portion 1510.

For example, the first outer frame 1151 may include a connection region for directly interconnecting the first coupling region 1005a and the second coupling region 1005b. However, the disclosure is not limited thereto.

Each of the first and second connection portions 1530a and 1530b may include a bent portion that is bent at least once or a curved portion that is curved at least once. However, the disclosure is not limited thereto. In another embodiment, each connection portion may be straight.

The width of the connection portion 1530 may be smaller than the width of the first coupling portion 1520. In addition, the width of the connection portion 1530 may be smaller than the width (or the diameter) of the second coupling portion. In another embodiment, the width of the connection portion 1530 may be equal to the width of the first coupling portion 1520, and may be equal to the width (or the diameter) of the second coupling portion.

For example, the first coupling portion 1520 may contact the upper surface of each of the corners 1142-1 to 1142-4 of the housing 1140, and may be supported by each of the corners 1142-1 to 1142-4 of the housing 1140. For example, the connection portion 1530 may not be supported by the upper surface of the housing 1140, and may be spaced apart from the housing 1140. In addition, an empty space between the connection portion 1530 and the housing 1140 may be filled with a damper (not shown) in order to prevent oscillation due to vibration.

The width of each of the first and second connection portions 1530a and 1530b may be smaller than the width of the first coupling portion 1520, whereby the connection portion 1530 may be easily moved in the first direction, and therefore stress applied to the upper elastic units 1150-1 to 1150-4 and stress applied to the supporting members 1220-1 to 1220-4 may be dispersed.

Each of the first and second extension portions P1 and P2 of the first outer frames of the first and second upper elastic units 1150-1 and 1150-2 may extend from the first coupling portion 1520 (for example, the first coupling region 1005a) toward a corresponding one of the first and second terminals B1 and B2 of the circuit board 1190 disposed at the first side portion 1141-1 of the housing 1140.

The first coupling portion 1520 of the third upper elastic unit 1150-3 may further include at least one coupling regions 1006a and 1006b connected to at least one of the fourth side portion 1141-4 or the second corner 1142-2 of the housing 1140.

In addition, the first coupling portion 1520 of the fourth upper elastic unit 1150-4 may further include at least one coupling regions 1006c and 1006d connected to at least one of the second side portion 1141-2 or the first corner 1142-1 of the housing 1140.

Each of the third and fourth extension portions P3 and P4 of the first outer frames of the third and fourth upper elastic units 1150-3 and 1150-4 may extend from the first coupling portion 1520 (for example, a corresponding one of coupling regions 1006b and 1006d) toward a corresponding one of the third and fourth terminals B3 and B4 of the circuit board 1190 disposed at the first side portion 1141-1 of the housing 1140.

One end of each of the first to fourth extension portions P1 to P4 may be coupled to a corresponding one of the first to fourth terminals B1 to B4 of the circuit board 1190 via solder or a conductive adhesive member.

Each of the first and second extension portions P1 and P2 may be a straight line.

Each of the third and fourth extension portions P3 and P4 may include a bent portion or a curved portion so as to be easily coupled to a corresponding one of the third and fourth terminals B3 and B4 of the circuit board 1190.

The first outer frame of the third upper elastic unit 1150-3 may further include a first extension frame 1154-1 connected between the first coupling portion 1520 and the extension portion P3 and disposed at the fourth side portion 1141-4 and the fourth corner 1142-4 of the housing 1140.

In order to increase force of coupling with the housing 1140 and thus to prevent loosening of the third upper elastic unit 1150-3, the first extension frame 1154-1 may include at least one coupling regions 1006a and 1006b coupled to the housing 1140, and each of the coupling regions 1006a and 1006b may have a hole to which the first coupling portion 1143 of the housing 1140 is coupled.

The first outer frame of the fourth upper elastic unit 1150-4 may further include a second extension frame 1154-2 connected between the first coupling portion 1520 and the extension portion P4 and disposed at the second side portion 1141-2 and the first corner 1142-1 of the housing 1140.

In order to increase force of coupling with the housing 1140 and thus to prevent loosening of the fourth upper elastic unit 1150-4, the second extension frame 1154-2 may include at least one coupling regions 1006c and 1006d coupled to the housing 1140, and each of the coupling regions 1006c and 1006d may have a hole, to which the first coupling portion 1143 of the housing 1140 is coupled.

In FIG. 24, each of the third upper elastic unit 1150-3 and the fourth upper elastic unit 1150-4 includes two first frame connection portions. However, the disclosure is not limited thereto. The number of first frame connection portions may be one or three or more.

As described above, the first to fourth upper elastic units may include extension portions P1 to P4 disposed on the first side portion 1141-1 of the housing 1140, and the upper elastic units 1150-1 to 1150-4 may be easily coupled to the first to fourth terminals B1 to B4 provided at the body portion S1 of the circuit board 1190 via the extension portions P1 to P4.

Since the four terminals B1 to B4 provided at the body portion S1 of the circuit board 1190 disposed at the first side portion 1141-1 of the housing 1140 are directly connected to the first to fourth upper elastic units 1150-1 to 1150-4, a portion of the first outer frame 1151 of each of the first to fourth upper elastic units 1150-1 to 1150-4 may be disposed at the first side portion 1141-1 of the housing 1140.

Each of the upper elastic units 1150-1 to 1150-4 may be disposed at a corresponding one of the corners 1142-1 to 1142-4 of the housing 1140, and may have a corresponding one of the extension portions P1 to P4 extending to the first side portion 1141-1 of the housing 1140.

The extension portions P1 to P4 of the upper elastic units 1150-1 to 1150-4 may be directly coupled to the four terminals B1 to B4 provided at the body portion S1 of the circuit board 1190 via a conductive adhesive member 1071, such as solder.

The first outer frame 1151 of the first upper elastic unit 1150-1 may be disposed at the first corner 1142-1 of the housing 1140, the first outer frame 1151 of the second upper elastic unit 1150-2 may be disposed at the second corner 1142-2 of the housing 1140, the first outer frame 1151 of the third upper elastic unit 1150-3 may be disposed at the third corner 1142-3 of the housing 1140, and the first outer frame 1151 of the fourth upper elastic unit 1150-4 may be disposed at the fourth corner 1142-4 of the housing 1140.

A portion of the third upper elastic unit 1150-3 may be disposed in the first recess 1090a of the first circuit board 1190, and the end of the portion of the third upper elastic unit 1150-3 may be coupled to the third terminal B3 of the circuit board 1190.

A portion of the fourth upper elastic unit 1150-4 may be disposed in the second recess 1090b of the first circuit board 1190, and the end of the portion of the fourth upper elastic unit 1150-4 may be coupled to the fourth terminal B4 of the circuit board 1190.

The third extension portion P3 of the third upper elastic unit 1150-3 may extend toward the third terminal B3 of the circuit board 1190 through the first recess 1090a of the circuit board 1190, and may be bent at least twice.

In addition, the fourth extension portion P4 of the fourth upper elastic unit 1150-4 may extend toward the fourth terminal B4 of the circuit board 1190 through the second recess 1090b of the circuit board 1190, and may be bent at least twice.

The third extension portion P3 (or the "third connection terminal") of the third upper elastic unit 1150-3 may include at least two bent regions 1002a and 1002b.

For example, the third extension portion P3 of the third upper elastic unit 1150-3 may include a first portion 1001a extending from the first coupling portion 1520 (for example, the coupling region 1006b) of the third upper elastic unit 1150-3, a first bent region 1002a (or a "first bent portion") bent from the first portion 1001a, a second portion 1001b extending from the first bent region 1002a, a second bent region 1002b (or a "second bent portion") bent from the second portion 1001b, and a third portion 1001c extending from the second bent region 1002b in the direction toward the third terminal B3.

For example, the second portion 1001b of the third extension portion P3 (or the third connection terminal) may be bent from the first portion 1001a, and the third portion 1001c may be bent from the second portion 1001b.

The second portion 1001b of the third extension portion P3 may be disposed between the first bent region 1002a and the second bent region 1002b, and may interconnect the first and second bent regions 1002a and 1002b.

For example, each of the first portion 1001a and the third portion 1001c of the third extension portion P3 may extend in the direction from the second corner 1142-2 to the first corner 1141-1 of the housing 1140. For example, the second portion 1001b of the third extension portion P3 may extend from the inner surface to the outer surface of the housing 1140.

A portion (for example, the second portion 1001b) of the third extension portion P3 of the third upper elastic unit 1150-3 may be disposed in the first recess 1090a of the circuit board 1190 or may extend through the first recess 1090a.

The fourth extension portion P4 (or the "fourth connection terminal") of the fourth upper elastic unit 1150-4 may include at least two bent regions 1002c and 1002d.

For example, the fourth extension portion P4 of the fourth upper elastic unit 1150-4 may include a fourth portion 1001d extending from the first coupling portion 1520 (for example, the coupling region 1006d) of the fourth upper elastic unit 1150-4, a third bent region 1002c (or a "third bent portion") bent from the fourth portion 1001d, a fifth portion 1001e extending from the third bent region 1002c, a fourth bent region 1002d (or a "fourth bent portion") bent from the fifth portion 1001e, and a sixth portion 1001f extending from the fourth bent region 1002d in the direction toward the fourth terminal B4.

For example, the fifth portion 1001e of the fourth extension portion P4 (or the fourth connection terminal) may be bent from the fourth portion 1001d, and the sixth portion 1001f may be bent from the fifth portion 1001e.

The fifth portion 1001e of the fourth extension portion P4 may be disposed between the third bent region 1002c and the fourth bent region 1002d, and may interconnect the third and fourth bent regions 1002c and 1002d.

For example, each of the fourth portion 1001d and the sixth portion 1001f of the fourth extension portion P4 may extend in the direction from the first corner 1142-1 to the second corner 1141-2 of the housing 1140. For example, the fifth portion 1001e of the fourth extension portion P4 may extend from the inner surface to the outer surface of the housing 1140.

A portion (for example, the fifth portion 1001e) of the fourth extension portion P4 of the fourth upper elastic unit 1150-4 may be disposed in the second recess 1090b of the circuit board 1190 or may extend through the second recess 1090b.

Referring to FIG. 25, the lower elastic member 1160 may include a plurality of lower elastic units 1160-1 and 1160-2.

For example, each of the first and second lower elastic units 1160-1 and 1160-2 may include a second inner frame 1161 coupled or fixed to the lower portion, the lower surface, or the lower end of the bobbin 1110, second outer frames 1162-1 to 1162-3 coupled or fixed to the lower portion, the lower surface, or the lower end of the housing 1140, and a second frame connection portion 1163 for interconnecting the second inner frame 1161 and the second outer frames 1162-1 to 1162-3.

The second inner frame 1161 may be provided with a hole 1161a, to which the second coupling portion 1117 of the bobbin 1110 is coupled, and each of the second outer frames 1162-1 to 1162-3 may be provided with a hole 1162a, to which the second coupling portion 1149 of the housing 1140 is coupled.

For example, each of the first and second lower elastic units 1160-1 and 1160-2 may include three second outer frames 1162-1 to 1162-3 coupled to the housing 1140 and two second frame connection portions 1163. However, the disclosure is not limited thereto. In another embodiment, each of the first and second lower elastic units may include one or more second outer frames and one or more second frame connection portions.

Each of the first and second lower elastic units 1160-1 and 1160-2 may include connection frames 1164-1 and 1164-2 for interconnecting the second outer frames 1162-1 to 1162-3.

The width of each of the connection frames 1164-1 and 1164-2 may be smaller than the width of each of the second outer frames 1162-1 to 1162-3. However, the disclosure is not limited thereto.

The connection frames 1164-1 and 1164-2 may be located outside coil units 1230-1 to 1230-4 and the first magnets 1130-1 to 1130-4 based on the coil units 1230-1 to 1230-4 and the first magnets 1130-1 to 1130-4 in order to avoid spatial interference with the second coil 1230 and the first magnet 1130. In this case, the outside of the coil units 1230-1 to 1230-4 and the first magnets 1130-1 to 1130-4 may be opposite a region in which the center of the bobbin 1110 or the center of the 1 housing 140 is located based on the coil units 1230-1 to 1230-4 and the first magnets 1130-1 to 1130-4.

In addition, for example, the connection frames 1164-1 and 1164-2 may be located so as not to overlap the coil units 1230-1 to 1230-4 and/or the first magnets 1130-1 to 1130-4 in the optical-axis direction. However, the disclosure is not limited thereto. In another embodiment, at least portions of the connection frames 1164-1 and 1164-2 may be aligned with or overlap the coil units 1230-1 to 1230-4 and/or the first magnets 1130-1 to 1130-4 in the optical-axis direction.

Each of the upper elastic units 1150-1 to 1150-4 and the lower elastic units 1160-1 and 1160-2 may be realized as a leaf spring; however, the disclosure is not limited thereto. Each of the upper elastic units and the lower elastic units may be realized as a coil spring or the like. The "elastic unit 1150 or 1160" may also be referred to as a "spring," the "outer frame 1152 or 1162" may also be referred to as an "outer portion," the "inner frame 1151 or 1161" may also be referred to as an "inner portion," and the supporting member 1220 may also be referred to as a wire.

The supporting members 1220-1 to 1220-4 may be disposed in the corners 1142-1 to 1142-4 of the housing 1140, and may interconnect the upper elastic units 1150-1 to 1150-4 and the circuit board 1250.

Each of the supporting members 1220-1 to 1220-4 may be coupled to a corresponding one of the first to fourth upper elastic units 1150-1 to 1150-4, and may connect a corresponding one of the first to fourth upper elastic units 1150-1 to 1150-4 to a corresponding one of the terminals 1251-1 to 1251-n (for example, n=4) of the circuit board 1250.

The supporting members 1220-1 to 1220-4 may be spaced apart from the housing 1140, not fixed to the housing 1140, and one end of each of the supporting members 1220-1 to 1220-4 may be directly connected or coupled to the second coupling portion 1510. In addition, the other end of each of the supporting members 1220-1 to 1220-4 may be directly connected or coupled to the circuit board 1250.

For example, each of the supporting members 1220-1 to 1220-4 may extend through the hole 1147 formed in a corresponding one of the corners 1142-1 to 1142-4 of the housing 1140. However, the disclosure is not limited thereto. In another embodiment, the supporting members may be disposed adjacent to boundary lines between the side portions 1141-1 to 1141-4 and the corners 1142-1 to 1142-4 of the housing 1140, and may not extend through the corners 1142-1 to 1142-4 of the housing 1140.

The first coil 1120 may be directly connected or coupled to a corresponding one of the second inner frames of the first and second lower elastic units 1160-1 and 1160-2. For example, the second inner frame 1161 of the first lower elastic unit 1160-1 may include a first bonding portion 1043a coupled to one end of the first coil 1120, and the second inner frame 1161 of the second lower elastic unit 1160-2 may include a second bonding portion 1043b coupled to the other end of the first coil 1120. A recess 1008 for guiding the coil 1120 may be provided in each of the first and second bonding portions 1043a and 1043b.

The first supporting member 1220-1 may be disposed at the first corner 1142-1 of the housing 1140, and may be coupled to the second coupling portion 1510 of the first upper elastic unit 1150-1.

The second supporting member 1220-2 may be disposed at the second corner 1142-2 of the housing 1140, and may be coupled to the second coupling portion 1510 of the second upper elastic unit 1150-2.

The third supporting member 1220-3 may be disposed at the third corner 1142-3 of the housing 1140, and may be coupled to the second coupling portion 1510 of the third upper elastic unit 1150-3.

The fourth supporting member 1220-4 may be disposed at the fourth corner 1142-4 of the housing 1140, and may be coupled to the second coupling portion 1510 of the fourth upper elastic unit 1150-4.

The first terminal B1 of the circuit board 1190 may be connected to the first supporting member 1220-1, the second terminal B2 of the circuit board 1190 may be connected to the second supporting member 1220-2, the third terminal B3 of the circuit board 1190 may be connected to the third supporting member 1220-3, and the fourth terminal B4 of the circuit board 1190 may be connected to the fourth supporting member 1220-4.

Each of the first to fourth supporting members 1220-1 to 1220-4 may be connected to a corresponding one of the first to fourth terminals 1251-1 to 1251-*n* (n=4) of the circuit board 1250.

For example, power signals VDD and GND may be provided to the first and second supporting members 1220-1 and 1220-2 via the first and second terminals 1251-1 and 1251-2 of the circuit board 1250.

The power signals VDD and GND may be provided to the first and second terminals B1 and B2 of the circuit board 1190 via the first and second upper elastic units 1150-1 and 1150-2. The first position sensor 1170 may receive the power signals VDD and GND via the first and second terminals B1 and B2 of the circuit board 1190.

For example, the first terminal B1 of the circuit board 1190 may be one of a VDD terminal or a GND terminal, and the second terminal B2 of the circuit board 1190 may be the other of the VDD terminal or the GND terminal.

In addition, a clock signal SCL and a data signal SDA may be provided to the third and fourth supporting members 1220-3 and 1220-4 via the third and fourth terminals 1251-3 and 1251-4 of the circuit board 1250, and the clock signal SCL and the data signal SDA may be provided to the third and fourth terminals B3 and B4 of the circuit board 1190 via the third and fourth upper elastic units 1150-3 and 1150-4. The first position sensor 1170 may receive the clock signal SCL and the data signal SDA via the third and fourth terminals B3 and B4 of the circuit board 1190.

For example, the power signal VDD may be provided to the first position sensor 1170 via the first terminal 1251-1 of the circuit board 1250, the first supporting member 1220-1, the first upper elastic unit 1150-1, and the first terminal B1 of the circuit board 1190. The power signal GND may be provided to the first position sensor 1170 via the second terminal 1251-2 of the circuit board 1250, the second supporting member 1220-2, the second upper elastic unit 1150-2, and the second terminal B2 of the circuit board 1190.

In addition, for example, the clock signal SCL may be provided to the first position sensor 1170 via the third terminal 1251-3 of the circuit board 1250, the third supporting member 1220-3, the third upper elastic unit 1150-3, and the third terminal B3 of the circuit board 1190. The data signal SDA may be provided to the first position sensor 1170 via the fourth terminal 1251-4 of the circuit board 1250, the fourth supporting member 1220-4, the fourth upper elastic unit 1150-4, and the fourth terminal B4 of the circuit board 1190.

Each of the fifth and sixth terminals B5 and B6 of the circuit board 1190 may be connected or coupled to the second outer frame 1162-1 of a corresponding one of the first and second lower elastic units 1160-1 and 1160-2.

The second outer frame 1162-1 of the first lower elastic unit 1160-1 may have a first bonding portion 1081*a*, to which the fifth terminal B5 of the circuit board 1190 is coupled using solder or a conductive adhesive member. In addition, the second outer frame 1162-1 of the second lower elastic unit 1160-2 may have a second bonding portion 1081*b*, to which the sixth terminal B6 of the circuit board 1190 is coupled using solder or a conductive adhesive member.

For example, the second outer frame 1162-1 of the first lower elastic unit 1160-1 may have a first hole 1082*a* (or a first recess), into which the fifth terminal B5 of the circuit board 1190 is inserted or disposed, and the second outer frame 1162-1 of the second lower elastic unit 1160-2 may have a second hole 1082*b* (or a second recess), into which the sixth terminal B6 of the circuit board 1190 is inserted or disposed.

For example, each of the first and second holes 1082*a* and 1082*b* may be formed through the second outer frame 1162-1, and may have an opening formed in one surface of the second outer frame 1162-1. However, the disclosure is not limited thereto. In another embodiment, each of the first and second holes may not have an opening formed in one surface of the second outer frame 1162-1.

Since, in the state in which the fifth terminal B5 (or the sixth terminal B6) of the circuit board 1190 is inserted into the first recess 1082*a* (or the second recess 1082*b*) of the second outer frame 1162-1 of the first lower elastic unit 1160-1, the fifth terminal B5 (or the sixth terminal B6) is coupled to the first bonding portion 1081*a* (or the second bonding portion 1081*b*), in which the first recess 1082*a* (or the second recess 1082*b*) is provided, using solder or a conductive adhesive member, coupling area may be increased, whereby adhesive force and solderability therebetween may be improved.

Referring to FIG. 28, one end (for example, the lower end or the lower surface) of each of the fifth and sixth terminals B5 and B6 may be located lower than the lower end or the lower surface of the second outer frame 1162-1 of a corresponding one of the first and second lower elastic units 1160-1 and 1160-2. Since FIG. 28 is a bottom view, the lower surface of each of the fifth and sixth terminals B5 and B6 may be shown as being located lower than the lower end or the lower surface of the second outer frame 1162-1. This configuration is provided to improve solderability between one end of each of the fifth and sixth terminals B5 and B6 and the first and second bonding portions 1081*a* and 1081*b* of the first and second lower elastic units 1160-1 and 1160-2.

In addition, referring to FIG. 28, the housing 1140 may include a recess 1031 recessed from the lower surface of the first side portion 1141-1. For example, the bottom surface of the recess 1031 of the housing 1140 may have a lower surface and a terminal of the housing 1140 in the optical-axis direction. For example, the bottom surface of the recess 1031 of the housing 1140 may be located higher than the lower surface of the housing 1140.

The recess 1031 of the housing 1140 may overlap the first and second bonding portions 1081*a* and 1081*b* of the first and second lower elastic units 1160-1 and 1160-2 in the optical-axis direction.

In addition, the recess 1031 of the housing 1140 may overlap the holes 1082*a* and 1082*b* of the second outer frames 1161-1 of the first and second lower elastic units 1160-1 and 1160-2 in the optical-axis direction.

It is possible to increase the area by which the fifth and sixth terminals B5 and B6 of the circuit board 1190 are open from the housing and to secure a space in which solder or a conductive adhesive member can be settled by the provision of the recess 1031 of the housing 1140, whereby it is possible to improve solderability. In addition, it is possible to reduce the extent to which the solder protrudes under the lower surface of the second outer frame 1162-1, whereby it is possible to inhibit or prevent spatial interference with the second coil 1230, the circuit board 1250, or the base 1210 disposed under the lower elastic unit.

In addition, the lower surface 1011*c* of the first magnet 1130 disposed at the settlement portion 1141*a* of the housing 1140 may be located lower than the lower surfaces of the second outer frames 1162-1 to 1162-3 of the first and second lower elastic units 1160-1 and 1160-2. However, the disclosure is not limited thereto. In another embodiment, the lower surface 1011c of the first magnet 1130 may have a height higher than or equal to the height of the lower surface 1011c of the housing 1140.

The other end of the supporting member 1220 may be coupled to the circuit board 1250 (or the circuit member 1231) at a position lower than the lower surface 1011c of the first magnet 1130 such that the first magnet 1130 is spaced apart from the second coil 1230 and the circuit board 1250.

The supporting member 1220 may be realized as a member that is conductive and is capable of performing a supporting function based on elasticity, such as a suspension wire, a leaf spring, or a coil spring. Also, in another embodiment, the supporting member may be formed integrally with the upper elastic member 1150.

In another embodiment, the description of the upper elastic member 1150, the lower elastic member 1160, and the supporting member 1220 may be applied to the upper elastic member 150, the lower elastic member 160, and the supporting member 220 of FIG. 1, and vice versa.

Next, the base 1210, the circuit board 1250, and the second coil 1230 will be described.

Referring to FIG. 29, the base 1210 may have an opening corresponding to the opening of the bobbin 1110 and/or the opening of the housing 1140, and may be configured in a shape coinciding with or corresponding to the shape of the cover member 1300, such as a quadrangular shape. For example, the opening of the base 1210 may be a through hole formed through the base 1210 in the optical-axis direction.

The base 1210 may be provided with a stair 1211, which may be coated with an adhesive when fixing the cover member 1300 by adhesion. In this case, the stair 1211 may guide the side plate of the cover member 1300 coupled to the upper side thereof, and the lower end of the side plate of the cover member 1300 may contact the stair 1211. The stair 1211 of the base 1210 may be fixed to the lower end of the side plate of the cover member 1300 by adhesion using an adhesive.

A prop portion 1255 may be provided at a region of the base 210 facing a terminal surface 1253 of the circuit board 1250 at which the terminals 1251-1 to 1251-n are provided. The prop portion 1255 may support the terminal surface 1253 of the circuit board 1250 at which the terminals 1251-1 to 1251-n of the circuit board 1250 are formed.

The base 1210 may be provided in the corner regions thereof corresponding to the corners of the cover member 1300 with concave recesses 1212. In the case in which the corners of the cover member 1300 protrude, protrusions of the cover member 1300 may be fastened to the base 1210 in second concave recesses 1212.

In addition, the base 1210 may be provided in the upper surface thereof with settlement recesses 1215-1 and 1215-2, in which the second position sensor 1240 is disposed. A settlement portion (not shown), at which a filter 1610 of a camera module 200 is installed, may be formed in the lower surface of the base 1210.

In addition, the base 1210 may be provided at the upper surface around the opening thereof with a protrusion 1019, which is coupled to the opening of the circuit board 1250 and the opening of the circuit member 1231.

The second coil 1230 may be disposed at the upper portion of the circuit board 1250, and OIS position sensors 1240a and 1240b may be disposed in the settlement recesses 1215-1 and 1215-2 of the base 1210 located under the circuit board 1250.

The second position sensor 1240 may include first and second OIS position sensors 1240a and 1240b, and the OIS position sensors 1240a and 1240b may sense displacement of an OIS operation unit in a direction perpendicular to the optical axis. Here, the OIS operation unit may include the AF operation unit and components mounted to the housing 1140.

For example, the OIS operation unit may include the AF operation unit and the housing 1140. In some embodiments, the first magnets 1130 may be further included. For example, the AF operation unit may include the bobbin 1110 and components mounted to the bobbin 1110 so as to be movable with the bobbin 1110. For example, the AF operation unit may include the bobbin 1110 and the lens (not shown), the first coil 1120, the second magnet 1180, and the third magnet 1185 mounted to the bobbin 1110.

The circuit board 1250 is disposed on the upper surface of the base 1210, and may have an opening corresponding to the opening of the bobbin 1110, the opening of the housing 1140, and/or the opening of the base 1210. The opening of the circuit board 1250 may be a through hole.

The circuit board 1250 may be configured in a shape coinciding with or corresponding to the shape of the upper surface of the base 1210, such as a quadrangular shape.

The circuit board 1250 may be provided with at least one terminal surface 1253 which is bent from the upper surface thereof and at which a plurality of terminals 1251-1 to 1251-n (n being a natural number greater than 1) or pins for receiving electrical signals from outside is provided.

The second coil 1230 may be disposed under the bobbin 1110.

The second coil 1230 is disposed at the upper portion of the circuit board 1250 so as to correspond to or be opposite the first magnets 1130-1 to 1130-4 disposed at the housing 1140.

The second coil 1230 may be disposed so as to be opposite or overlap the first magnets 1130-1 to 1130-4 disposed at the corners 1142-1 to 1142-4 of the housing 1140 in the optical-axis direction.

For example, the second coil 1230 may include a circuit member 1231 and a plurality of coil units 1230-1 to 1230-4 disposed or formed at the circuit member 1231. Here, the circuit member 1231 may also be referred to as a "board," a "circuit board," or a "coil board."

For example, the four coil units 1230-1 to 1230-4 may be disposed or formed at the corners or the corner regions of the polygonal (for example, quadrangular) circuit member 1231.

For example, the second coil 1230 may include two coil units 1230-1 and 1230-3 for the second direction and two coil units 1230-2 and 1230-4 for the third direction. However, the disclosure is not limited thereto. For example, the coil units 1230-1 and 1230-3 may be disposed at two corner regions of the circuit member 1231 facing each other in a first diagonal direction of the circuit member 1231, and the coil units 1230-2 and 1230-4 may be disposed at two corner regions of the circuit member 1231 facing each other in a second diagonal direction of the circuit member 1231. The first diagonal direction and the second diagonal direction may perpendicular to each other.

In another embodiment, the second coil 1230 may include a single coil unit for the second direction and a single coil unit for the third direction, or may include four or more coil units.

A power or driving signal from the circuit board 1250 may be provided to the second coil 1230. The power or driving signal provided to the second coil 1230 may be a direct-current signal or an alternating-current signal, or may include the direct-current signal and the alternating-current signal, and may have the form of voltage or current.

The housing 1140 may be moved in the second and/or third direction, e.g. in the x-axis and/or y-axis direction, due to interaction between the first magnets 1130-1 to 1130-4 and the second coils 1230-1 to 1230-4 to which the driving signal is provided, whereby handshake compensation may be performed.

The coil units 1230-1 to 1230-4 may be connected to corresponding ones of the terminals 1251-1 to 1251-n of the circuit board 1250 in order to receive a driving signal from the circuit board 1250.

The circuit board 1250 may include pads 1027a, 1027b, 1028a, and 1028b, which are connected to the coil units 1230-1 to 1230-4. Here, the pads 1027a, 1027b, 1028a, and 1028b may also be referred to as "terminals" or "bonding portions."

For example, the two coil units 1230-1 and 1230-3 for the second direction may be connected to each other in series, one end of the coil units 1230-1 and 1230-3 connected to each other in series may be connected to the first pad 1027a of the circuit board 1250, and the other end of the coil units 1230-1 and 1230-3 connected to each other in series may be connected to the second pad 1028a of the circuit board 1250.

In addition for example, the two coil units 1230-2 and 1230-4 for the third direction may be connected to each other in series, one end of the coil units 1230-2 and 1230-4 connected to each other in series may be connected to the third pad 1028a of the circuit board 1250, and the other end of the coil units 1230-2 and 1230-4 connected to each other in series may be connected to the fourth pad 1028b of the circuit board 1250.

The first and second pads 1027a and 1027b of the circuit board 1250 may be connected to two corresponding ones of the terminals 1251-1 to 1251-n of the circuit board 1250, and a first driving signal may be provided to the coil units 1230-1 and 1230-3 connected to each other in series via the two terminals of the circuit board 1250.

The third and fourth pads 1028a and 1028b of the circuit board 1250 may be connected to corresponding two ones of the terminals 1251-1 to 1251-n of the circuit board 1250, and a second driving signal may be provided to the coil units 1230-1 and 1230-3 connected to each other in series via the two terminals of the circuit board 1250.

In FIG. 29, each of the coil units 1230-1 to 1230-4 is realized in the form of a circuit pattern, such as an FP coil, formed at the circuit member 1231, rather than the circuit board 1250. However, the disclosure is not limited thereto. In another embodiment, each of the coil units 1230-1 to 1230-4 may be realized in the form of a ring-shaped coil block with the circuit member 1231 omitted, or may be realized in the form of a circuit pattern, such as an FP coil, formed at the circuit board 1250.

An escape recess 1024 for avoiding spatial interference with the fifth and sixth terminals B5 and B6 of the circuit board 1190 may be provided in the circuit member 1231. The escape recess 1024 may be formed in one side of the circuit member 1231. For example, the escape recess 1024 may be disposed between the first coil unit 1230-1 and the second coil unit 1230-2.

The circuit board 1250 and the circuit member 1231 are separate components, which are referred to individually. However, the disclosure is not limited thereto. In another embodiment, the circuit board 1250 and the circuit member 1231 may be commonly referred to as a "circuit member" or a "board." In this case, the other end of each of the supporting members may be coupled to the "circuit member" (for example, the lower surface of the circuit member).

In order to avoid spatial interference with the supporting member 1220, a hole 1023 (for example, a through hole), through which the supporting member 1220 extends, may be provided in each corner of the circuit member 1231. In another embodiment, a recess may be provided in each corner of the circuit member 1231 instead of the through hole.

Each of the OIS position sensors 1240a and 1240b may be a Hall sensor. Any sensor may be used as long as the sensor is capable of sensing the intensity of a magnetic field. For example, each of the OIS position sensors 1240a and 1240b may be realized as a position detection sensor, such as a Hall sensor, alone, or may be configured in the form of a driver including a Hall sensor.

Terminals 1251-1 to 1251-n may be provided at the terminal surface 1253 of the circuit board 1250.

Signals SCL, SDA, VDD, and GND for data communication with the first position sensor 1190 may be transmitted and received through the terminals 1251-1 to 1251-n installed at the terminal surface 1253 of the circuit board 1250, driving signals may be supplied to the OIS position sensors 1240a and 1240b, and signals output from the OIS position sensors 1240a and 1240b may be received and output to the outside.

According to the embodiment, the circuit board 1250 may be a flexible printed circuit board (FPCB). However, the disclosure is not limited thereto. The terminals of the circuit board 1250 may be directly formed on the surface of the base 1210 using a surface electrode method or the like.

The circuit board 1250 may include holes 1250a through which the supporting members 1220-1 to 1220-4 extend. The position and number of holes 1250a may correspond to or coincide with the position and number of supporting members 1220-1 to 1220-4.

The supporting members 1220-1 to 1220-4 may extend through the holes 1250a of the circuit board 1250 and may be connected to the pads (or the circuit patterns) formed on the lower surface of the circuit board 1250 using solder or a conductive adhesive member. However, the disclosure is not limited thereto.

In another embodiment, the circuit board 1250 may have no holes, and the supporting members 1220-1 to 1220-4 may be connected to the circuit patterns or the pads formed on the upper surface of the circuit board 1250 using solder or a conductive adhesive member.

Alternatively, in another embodiment, the supporting members 1220-1 to 1220-4 may connect the upper elastic units 1150-1 to 1150-4 to the circuit member 1231, and the circuit member 1231 may be connected to the circuit board 1250.

Since a driving signal is directly provided from the first position sensor 1170 to the first coil 1120 in the embodiment, it is possible to reduce the number of supporting members and to simplify the connection structure, compared to the case in which a driving signal is directly provided to the first coil 1120 through the circuit board 1250.

In addition, since the first position sensor 1170 may be realized as a driver IC capable of measuring temperature, the output of the Hall sensor may be compensated so as to have the minimum change depending on a change in temperature, or the output of the Hall sensor may be compensated so as to have a uniform gradient depending on a change in temperature, whereby it is possible to improve accuracy of AF driving irrespective of a change in temperature.

In another embodiment, the description of the base 1210, the circuit board 1250, and the second coil 1230 may be applied to the base 210, the circuit board 250, and the second coil 230 of FIG. 1, and vice versa.

The cover member 1300 receives the bobbin 1110, the first coil 1120, the first magnet 1130, the housing 1140, the upper elastic member 1150, the lower elastic member 1160, the first position sensor 1170, the second magnet 1180, the circuit board 1190, the supporting member 1220, the second coil 1230, the second position sensor 1240, and the circuit board 1250 in a receiving space formed together with the base 1210.

The cover member 1300 may be formed in the shape of a box, the lower portion of which is open and which includes an upper plate and side plates. The lower portion of the cover member 1300 may be coupled to the upper portion of the base 1210. The shape of the upper plate of the cover member 1300 may be polygonal, e.g. quadrangular or octagonal.

The cover member 1300 may be provided in the upper plate thereof with an opening, through which a lens (not shown) coupled to the bobbin 1110 is exposed to external light. The cover member 1300 may be made of a nonmagnetic material, such as SUS, in order to prevent a phenomenon in which the first magnet 1130 attracts the cover member. Alternatively, the cover member may be made of a magnetic material so as to perform the function of a yoke that increases electromagnetic force between the first coil 1120 and the first magnet 1130.

Figure 31:
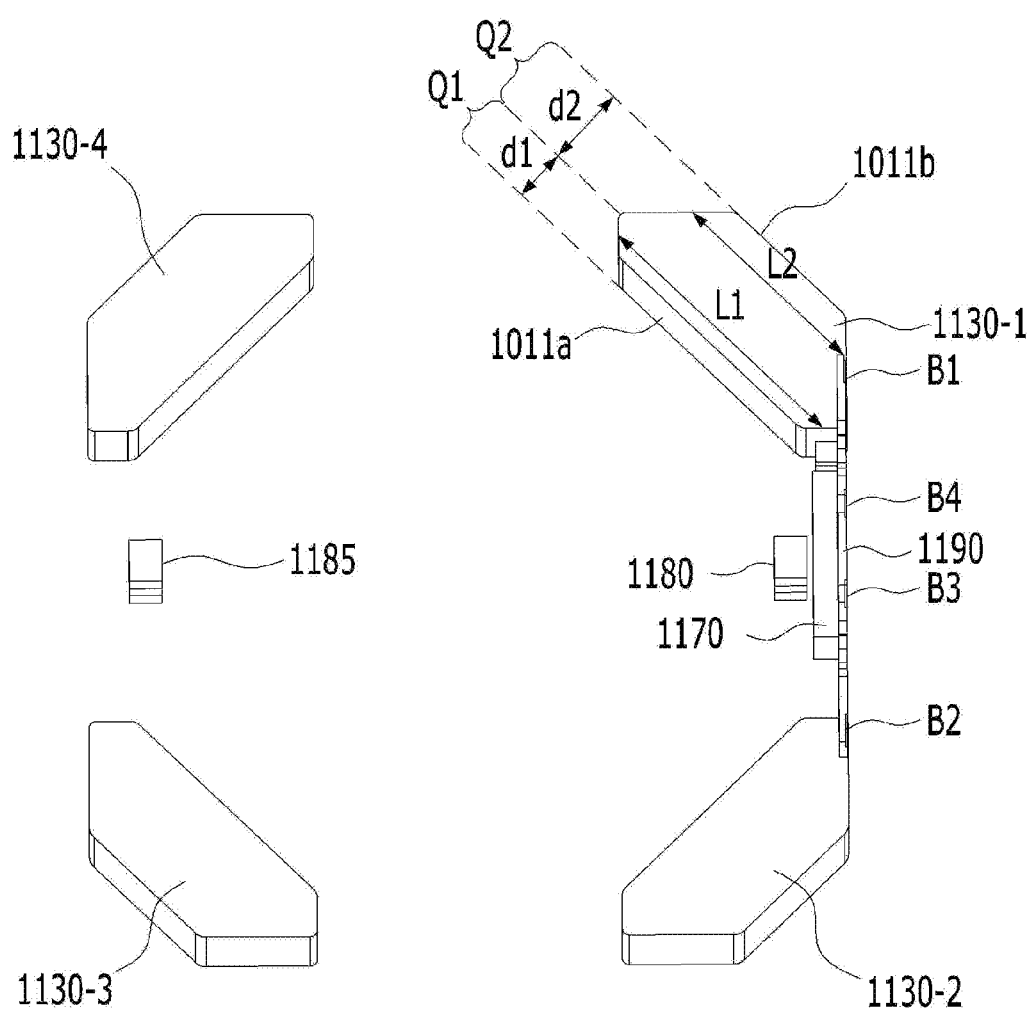
FIG. 31 shows arrangement of the first magnet, second and third magnets, the first position sensor, the capacitor, and the circuit board.
Figure 32:
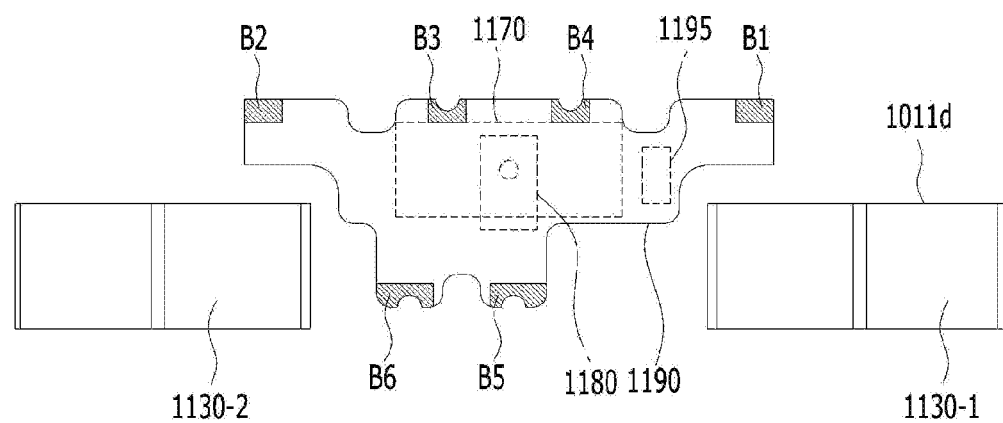
FIG. 32 is a side view of FIG. 31.

FIG. 31 shows arrangement of the first magnets 1130 (1130-1 to 1130-4), the second and third magnets 1180 and 1185, the first position sensor 1170, the capacitor 1195, and the circuit board 1190, and FIG. 32 is a side view of FIG. 31.

Referring to FIGS. 31 and 32, the first magnet 1130-1 may be configured such that the transverse length of the first magnet 1130-1 increases and then decreases in the direction from the first surface 1011a of the first magnet 1130-1 to the second surface 1011b of the first magnet 1130-1.

For example, the first magnet 1130 may include a first portion Q1 having a transverse length L1 gradually increasing in the direction from the first surface 1011a of the first magnet 1130 to the second surface 1011b of the first magnet 1130-1 and a second portion Q2 having a transverse length L2 gradually decreasing in the direction from the first surface 1011a to the second surface 1011b.

The first portion Q1 of the first magnet 1130 may include the first surface 1011a or may abut the first surface 1011a. The second portion Q2 of the first magnet 1130 may include the second surface 1011b or may abut the second surface 1011b.

The reason that the transverse length L2 of the second portion Q2 of the first magnet 1130 decreases is that the first magnet 1130 is disposed in each of the corners 1142-1 to 1142-4 of the housing 1140.

The reason that the length of the first portion Q1 of the first magnet 1130 decreases is that it is necessary to prevent the first magnet 1130 settled at the settlement portion 1141a of the housing 1140 from being separated to the inside the housing 1140. In addition, since the transverse length L1 of the first portion Q1 gradually decreases in the direction from the second surface 1011b to the first surface 1011a, the effect of magnetic field interference between the first magnet 1130 and the second magnet 1180 and magnetic field interference between the first magnet 1130 and the third magnet 1185 may be reduced.

The length d1 of the first portion Q1 of the first magnet 1130 in the direction from the first surface 1011a to the second surface 1011b may be smaller than the length d2 of the second portion Q2 of the first magnet 1130 in the direction from the first surface 1011a to the second surface 1011b (d1<d2). In the case in which d1>d2, the area of the first surface 1011a may be reduced, whereby electromagnetic force due to interaction between the first coil 1120 and the first magnet 1130 may be reduced and thus desired electromagnetic force may not be secured.

For example, the first to fourth terminals B1 to B4 of the circuit board 1190 may be located higher than the upper surface 1011d of the first magnet 1130.

In addition, for example, the fifth and sixth terminals B5 and B6 of the circuit board 1190 may be located between two first magnets 1130-1 and 1130-2 disposed at two corners 1142-1 and 1142-2 of the housing 1140 adjacent to the first side portion 1141-1 of the housing 1140, at which the first position sensor 1170 is disposed.

The upper surface of the first position sensor 1170 may be located higher than the upper surface 1011d of the first magnet 1130, and the lower surface of the first position sensor 1170 may be located equal to or higher than the upper surface 1011d of the first magnet 1130. In another embodiment, the lower surface of the first position sensor 1170 may be located lower than the upper surface of the first magnet 1130.

The first terminal B1 of the circuit board 1190 may overlap the first magnet 1130-1 disposed in the first corner 1142-1 of the housing 1140 in the optical-axis direction, and the second terminal B2 of the circuit board 1190 may overlap the first magnet 1130-2 disposed in the second corner 1142-2 of the housing 1140 in the optical-axis direction.

In addition, for example, at the initial position of the bobbin 1110, the upper surface of the second magnet 1180 (and/or the upper surface of the third magnet 1185) may be located higher than the upper surface 1011d of the first magnet 1130, and the lower surface of the second magnet 1180 (and/or the lower surface of the third magnet 1185) may be located lower than the upper surface 1011d of the first magnet 1130.

In another embodiment, the lower surface of the second magnet 1180 (and/or the lower surface of the third magnet 1185) may be located higher than or equal to the upper surface 1011d of the first magnet 1130.

The following construction may be provided in order to reduce the length of a path along which power signals GND and VDD are transmitted to the first position sensor 1170.

First, the first and second terminals B1 and B2 of the circuit board 1190 for providing the power signals GND and VDD may be connected to the first and second supporting members 1220-1 and 1220-2 disposed at two corners 1142-1 and 1142-1 adjacent to the first side portion 1141-1 of the housing 1140, at which the first position sensor 1170 is disposed, whereby the length of the path may be reduced.

In addition, the first and second terminals B1 and B2 of the circuit board 1190 may be disposed at the body portion S1 of the circuit board 1190, whereby the length of the path may be reduced.

In addition, the first terminal B1 of the circuit board 1190 may be disposed at one end of the circuit board 1190 such that the first terminal B1 overlaps the first corner 1142-1 of the housing 1140 in the optical-axis direction, and the second terminal B2 of the circuit board 1190 may be disposed at the other end of the circuit board 1190 such that the second terminal B2 overlaps the second corner 1142-2 of the housing 1140 in the optical-axis direction, whereby the length of the path may be reduced.

In addition, the distance (for example, the shortest distance) between the first terminal B1 of the circuit board 1190 and the first supporting member 1220-1 is smaller than the distance (for example, the shortest distance) between the third terminal B3 of the circuit board 1190 and the first supporting member 1220-1 and the distance (for example, the shortest distance) between the fourth terminal B4 of the circuit board 1190 and the first supporting member 1220-1.

In addition, the distance (for example, the shortest distance) between the second terminal B2 of the circuit board 1190 and the second supporting member 1220-2 is smaller than the distance (for example, the shortest distance) between the third terminal B3 of the circuit board 1190 and the second supporting member 1220-2 and the distance (for example, the shortest distance) between the fourth terminal B4 of the circuit board 1190 and the second supporting member 1220-2.

As the length of the path is reduced for the above reasons, the length of each of the first and second extension portions P1 and P2 may be reduced, whereby resistance of the path (for example, resistance of the first and second upper elastic units 1150-1 and 1150-2) may be reduced.

In addition, each of the first upper elastic unit 1150-1 connected to the first terminal B1 of the circuit board 1190 and the second upper elastic unit 1150-2 connected to the second terminal B2 has the first outer frame coupled to the housing 1140 but does not have the first inner frame 1151 and the first frame connection portion, whereby resistance may be reduced compared to the third and fourth upper elastic unit 1150-3 and 1150-4.

As the length of the path along which the power signals GND and VDD are transmitted to the first position sensor 1170 is reduced for the above reasons in the embodiment, resistance of the path (for example, resistance of the first and second upper elastic units 1150-1 and 1150-2) may be reduced, whereby it is possible to prevent reduction in the power signals GND and VDD, to reduce power consumption, and to reduce operating voltage of the driver IC of the first position sensor 1170.

In the embodiment, in order to easily perform soldering for coupling with the first to fourth extension portions P1 to P4 of the upper elastic units 1150-1 to 1150-4 and thus to improve solderability, the first to sixth terminals P1 to P6 may be disposed at the first surface 1019b of the circuit board 1190.

If the first to sixth terminals P1 to P6 are disposed at the second surface 1019a of the circuit board 1190, soldering may be difficult, solderability may be deteriorated, and foreign matter due to soldering (for example, contaminants) may be introduced into the lens moving apparatus 1100, whereby the lens moving apparatus 1100 may malfunction.

Since the third and fourth terminals B3 and B4 are disposed between the first terminal B1 and the second terminal B2, and the circuit board 1190 extends or protrudes to the first corner 1142-1 or the second corner 1142-2 of the housing 1140 in order to reduce the length of the path, a portion of each of the third upper elastic unit 1150-3 and the fourth upper elastic unit 1150-4 (for example, the third extension portion P3 or the fourth extension portion P4) may be coupled to the third and fourth terminals B3 and B4 through the circuit board 1190.

The fifth and sixth terminals B5 and B6 of the circuit board 1190 may be disposed at the extension portion S2 of the circuit board 1190 so as to be easily coupled to the lower elastic units 1160-1 and 1160-2.

Since magnetic field interference between the second and third magnets 1180 and 1185 and the first magnet 1130 is alleviated in the embodiment, it is possible to prevent a reduction in AF driving force due to magnetic field interference and thus to obtain desired AF driving force without a separate yoke.

In the embodiment, as described above, it is possible to reduce the number of supporting members and to reduce the size of the lens moving apparatus as the result of reducing the number of supporting members.

In addition, since the number of supporting members is reduced, it is possible to reduce resistance of the supporting members, whereby it is possible to reduce consumption of current and to improve sensitivity of OIS driving.

In addition, it is possible to increase the thickness of the supporting members in order to obtain the same elastic force instead of reducing the number of supporting members, and it is possible to reduce the influence of external impact on the OIS operation unit as the thickness of the supporting members is increased.

Figure 33:
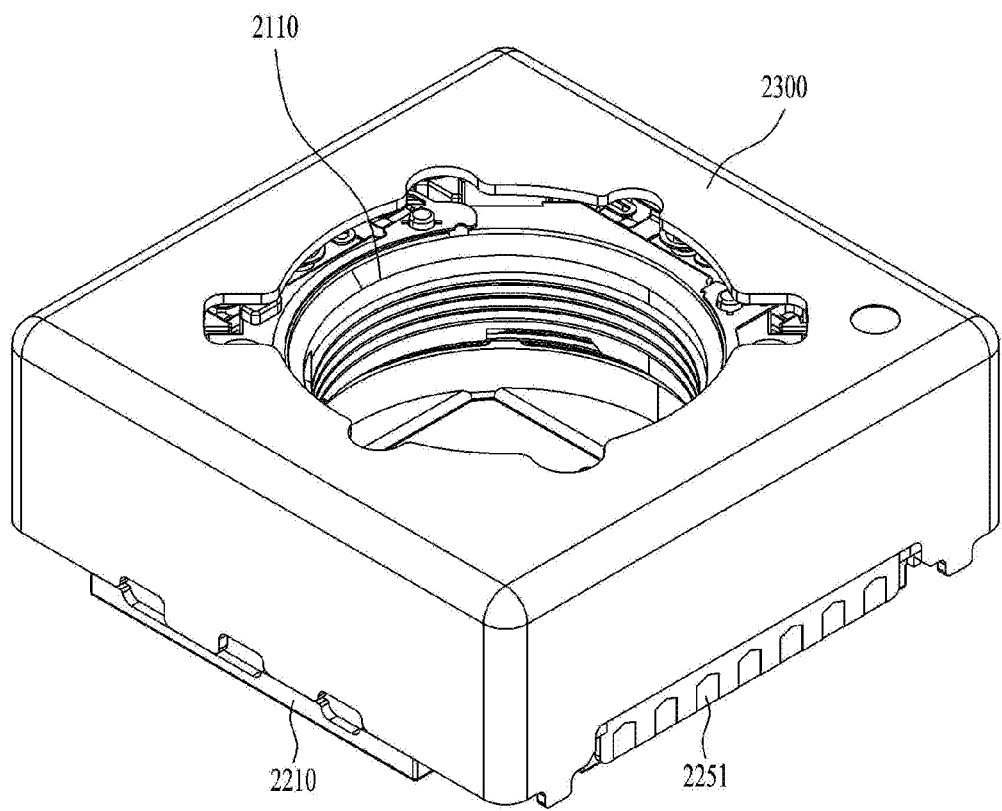
FIG. 33 is a perspective view of a lens moving apparatus according to another embodiment.
Figure 34:
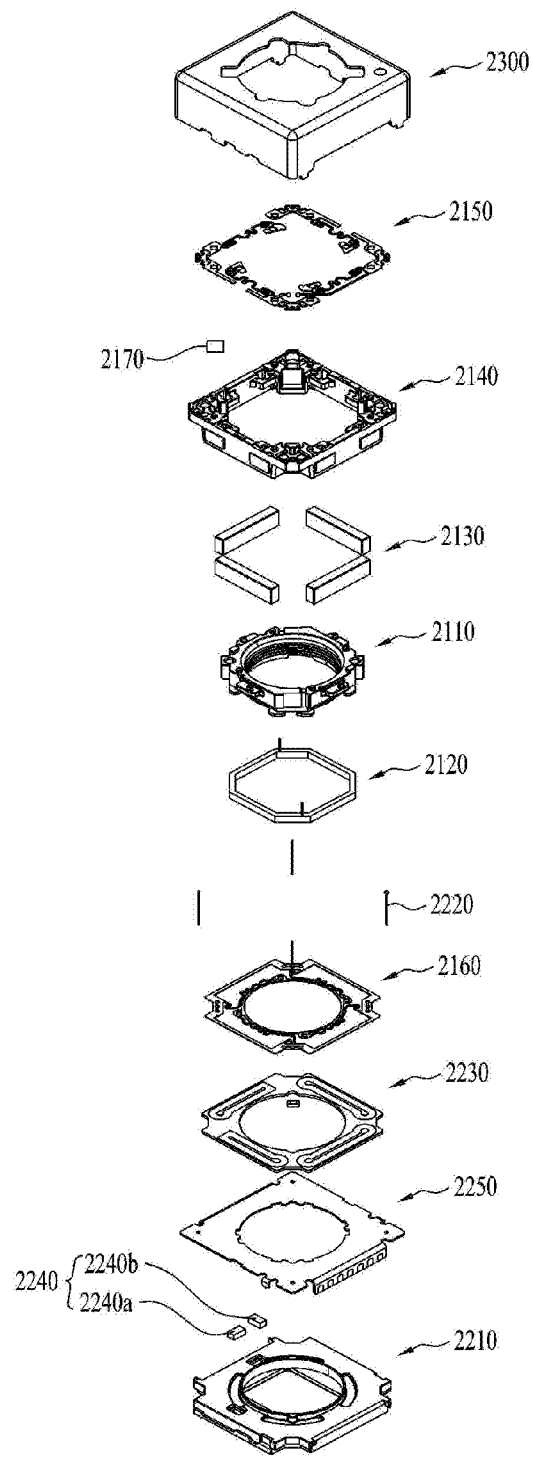
FIG. 34 is an exploded view of the lens moving apparatus shown in FIG. 33.
Figure 35:
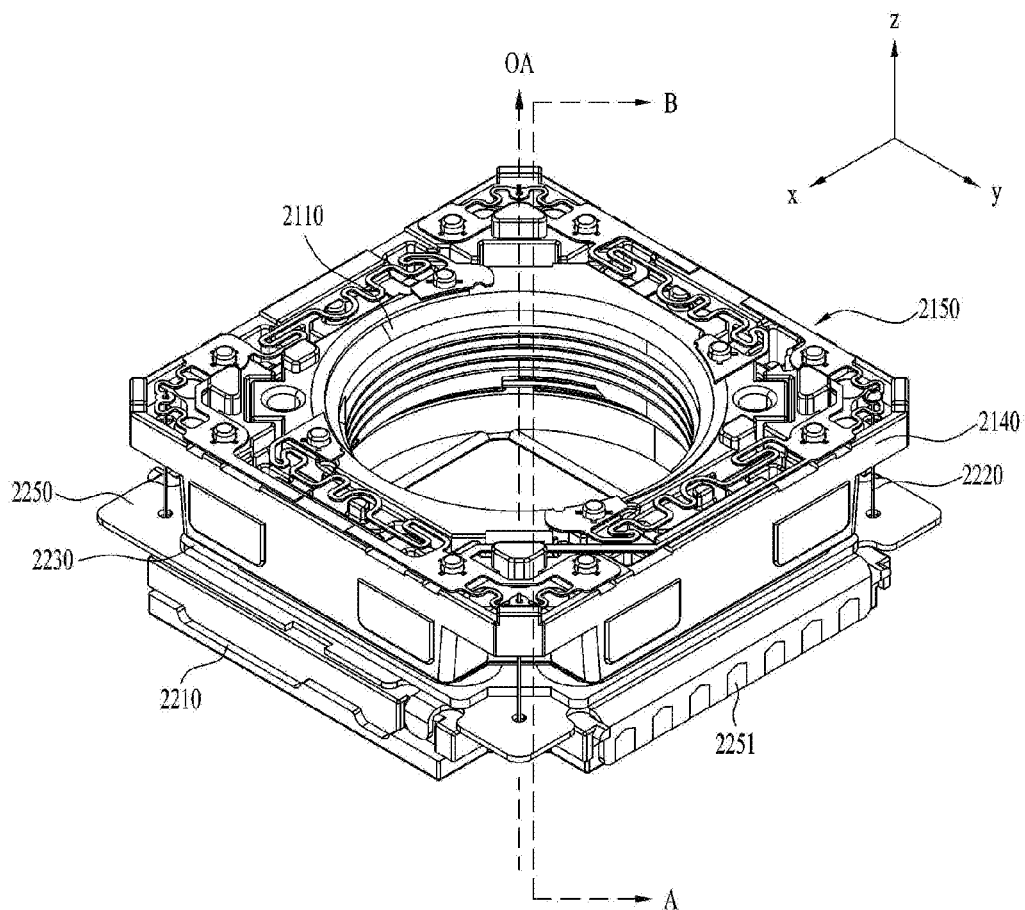
FIG. 35 is an assembled view of the lens moving apparatus of FIG. 33 with a cover member removed.

FIG. 33 is a perspective view of a lens moving apparatus 2100 according to another embodiment, FIG. 34 is an exploded view of the lens moving apparatus 2100 shown in FIG. 33, and FIG. 35 is an assembled view of the lens moving apparatus 2100 of FIG. 33 with a cover member 2300 removed.

Referring to FIGS. 33 to 35, the lens moving apparatus 2100 may include a bobbin 2110, a first coil 2120, a magnet 2130, a housing 2140, an upper elastic member 2150, a lower elastic member 2160, and a coil chip 2170.

In addition, the lens moving apparatus 2100 may further include a circuit board 2250 connected to the first coil 2120 and the coil chip 2170.

In addition, the lens moving apparatus 2100 may further include a supporting member 2220 and a base 2210.

In addition, the lens moving apparatus 2100 may further include a second coil 2230 for optical image stabilizer (OIS) driving, and may further include a second position sensor 2240 for OIS feedback driving.

In addition, the lens moving apparatus 2100 may further include a cover member 2300.

The cover member 2300 will be described.

The cover member 2300 receives the other components 2110, 2120, 2130, 2140, 2150, 2160, 2170, 2220, 2230, and 2250 in a receiving space formed together with the base 2210.

The cover member 2300 may be formed in the shape of a box, the lower portion of which is open and which includes an upper plate and side plates. The lower portion of the cover member 2300 may be coupled to the base 2210. The shape of the upper plate of the cover member 2300 may be polygonal, e.g. quadrangular or octagonal.

The cover member 2300 may be provided in the upper plate thereof with an opening, through which a lens (not shown) coupled to the bobbin 2110 is exposed to external light. The cover member 2300 may be made of a nonmagnetic material, such as SUS in order to prevent a phenomenon in which the magnet 2130 attracts the cover member.

Alternatively, the cover member may be made of a magnetic material so as to perform the function of a yoke that increases electromagnetic force between the first coil 2120 and the magnet 2130.

Next, the bobbin 2110 will be described.

A lens or a lens barrel may be mounted to the bobbin 2110, and the bobbin is disposed in the housing 2140. The bobbin 2110 may have an opening, in which the lens or the lens barrel is mounted. The shape of the opening of the bobbin 110 may be circular, oval, or polygonal. However, the disclosure is not limited thereto.

Figure 36A:
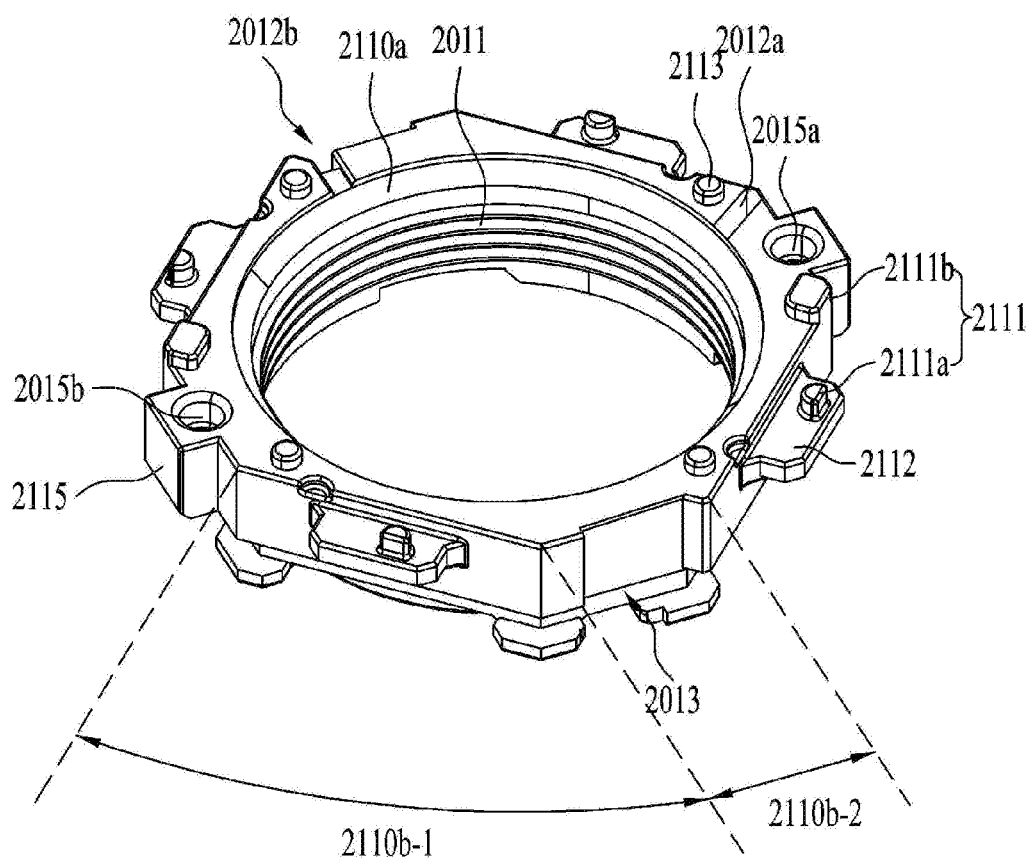
FIG. 36A is a perspective view of a bobbin shown in FIG. 34.
Figure 36B:
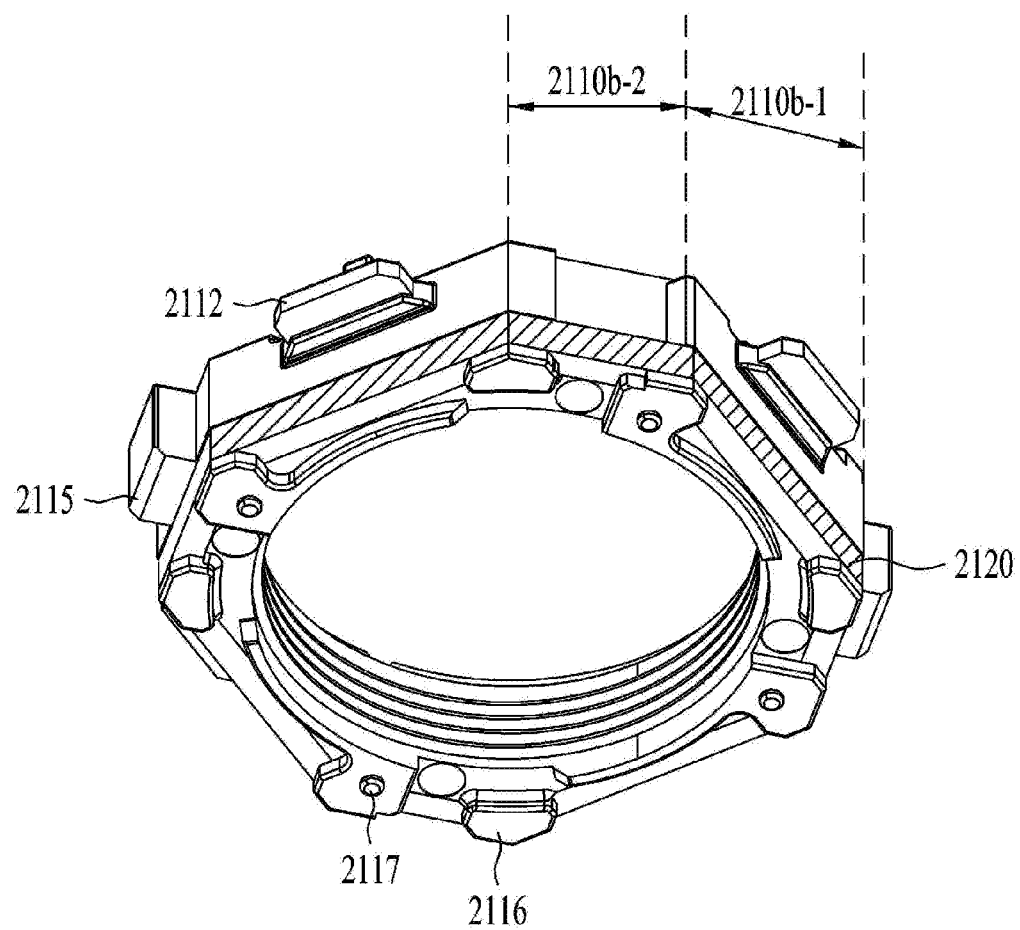
FIG. 36B is a bottom perspective view of the bobbin and a first coil.

FIG. 36A is a perspective view of the bobbin 2110 shown in FIG. 34, and FIG. 36B is a bottom perspective view of the bobbin 2110 and the first coil 2120.

Referring to FIGS. 36A and 36B, the bobbin 2110 may include a first protrusion 2111 protruding from the upper surface thereof in the first direction and a second protrusion 2112 protruding from the outer surface 2110*b* of the bobbin 2110 in the second and/or third direction.

The bobbin 2110 may include first side portions 2110*b*-1 and second side portions 2110*b*-2.

Each of the first side portions 2110*b*-1 of the bobbin 2110 may correspond to or be opposite the magnet 2130. Each of the second side portions 2110*b*-2 of the bobbin 2110 may be disposed between two adjacent first side portions.

The first protrusion 2111 of the bobbin 2110 may include a first guide portion 2111*a* and a first stopper 2111*b*. The first guide portion 2111*a* of the bobbin 2110 may guide the installation position of a first frame connection portion 2153 of the upper elastic member 2150, or may support a damper located between the first frame connection portion 2153 and the bobbin 2110.

The second protrusion 2112 of the bobbin 2110 may be formed so as to protrude from the outer surface of each of the first side portions 2110*b*-1 of the bobbin 2110 in a direction perpendicular to the optical axis OA or in the second and/or third direction.

The first stopper 2111*b* and the second protrusion 2112 of the bobbin 2110 may serve to prevent the upper surface and/or the side surface of the bobbin 2110 from directly colliding with the inside of the cover member 2300 even in the case in which the bobbin 2110 is moved beyond a predetermined range due to external impact when the bobbin 2110 is moved in the first direction in order to perform an autofocus function.

The bobbin 2110 may include a third protrusion 2115 protruding from the outer surface of each of the second side portions 2110*b*-2 in a direction perpendicular to the optical axis OA. For example, the bobbin 2110 may include two third protrusions 2115 provided at two facing second side portions 2110*b*-2.

The third protrusion 2115 of the bobbin 2110 may correspond to a recess 2025*a* of the housing 2140, may be inserted into or disposed in the recess 2025*a* of the housing 2140, and may inhibit or prevent the bobbin 21110 from being rotated about the optical axis while deviating from a predetermined range.

The bobbin 2110 may have a second stopper 2116 protruding from the lower surface thereof, and the second stopper 2116 may serve to prevent the lower surface of the bobbin 2110 from directly colliding with the base 2210, the second coil 2230, or the circuit board 2250 even in the case in which the bobbin 2110 is moved beyond the predetermined range due to external impact when the bobbin 2110 is moved in the first direction in order to perform the autofocus function.

The bobbin 2110 may have at least one first coil recess (not shown), in which the first coil 2120 is disposed or installed. For example, the first coil recess may be provided in the first side portions 2110*b*-1 and the second side portions 2110*b*-2 of the bobbin 2110. However, the disclosure is not limited thereto.

The shape and number of the first coil recesses may correspond to the shape and number of the first coils 2120 disposed at the outer surface of the bobbin 2110. For example, the first coil recesses provided in the first side portions 2110*b*-1 and the second side portions 2110*b*-2 of the bobbin 2110 may be ring-shaped. However, the disclosure is not limited thereto.

In addition, the bobbin 2110 may have a first recess 2012*a* and a second recess 2012*b* provided in the outer surface thereof so as to be spaced apart from each other. For example, the first recess 2012*a* and the second recess 2012*b* may be provided in the outer surface of the first side portion and the outer surface of the second side portion.

The first recess 2012*a* and the second recess 2012*b* may be located at the upper side of the coil 2120 disposed at the bobbin 2110, and may be connected to the first coil recess.

A first portion extending from one end of the first coil 2120 disposed at the outer surface of the bobbin 2110 may be disposed in the first recess 2012*a*, and a second portion extending from the other end of the first coil 2120 disposed at the outer surface of the bobbin 2110 may be disposed in the second recess 2012*b*.

In this case, the first portion of the first coil 2120 may extend to the upper surface of the bobbin 2110 so as to be connected to a first outer frame 2151 of a first upper spring 2150-1, and the second portion of the first coil 2120 may extend to the upper surface of the bobbin 2110 so as to be connected to a second outer frame 2151 of a second upper spring 2150-2.

In the embodiment, the first coil 2120 extends to the upper surface of the bobbin 2110 for connection with the first and second upper springs. However, the disclosure is not limited thereto. In another embodiment, the first and second recesses may be located under the coil 2120, the first and second portions of the coil may extend to the lower surface of the bobbin 2110 and may be connected to lower springs of the lower elastic member.

In another embodiment, the bobbin 2110 may have no first coil recess, and the first coil 2120 may be directly wound around the outer surface of the bobbin 2110 and may be fixed thereto.

In addition, the bobbin 2110 may be provided at the upper surface thereof with a first upper protrusion 2113, which is coupled to a hole 2151*a* of a first inner frame 2151.

The first upper protrusion 2113 may be provided at the upper surface of each of the first side portions 2110*b*-1 of the bobbin 2110. However, the disclosure is not limited thereto.

The bobbin 2110 may be provided at the lower surface thereof with a first lower protrusion 2117, which is coupled and fixed to a hole 2161*a* of the lower elastic member 2160.

A screw thread 2011 for coupling with the lens or the lens barrel may be provided in the inner surface of the bobbin 2110. The screw thread 2011 may be formed in the inner surface of the bobbin 2110 in the state in which the bobbin 2110 is fixed using a jig. Jig fixing recesses 2015*a* and 2015*b* may be provided in the upper surface of the bobbin 2110. For example, the jig fixing recesses 2015*a* and 2015*b* may be provided in the upper surfaces of two facing second side portions 2110*b*-2 of the bobbin 2110 at which the third protrusion 2115 is disposed. However, the disclosure is not limited thereto.

Next, the first coil 2120 will be described.

The first coil 2120 may be a driving coil that is disposed at the outer surface of the bobbin 2110 and performs electromagnetic interaction with the magnet 2130 disposed at the housing 2140.

In order to generate electromagnetic force due to interaction with the magnet 2130, a driving signal (e.g. driving current or voltage) may be applied to the first coil 2120.

The driving signal applied to the first coil 2120 may be a direct-current signal or an alternating-current signal. For example, the driving signal may have the form of current or voltage.

In order to generate induced voltage at the coil chip 2170 due to mutual induction between the first coil 2120 and the coil chip 2170, the driving signal applied to the first coil 2120 may include an alternating-current signal.

For example, the driving signal may be a sinusoidal signal or a pulse signal (for example, a pulse width modulation (PWM) signal).

Alternatively, in another embodiment, the driving signal applied to the first coil 2120 may be an alternating-current signal.

An AF operation unit may be moved in the first direction, e.g. in the upward direction (a positive X-axis direction) or the downward direction (a negative X-axis direction) due to electromagnetic force caused by interaction between the first coil 2120 and the magnet 2130. The intensity and/or polarity (for example, the current flow direction) of the driving signal applied to the first coil 2120 may be controlled in order to control intensity and/or direction of electromagnetic force caused by interaction between the first coil 2120 and the magnet 2130, whereby it is possible to control motion of the AF operation unit in the first direction and thus to perform an autofocus function.

The AF operation unit may include the bobbin 2110 elastically supported by the upper elastic member 2150 and the lower elastic member 2160 and components mounted to the bobbin 2110 so as to be movable with the bobbin 2110. For example, the AF operation unit may include the bobbin 2110 and the first coil 2120. In addition, for example, the AF operation unit may further include the lens (not shown) mounted to the bobbin 2110.

The first coil 2120 may be disposed at the bobbin 2110 so as to have a closed-loop shape. For example, the first coil 2120 may be wound or disposed around the outer surface of the bobbin 2110 in the clockwise direction or in the counterclockwise direction about the optical axis. In another embodiment, the first coil 2120 may be realized so as to have the shape of a coil ring wound or disposed in the clockwise direction or in the counterclockwise direction about an axis perpendicular to the optical axis OA. The number of coil rings may be equal to the number of magnets 2130. However, the disclosure is not limited thereto.

The first coil 2120 may be connected to at least one of the upper elastic member 2150 or the lower elastic member 2160, and may be connected to the circuit board 2250 via the upper elastic member 2150 or the lower elastic member 2160 and the supporting member 2220.

For example, the first coil 2120 may be connected to a first inner frame 2151 of each of third and fourth upper springs 2150-3 and 2150-4, and may be connected to the circuit board 2250 via third and fourth supporting members 2220-3 and 2220-4.

The housing 2140 receives the bobbin 2110, at which the first coil 2120 is mounted or disposed, therein.

Figure 37A:
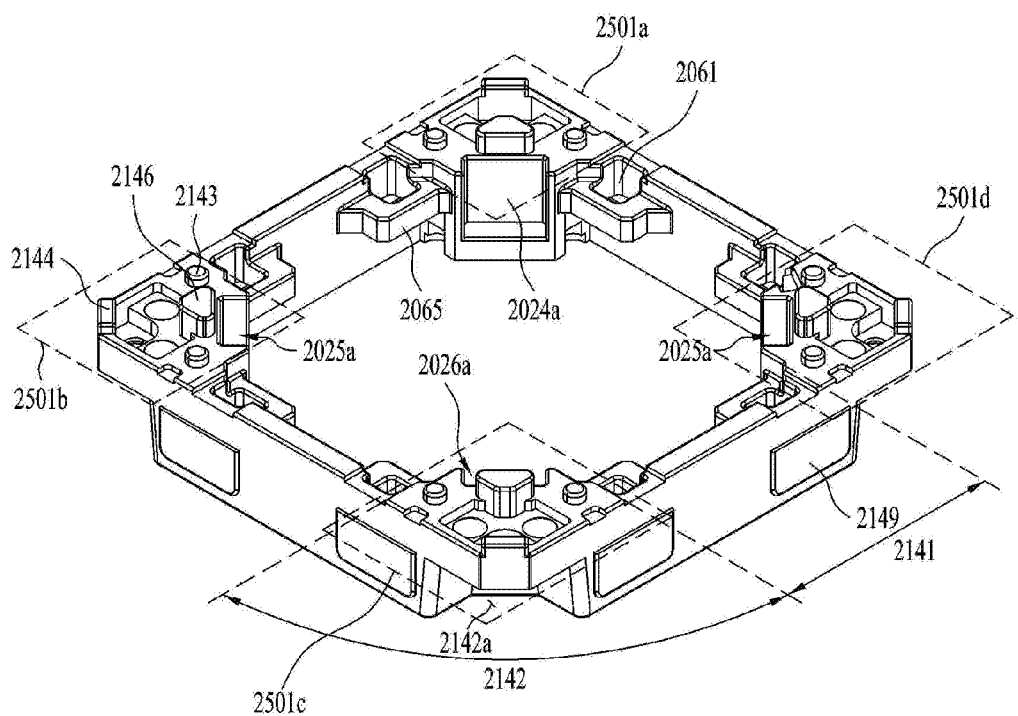
FIG. 37A is a first perspective view of a housing shown in FIG. 34.
Figure 37B:
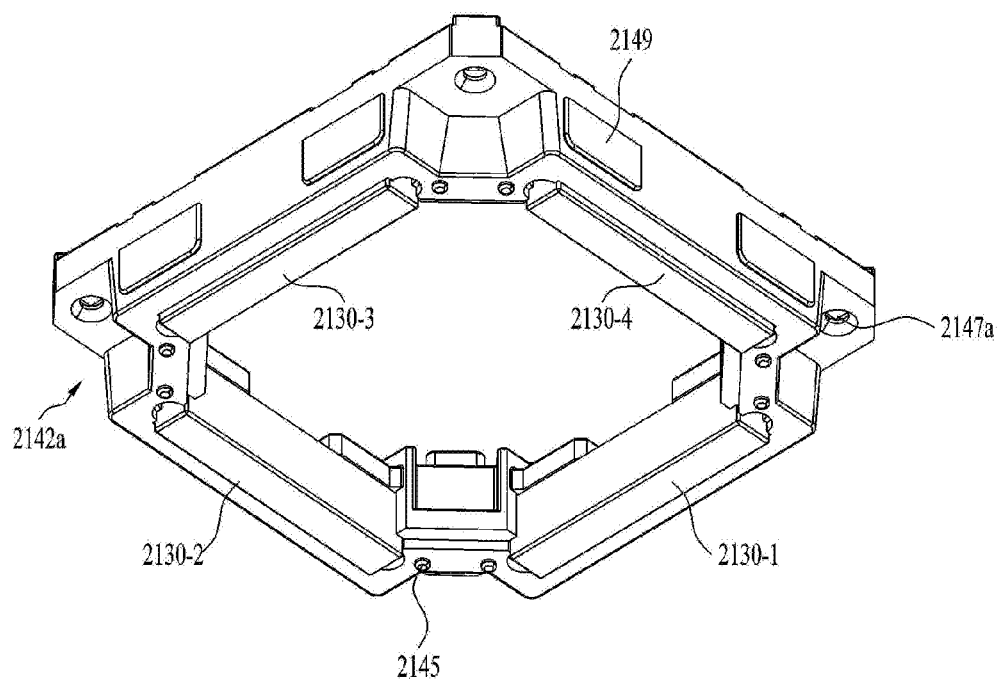
FIG. 37B is a second perspective view of the housing shown in FIG. 37A.
Figure 38A:
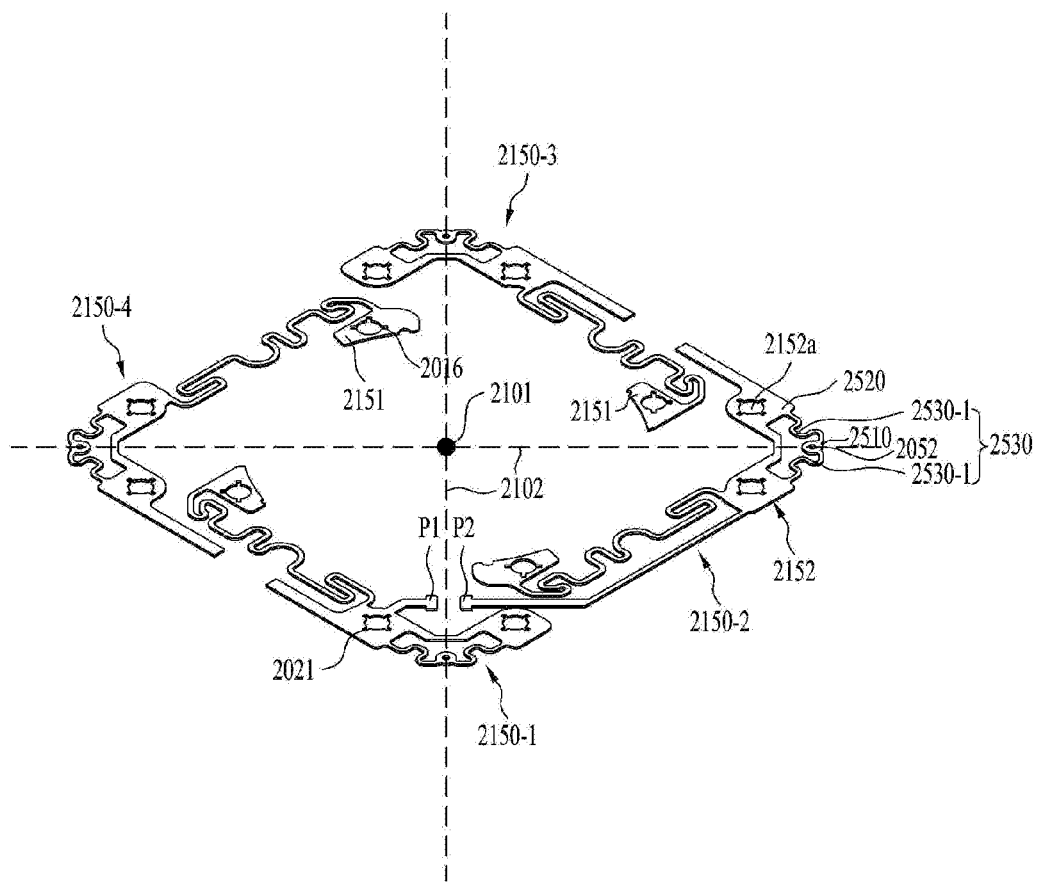
FIG. 38A is a perspective view of an upper elastic member.
Figure 38B:
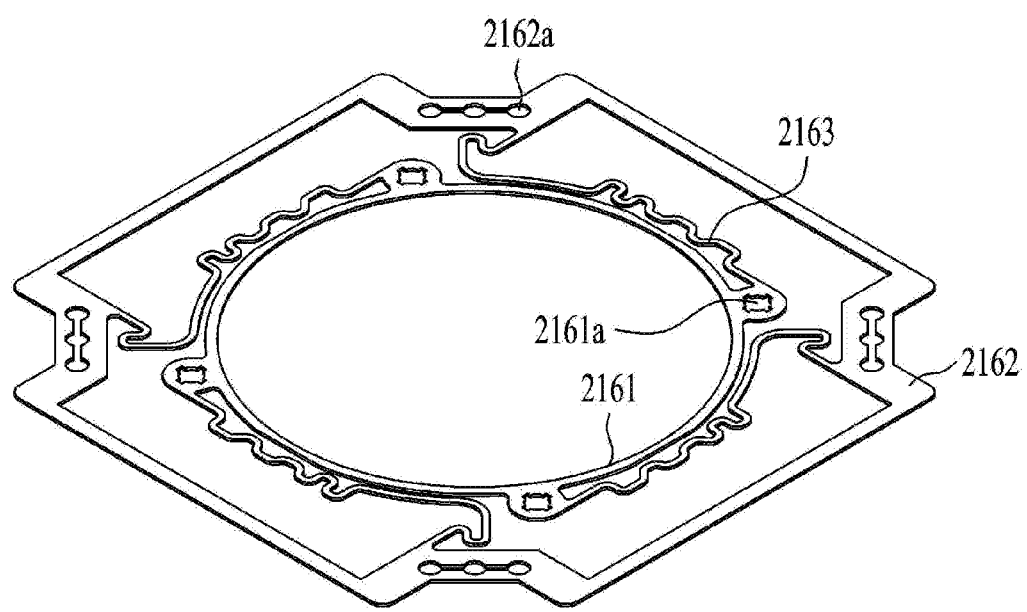
FIG. 38B is a perspective view of a lower elastic member.
Figure 39:
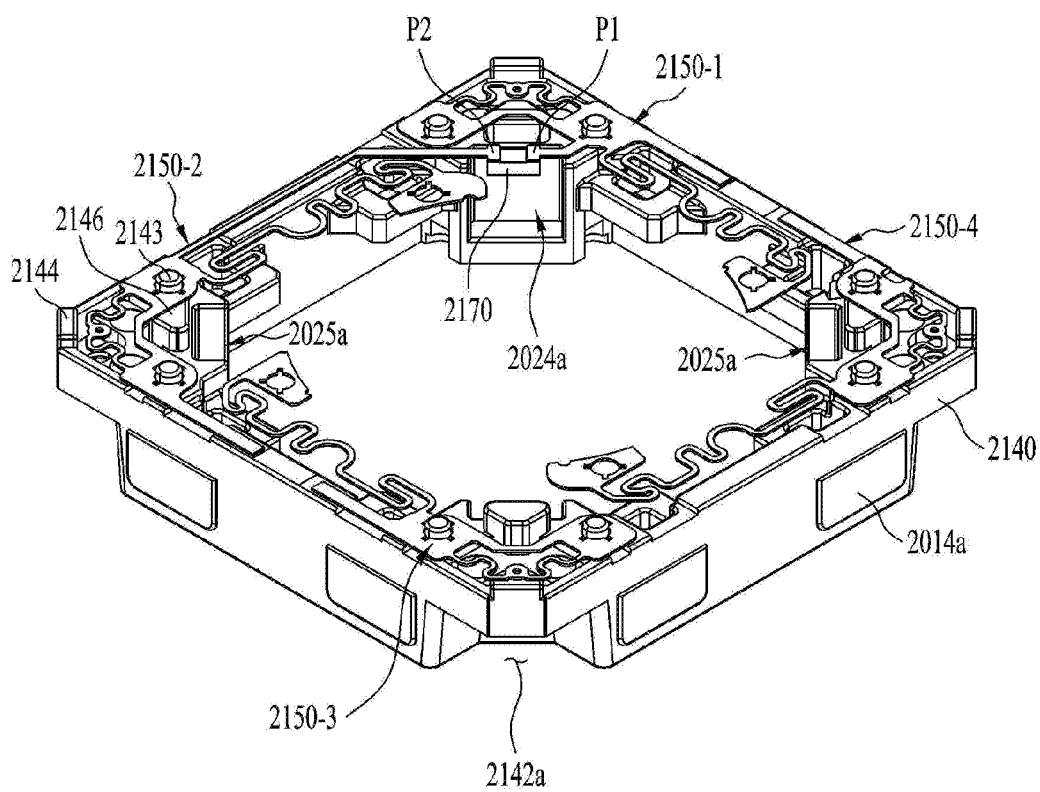
FIG. 39 shows the housing, the upper elastic member, and a coil chip.
Figure 40:
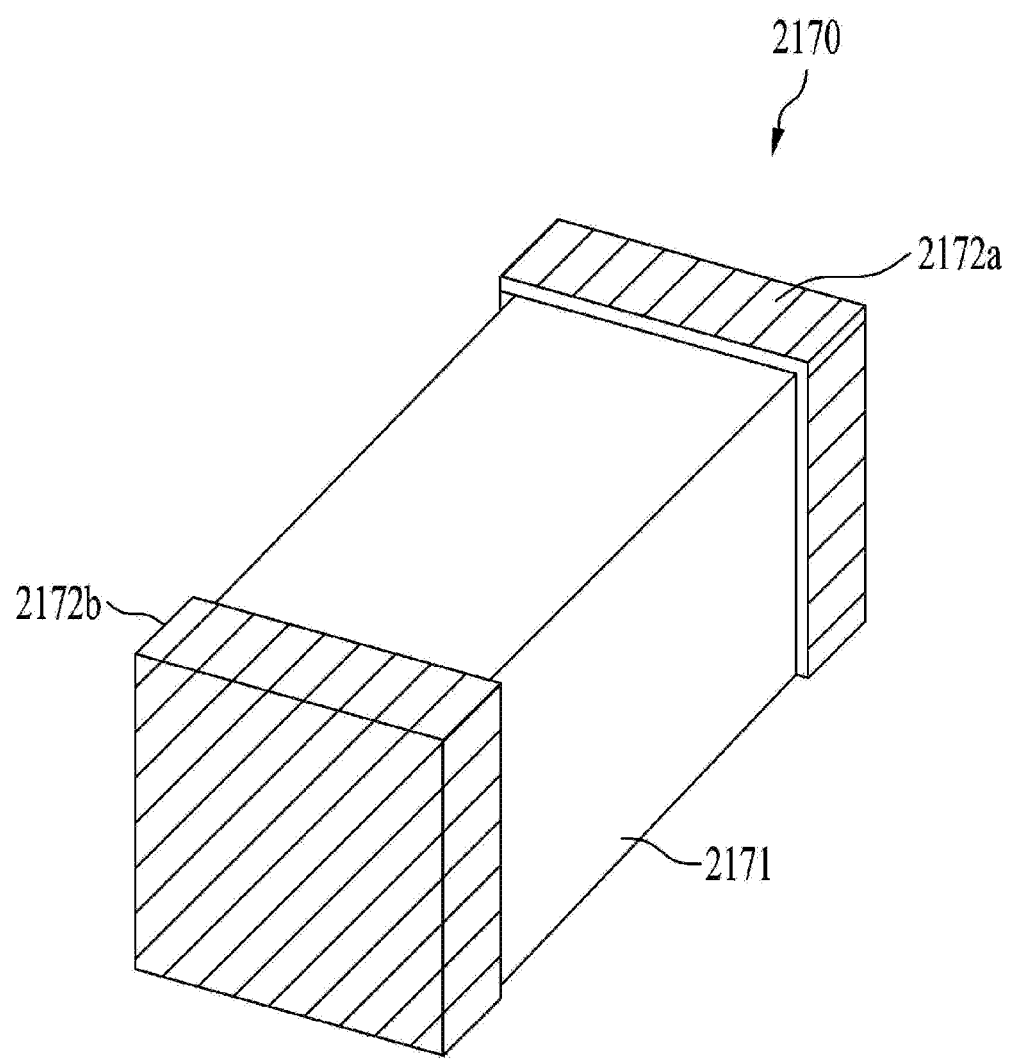
FIG. 40 is an enlarged view of the coil chip shown in FIG. 39.
Figure 41:
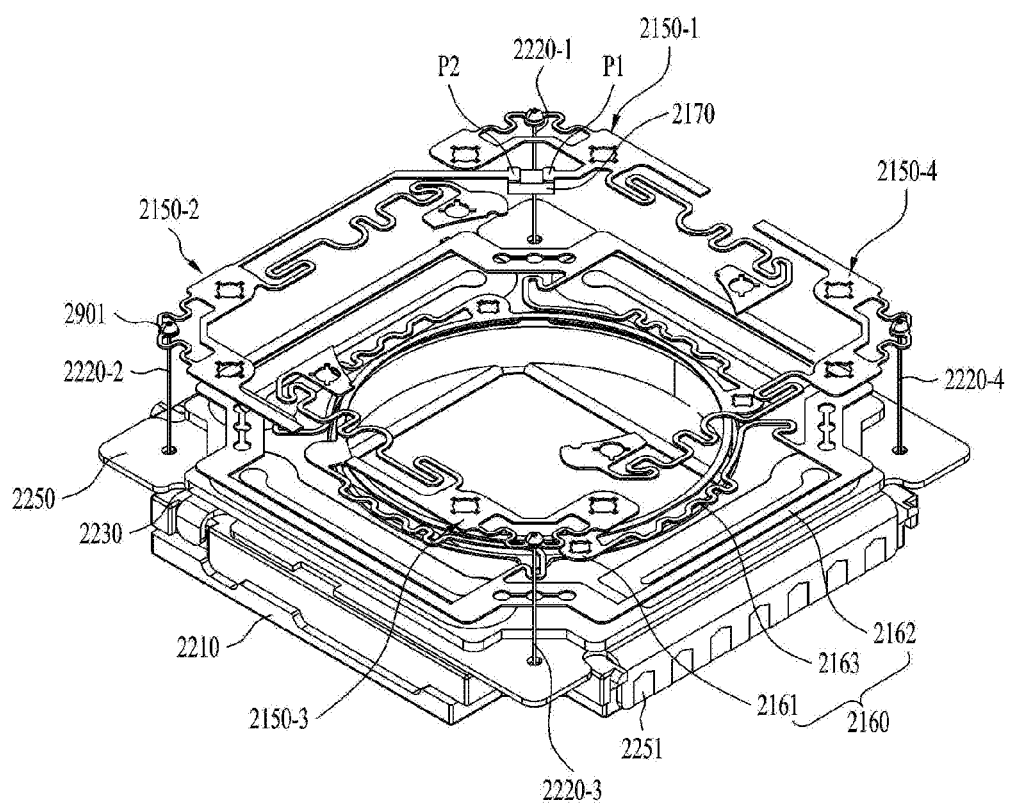
FIG. 41 is a perspective view of the upper elastic member, the lower elastic member, the coil chip, a supporting member, a second coil, a circuit board, and a base of FIG. 34.
Figure 42:
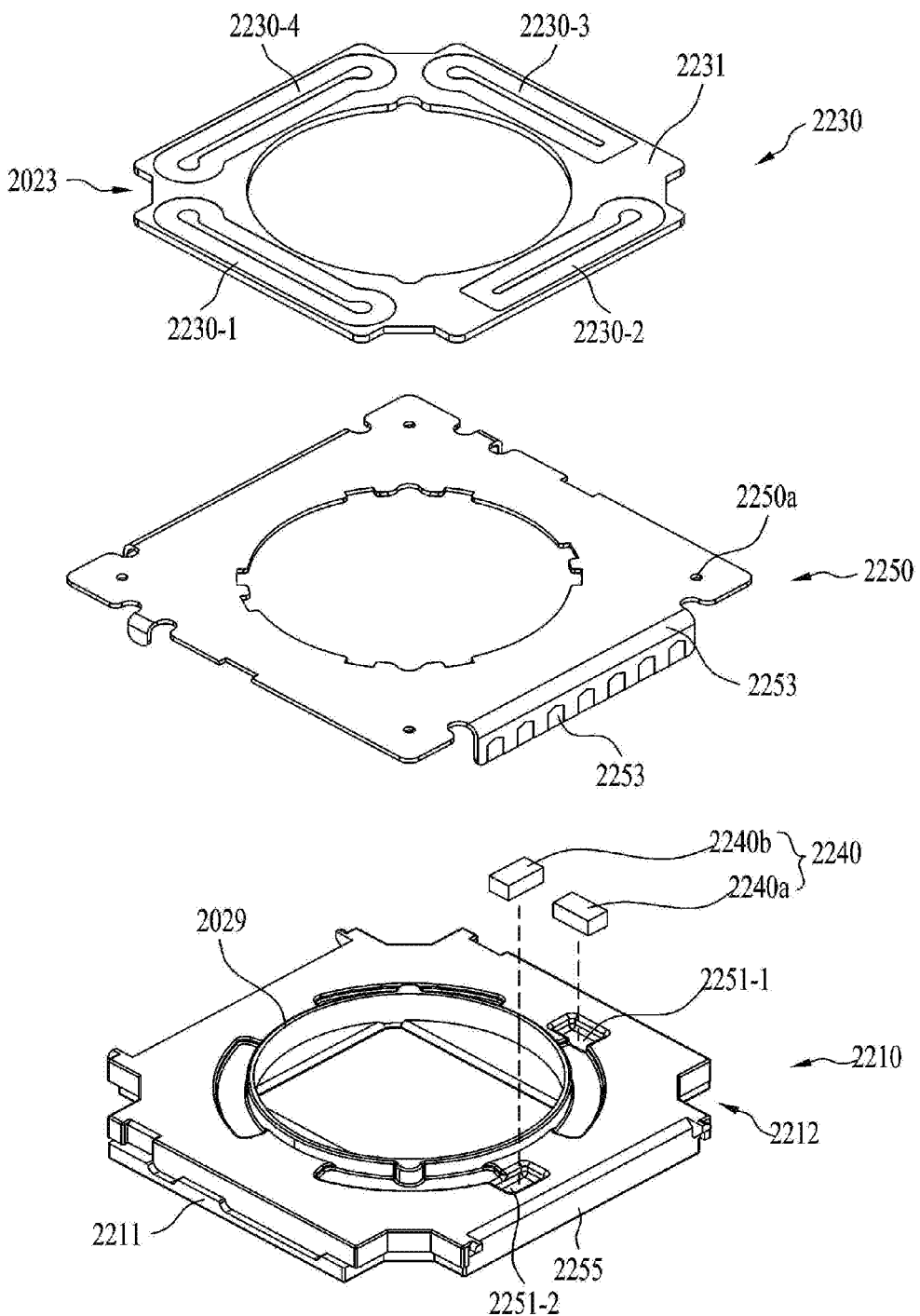
FIG. 42 is a separated perspective view of the base, the circuit board, and the second coil of FIG. 34.
Figure 43:
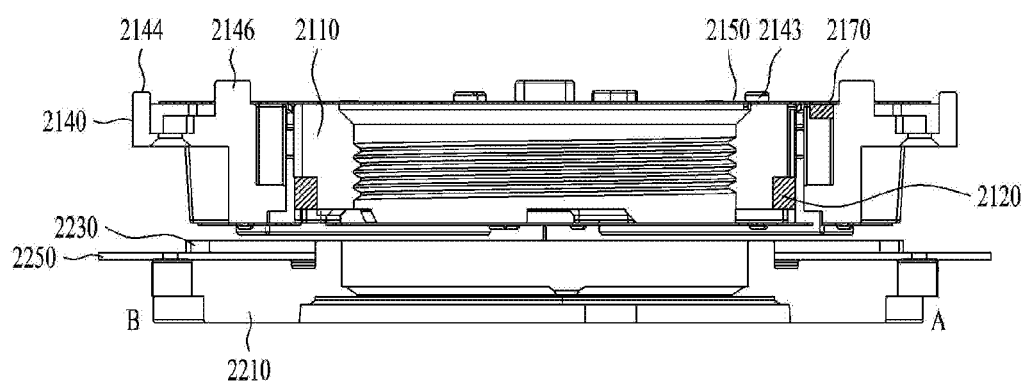
FIG. 43 is a sectional view of the lens moving apparatus 2100 shown in FIG. 35 in an AB direction.

FIG. 37A is a first perspective view of the housing 2140 shown in FIG. 34, FIG. 37B is a second perspective view of the housing 2140 shown in FIG. 37A, FIG. 38A is a perspective view of the upper elastic member 2150, FIG. 38B is a perspective view of the lower elastic member 2160, FIG. 39 shows the housing 2140, the upper elastic member 2150, and the coil chip 2170, FIG. 40 is an enlarged view of the coil chip 2170 shown in FIG. 39, FIG. 41 is a perspective view of the upper elastic member 2150, the lower elastic member 2160, the coil chip 2170, the supporting member 2220, the second coil 2230, the circuit board 2250, and the base 2210 of FIG. 34, FIG. 42 is a separated perspective view of the base 2210, the circuit board 2260, and the second coil 2230 of FIG. 34, and FIG. 43 is a sectional view of the lens moving apparatus 2100 shown in FIG. 35 in an AB direction.

Referring to FIGS. 37A and 37B, the housing 2140 may generally have the form of an open pillar, and may include a plurality of first side portions 2141 and second side portions 2142 defining an opening.

For example, the housing 2140 may include first side portions 2141 spaced apart from each other and second side portions 2142 spaced apart from each other, and each of the first side portions 2141 may be disposed or located between two adjacent second side portions 2142, and may interconnect the second side portions 2142.

The second side portions 2142 of the housing 2140 may referred to as "corners" in that the second side portions 2142 of the housing 2140 may be located at corner regions of the housing 2140.

For example, in FIG. 37A, the first side portions 2141 of the housing 2140 may include a first side portion, a second side portion, a third side portion, and a fourth side portion, and the corners of the housing 2140 may include a first corner 2501*a*, a second corner 2501*b*, a third corner 2501*c*, and a fourth corner 2501*d*.

The first side portions 2141 of the housing 2140 may correspond to the first side portions 2110*b*-1 of the bobbin 2110, and the second side portions 2142 of the housing 2140 may correspond to the second side portions 2110*b*-2 of the bobbin 2110. However, the disclosure is not limited thereto.

Magnets 2130 (2130-1 to 2130-4) may be disposed or installed at the first side portions 2141 of the housing 2140, and supporting members 2220 (2220-1 to 2220-4) may be disposed at the second side portions 2142 of the housing 2140.

The housing 2140 may have magnet settlement portions 2141*a* provided at the inner surfaces of the first side portions 2141 in order to support or receive the magnets 2130 (2130-1 to 2130-4).

The housing 2140 may be provided in the first side portions 2141 thereof with recesses or holes 2061 for injecting an adhesive used to attach the magnets 2130 to the magnet settlement portions 2141*a* of the housing 2140. For example, the holes 2061 may be through holes.

The first side portions 2141 of the housing 2140 may be disposed parallel to the side surface of the cover member 2300. Holes 2147*a*, through which the supporting members 2220 extend, may be provided in the second side portions 2142 of the housing 2140.

For example, the diameter of each of the holes 2147*a* may gradually increase in the direction from the upper surface to the lower surface of the housing 2140 for easy coating of a damper. However, the disclosure is not limited thereto. In another embodiment, the diameter of each of the holes 2147*a* may be uniform.

In addition, a second stopper 2144 may be provided at the upper surface of the housing 2140 in order to prevent direct collision with the inner surface of the cover member 2300. For example, the second stopper 2144 may be disposed at each of the first to fourth corners 2501*a* to 2501*d* of the housing 2140. However, the disclosure is not limited thereto.

In addition, the housing 2140 may be provided at the upper surface thereof with a second guide portion 2146 for guiding the installation position of the first outer frame 2152 of the upper elastic member 2150 and preventing direct collision with the inner surface of the cover member 2300 when the upper elastic member 2150 is disposed at the upper surface of the housing 2140. Referring to FIG. 43, the height of the second guide portion 2146 is greater than the height of the second stopper 2144. However, the disclosure is not limited thereto. In another embodiment, the height of the second guide portion 2146 and the height of the second stopper 2144 may be equal to each other, or the height of the second stopper 2144 is greater than the height of the second guide portion 2146.

The second guide portion 2146 may be disposed at each of the corners 2501a to 2501d of the housing 2140 so as to be spaced apart from the second stopper 2144. For example, the second guide portion 2146 and the second stopper 2144 may face each other in a diagonal direction. Here, the diagonal direction may be a direction from the center of the housing 2140 toward the second stopper 2144.

The housing 2140 may have at least one second upper protrusion 2143 provided at the upper surfaces of the second side portions 2142 so as to be coupled to holes 2152a of the first outer frame 2152 of the upper elastic member 2150.

The second upper protrusion 2143 may be disposed at the upper surface of at least one of the first to fourth corners 2501a to 2501d of the housing 2140.

The second upper protrusion 2143 may be disposed on at least one of one side or the other side of the second guide portion 2146 of the housing 2140.

In addition, the housing 2140 may have at least one second lower protrusion 2145 provided at the lower surfaces of the second side portions 2142 so as to be coupled and fixed to holes 2162a of the second outer frame 2162 of the lower elastic member 2160. For example, the second lower protrusion 2145 may be disposed at the lower surface of at least one of the first to fourth corners 2501a to 2501d of the housing 2140. However, the disclosure is not limited thereto.

In order to define a path along which the supporting member 2220 extends and to secure a space for filling with silicone capable of performing a damping function, the housing 2140 may have concave recesses 2142a provided in the lower portions of the second side portions 2142 thereof. For example, the concave recesses 2142a of the housing 2140 may be filled with damping silicone.

The housing 2140 may have a third stopper 2149 provided at the outer surface of at least one of the first side portions 2141 thereof. For example, the third stopper 2149 may protrude in a direction perpendicular to the outer surface of the at least one first side portion of the housing 2140. The third stopper 2149 is provided to prevent the outer surface of the first side portion 2141 of the housing 2140 from directly colliding with the inner surface of the side plate of the cover member 2300 when the housing 2140 is moved in the second direction and/or the third direction.

In order to prevent the bottom surface of the housing 2140 from colliding with the base 2100, the second coil 2230, and/or the circuit board 2250, a description of which will follow, the housing 2140 may further have a fourth stopper (not shown) protruding from the lower surface of the housing 2140.

In order to avoid spatial interference with the coil chip 2170, the housing 2140 may have a first recess 2024a provided in the inner surface of one of the corners 2501a to 2501d (for example, 2501a) thereof.

The first recess 2024a of the housing 2140 may include openings formed in the inner surface and the upper surface of the corner 2501a of the housing 2140.

The first recess 2024a may be disposed in the upper surface of a corner 2510a of the housing 2140 corresponding to the position between the first upper spring 2150-1 and the second upper spring 2150-2, a description of which will follow.

For example, the first recess 2024a may be disposed in the upper surface of the corner 2510a of the housing 2140 corresponding to the position between a first extension portion P1 of the first upper spring 2150-1 and a second extension portion P2 of the second upper spring 2150-2.

As shown in FIG. 39, the transverse length of the first recess 2024a of the housing 2140 may be larger than the transverse length of the coil chip 2170, and the longitudinal length of the first recess 2024a of the housing 2140 may be larger than the longitudinal length of the coil chip 2170. The transverse direction of the first recess 2024a may be a direction parallel to the transverse direction of the inner surface of the corner 2501a of the housing 2140, and the longitudinal direction of the first recess 2024a may be a direction parallel to the longitudinal direction of the inner surface of the corner 2501a of the housing 2140.

The housing 2140 may have a second recess 2025a provided in the inner surface of each of the second side portions 2141 or the corners 2501a to 2501d so as to correspond to the third protrusion 2115 of the bobbin 2110.

For example, the second recess 2025a of the housing 2140 may be provided in each of the inner surfaces of two facing corners 2501b and 2501d, among the corners 2501a to 2501d. The second recess 2025a may be formed in each of the corners 2501b and 2501d, not the corner 2501a of the housing 2140 in which the first recess 2024a is formed.

In the embodiment shown in FIG. 37A, the first recess 2024a and the second recess 2025a may have the same shape. However, the disclosure is not limited thereto. In another embodiment, the first recess and the second recess may have different shapes.

The housing 2140 may further have a third recess 2026a provided in the inner surface of the corner 2501c, which is opposite the corner 2501a of the housing 2140 in which the first recess 2024a is formed. The third recess 2026a may have the same shape as the first recess 2024a and may be disposed at corresponding positions for weight balance. In another embodiment, the third recess may be omitted.

Next, the magnet 2130 will be described.

At the initial position of the bobbin 2110, the magnet 2130 may be disposed at each of the first side portions 2141 of the housing 2140 such that at least a portion of the magnet overlaps the first coil 2120 in a direction perpendicular to the optical axis OA or in the second or third direction. For example, the magnet 2130 may be inserted into or disposed in the settlement portion 2141a of the housing 2140.

Here, the initial position of the bobbin 2110 may be the original position of the AF operation unit (for example, the bobbin) in the state in which no power or driving signal is applied to the first coil 2120 or the position at which the AF operation unit is located as the result of the upper elastic member 2150 and the lower elastic member 2160 being elastically deformed due only to the weight of the AF operation unit.

In addition, the initial position of the bobbin 2110 may be the position at which the AF operation unit is located when gravity acts in the direction from the bobbin 2110 to the base 2210 or when gravity acts in the direction from the base 2210 to the bobbin 2110.

In another embodiment, the magnet 2130 may be disposed at the outer surface of each of the first side portions 2141 of the housing 2140. Alternatively, in another embodiment, the magnet may be disposed at the inner surface or the outer surface of each of the second side portions 2142 of the housing 2140.

The magnet 2130 may have a shape corresponding to the shape of each of the first side portions 2141 of the housing 2140, such as a rectangular parallelepiped shape. However, the disclosure is not limited thereto. The surface of the magnet facing the first coil 2120 may be formed so as to correspond to or coincide with the curvature of a corresponding surface of the first coil 2120.

The magnet 2130 may be a monopolar magnetized magnet configured such that a first surface thereof facing the coil 2120 has an N pole and a second surface opposite the first surface has an S pole or a bipolar magnetized magnet. However, the disclosure is not limited thereto. The opposite configuration is also possible.

Alternatively, in another embodiment, the first surface and the second surface of the magnet 2130 may be divided into an N pole and an S pole.

For example, the magnet 2130 may be a bipolar magnetized magnet divided into two parts in a direction perpendicular to the optical axis. In this case, the magnet 2130 may be realized by a ferrite, alnico, or rare-earth magnet.

For example, the magnet 2130 having a bipolar magnetized structure may include a first magnet portion including, a second magnet portion including, and a nonmagnetic partition. The first magnet portion and the second magnet portion may be spaced apart from each other, and the nonmagnetic partition may be located between the first magnet portion and the second magnet portion.

The nonmagnetic partition may be a portion having substantially no magnetism, may include a section having little polarity, and may be filled with air or may be made of a nonmagnetic material.

In the embodiment, the number of magnets 2130 is four; however, the disclosure is not limited thereto. The number of magnets 2130 may be two or more, and the first surface of each magnet 2130 that faces the first coil 2120 may be planar; however, the disclosure is not limited thereto. The first surface of each magnet may be curved.

At least two magnets 2130 may be disposed at first side portions of the housing 2140 that face each other, and may be disposed so as to face each other.

For example, magnets 2130-1 to 2130-4 may be disposed at the first side portions 2141 of the housing 2140. Two pairs of magnets 2130-1 to 2130-4 that face each other so as to intersect may be disposed at the first side portions 2141 of the housing 2140. In this case, each of the magnets 2130-1 to 2130-4 may generally have a quadrangular shape. Alternatively, each magnet may have a triangular or rhombic shape.

In the embodiment shown in FIG. 37A, the magnets 2130-1 to 2130-4 are disposed at the housing 2140. However, the disclosure is not limited thereto.

In another embodiment, the housing 2140 may be omitted, and the magnets 2130-1 to 2130-4 may be disposed at the cover member 2300. In a further embodiment, the housing 2140 may not be omitted, and the magnets 2130-1 to 2130-4 may be disposed at the cover member 2300.

For example, in another embodiment, the magnets 2130-1 to 2130-4 may be disposed at the side surfaces of the cover member 2300, e.g. the inner surfaces of the side surfaces thereof.

Next, the coil chip 2170 will be described.

The coil chip 2170 is also referred to as a "chip conductor," is disposed at the housing 2140, and is coupled to the upper elastic member 2150.

For example, the coil chip 2170 may be disposed at the corner 2501a of the housing 2140. That is, the coil chip 2170 may be located in the first recess 2024a provided in the corner 2501a of the housing 2140.

Referring to FIG. 39, at the initial position of the bobbin 2110, the coil chip 2170 may be located at the upper side of the first coil 2120 based on the lower surface of the bobbin 2110.

At the initial position of the bobbin 2110, the coil chip 2170 may not overlap the first coil 2120 in the optical-axis direction or the first direction.

In addition, at the initial position of the bobbin 2110, the coil chip 2170 may not overlap the first coil 2120 in a direction perpendicular to the optical axis.

In addition, the coil chip 2170 may be located under the first outer frame 2152 of each of the upper springs 2150-1 and 2150-2.

The coil chip 2170 may not overlap the magnet 2130 in the optical-axis direction or the first direction. In addition, the coil chip 2170 may not overlap the magnet 2130 in a direction perpendicular to the optical axis. The reason for this is that it is necessary to reduce interference between induced voltage generated in the coil chip 2170 due to mutual induction with the first coil 2120 and a line of magnetic force of the magnet 2130.

That is, the magnet may be disposed at the first side portion of the housing 2140 and the coil chip 2170 may be disposed at the corner of the housing 2140 such that the magnet 2130 and the coil chip 2170 are spaced apart from each other. In the embodiment, therefore, it possible to reduce the influence of the line of magnetic force of the magnet 2130 on the induced voltage of the coil chip 2170, whereby it is possible to improve the performance of AF operation.

In another embodiment, the coil chip 2170 may overlap the magnet 2130 in a direction perpendicular to the optical axis.

Referring to FIG. 40, the coil chip 2170 may include a coil portion 2171 including a coil and ferrite, a first electrode 2172a connected to one end of the coil of the coil portion 2171, and a second electrode 2172b. In the first electrode 2172a and the second electrode 2172b, the "electrode" may also be referred to as a "pad," a terminal, or a lead.

The coil portion 2171 may have a structure in which a coil is wound around a ferrite core or a structure in which a coil is patterned on a ferrite sheet. However, the disclosure is not limited thereto. The coil portion may be realized in various forms.

The first electrode 2172a may be connected to one end of the coil portion 2171, and the second electrode 2172b may be connected to the other end of the coil portion 2171.

The coil chip 2170 may secure high inductance due to ferrite, and may increase the magnitude of voltage induced in the coil chip 2170 due to high inductance. Since high induced voltage is secured, it is possible to more accurately sense displacement of the bobbin 2110, to easily control AF driving, and to improve accuracy in AF feedback driving.

The frequency of a driving signal applied to the first coil 2120, e.g. the frequency of an alternating-current signal included in the driving signal, may be set to be lower than a self-resonant frequency of the coil chip 2170.

Induced voltage is generated in the coil chip 2170 due to mutual induction between the first coil 2120 to which the driving signal (for example, driving current) is applied and the coil chip 2170.

The first coil 2120 may be moved together with the bobbin 2110 in the first direction due to electromagnetic force caused by electromagnetic interaction between current flowing in the first coil 2120 due to the driving signal and the magnet 2130.

As the first coil 2120 is moved in the first direction, the distance between the first coil 2120 and the coil chip 2170 may vary, and as the distance therebetween is changed, the magnitude of the voltage induced in the coil chip 2170 may vary.

For example, as the distance between the first coil 2120 and the coil chip 2170 decreases, the induced voltage generated in the coil chip 2170 may increase, and as the distance therebetween increases, the induced voltage generated in the coil chip 2170 may decrease.

Displacement of the bobbin 2110 may be sensed based on the magnitude of the voltage induced in the coil chip 2170, and the displacement of the bobbin 2110 or the driving signal may be feedback-controlled based on the sensed displacement of the bobbin 2110.

The first electrode 2172a and the second electrode 2172b of the coil chip 2170 may be connected or bonded to the first outer frames 2152 of the first and second upper springs 2150-1 and 2150-2 of the upper elastic member 2150 via a conductive member, such as solder.

Next, the upper elastic member 2150, the lower elastic member 2160, and the supporting member 2220 will be described.

The upper elastic member 2150 and the lower elastic member 2160 are coupled to the bobbin 2110 and to the housing 2140, and support the bobbin 2110.

For example, the upper elastic member 2150 may be coupled to the upper portion, the upper surface, or the upper end of the bobbin 2110 and to the upper portion, the upper surface, or the upper end of the housing 2140, and the lower elastic member 2160 may be coupled to the lower portion, the lower surface, or the lower end of the bobbin 2110 and to the lower portion, the lower surface, or the lower end of the housing 2140.

The supporting member 2220 may support the housing 2140 relative to the base 2210, and may connect at least one of the upper elastic member 2150 or the lower elastic member 2160 to the circuit board 2250.

Referring to FIGS. 38a and 38b, at least one of the upper elastic member 2150 or the lower elastic member 2160 may be divided or separated into two or more parts.

For example, the upper elastic member 2150 may include first to fourth upper springs 2150-1 to 2150-4 spaced or separated from each other.

Each of the upper elastic member 2150 and the lower elastic member 2160 may be realized as a leaf spring; however, the disclosure is not limited thereto. Each elastic member may be realized as a coil spring or a suspension wire.

Each of the first to fourth upper springs 2150-1 to 2150-4 may include a first inner frame 2151 coupled to the upper portion, the upper surface, or the upper end of the bobbin 2110, a first outer frame 2152 coupled to the upper portion, the upper surface, or the upper end of the housing 2140, and a first frame connection portion 2153 for interconnecting the first inner frame 2151 and the first outer frame 2152.

A hole 2151a, to which the first coupling portion 2113 of the bobbin 2110 is coupled, may be provided in the first inner frame 2151, and the hole 2151a may have at least one cut portion 2016, through which an adhesive member or a damper permeates.

The first outer frame 2152 of each of the first to fourth upper springs 2150-1 to 2150-4 may include a first coupling portion 2510 coupled to a corresponding one of the supporting members 1220-1 to 1220-4, a second coupling portion 2520 coupled to at least one of a corresponding one of the corners 2501a to 2501d of the housing 2140 and/or an edge adjacent thereto, and a connection portion 2530 for interconnecting the first coupling portion 2510 and the second coupling portion 2520.

The second coupling portion 2520 may include at least one coupling region coupled to the corners 2501a to 2501d (for example, the second upper protrusions 2143) of the housing 2140. For example, the at least one coupling region may include holes 2152a.

For example, the second coupling portion 2520 may include a first coupling region located at one side of the second guide portion 2146 of the housing 2140 and a second coupling region located at the other side of the second guide portion 2146. However, the disclosure is not limited thereto.

In the embodiment of FIG. 38A, each of the coupling regions of the second coupling portions 2520 of the first to fourth upper springs 2150-1 to 2150-4 is realized as including a hole. However, the disclosure is not limited thereto. In another embodiment, each of the coupling regions may be realized in various forms sufficient to be coupled to the housing 2140, such as a recess.

For example, the holes 2152a of the second coupling portion 2520 may have at least one cut portion, through which an adhesive member or a damper permeates gaps between the second upper protrusion 2143 and the holes 2152a.

The first coupling portion 2510 may have a hole 2052, through which each of the supporting members 2220-1 to 2220-4 extends. One end of each of the supporting members 2220-1 to 2220-4 that have extended through the hole 2052 may be coupled to the first coupling portion 2510 via a conductive adhesive member or solder 2901, and the first coupling portion 2510 may be connected to each of the supporting members 2220-1 to 2220-4.

The second coupling portion 2510 is a region in which the solder 2901 is disposed, and may include a hole 2052 and a region around the hole 2052.

The connection portion 2530 may interconnect the coupling region of the second coupling portion 2520 disposed at each of the corners 2501a to 2501d and the first coupling portion 2510.

For example, the connection portion 2530 may include a first connection portion 2530-1 for interconnecting the first coupling region of the first coupling portion 2520 of each of the first to fourth upper springs 2150-1 to 2150-4 and the first coupling portion 2510 and a second connection portion 2530-2 for interconnecting the second coupling region of the second coupling portion 2520 and the first coupling portion 2510.

The connection portion 2530 may include a bent portion that is bent at least once or a curved portion that is curved at least once. However, the disclosure is not limited thereto. In another embodiment, the connection portion may be straight.

The width of the connection portion 2530 may be smaller than the width of the second coupling portion 2520, whereby the connection portion 2530 may be easily moved in the first direction, and therefore stress applied to the upper elastic member 2150 and stress applied to the supporting member 2220 may be dispersed.

Also, in order to support the housing 2140 in a balanced state, the connection portion 2530 may be symmetrical with respect to a reference line 2102. However, the disclosure is not limited thereto. In another embodiment, the connection portion may not be symmetrical.

The reference line 2102 may be a straight line passing through a central point 2101 (see FIG. 38A) and a corresponding one of the corners 2501a to 2501d of the housing 2140. Here, the central point 2101 may be the center of the housing 2140.

The first outer frame 2152 of each of the first and second upper springs 2150-1 and 2150-2 may have extension portions P1 and P2 contacting or connected to a corresponding one of the first and second electrodes 2172a and 2172b of the coil chip 2170.

Each of the first and second upper springs 2150-1 and 2150-2 may have extension portions P1 and P2 extending from the coupling region of the second coupling portion 2520 to the coil chip 2170 disposed at the corner 2501a of the housing 2140.

For example, the first extension portion P1 may directly contact the first electrode 2172a of the coil chip 2170 and may be coupled or bonded to the first electrode 2172a using solder, and the second extension portion P2 may directly contact the second electrode 2172b of the coil chip 2170 and may be coupled or bonded to the second electrode 2172b using solder.

Since the first and second upper springs 2150-1 and 2150-2 are bonded to the first electrode 2172a and the second electrode 2172b of the coil chip 2170 using solder, it is possible to increase force of coupling between the coil chip 2170 and the upper elastic member 2150 and to prevent the occurrence of open circuit.

The lower elastic member 2160 may include a second inner frame 2161 coupled to the lower portion, the lower surface, or the lower end of the bobbin 2110, a second outer frame 2162 coupled to the lower portion, the lower surface, or the lower end of the housing 2140, and a second frame connection portion 2163 for interconnecting the inner frame 2161 and the second outer frame 2162.

In addition, the lower elastic member 2160 may have a hole 2161a provided in the second inner frame 2161 and coupled to the first lower protrusion 2117 of the bobbin 2110 via solder or a conductive adhesive member, and a hole 2162a provided in the second outer frame 2162 and coupled to the second lower protrusion 2147 of the housing 2140.

Each of the first and second frame connection portions 2153 and 2163 of the upper and lower elastic members 2150 and 2160 may be formed so as to be bent or curved at least once in order to form a predetermined pattern. Upward and/or downward movement of the bobbin 2110 in the first direction may be flexibly (or elastically) supported through displacement and micro-scale deformation of the first and second frame connection portions 2153 and 2163.

In order to absorb or buffer vibration of the bobbin 2110, the lens moving apparatus 2100 may further have a first damper (not shown) disposed between each of the upper springs 2150-1 to 2150-4 and the housing 2140.

For example, the first damper (not shown) may be disposed in a space between the first frame connection portion 2153 of each of the upper springs 2150-1 to 2150-4 and the housing 2140.

In addition, for example, the lens moving apparatus 2100 may further have a second damper (not shown) disposed between the second frame connection portion 2163 of the lower elastic member 2160 and the housing 2140.

In addition, for example, the lens moving apparatus 2100 may further have a third damper (not shown) disposed between the supporting member 2220 and the hole 2147a of the housing 2140.

In addition, for example, the lens moving apparatus 2100 may further have a fourth damper (not shown) disposed between the first coupling portion 2510 and one end of the supporting member 2220, and may further have a fifth damper (not shown) disposed between the other end of the supporting member 2220 and the circuit board 2250.

In addition, a damper (not shown) may be further disposed between the inner surface of the housing 2140 and the outer circumferential surface of the bobbin 2110.

Next, the supporting member 2220 will be described.

One end of the supporting member 2220 may be coupled to the first outer frame 2151 of the upper elastic member 2150, and the other end of the supporting member 2220 may be coupled to the circuit board 2250, via solder or a conductive adhesive member.

A plurality of supporting members 2220 may be provided, and each of the supporting members 2220-1 to 2220-4 may be coupled to the first coupling portion 2510 of a corresponding one of the upper springs 2150-1 to 2150-4 via solder 2901 and may be connected to the first coupling portion 2510. For example, each of the supporting members 2220-1 to 2220-4 may be disposed at a corresponding one of the four corners 2501a to 2501d.

The supporting members 2220-1 to 2220-4 may support the bobbin 2110 and the housing 2140 such that the bobbin 2110 and the housing 2140 are movable in a direction perpendicular to the first direction. In FIGS. 35 and 41, one supporting member is disposed at each of the edges 2142 or the corners 2501a to 2501d of the housing 2140. However, the disclosure is not limited thereto.

In another embodiment, two or more supporting members may be disposed at at least one of the second corners of the housing 2140.

Each of the supporting members 2220-1 to 2220-4 may be spaced apart from the housing 2140, and may be directly connected to the first coupling portion 2510 of the first outer frame 2152 of a corresponding one of the upper springs 2150-1 to 2150-4, rather than fixed to the housing 2140.

In another embodiment, the supporting member 2220 may be disposed at each of the first side portions 2141 of the housing 2140 in the form of a leaf spring.

A driving signal may be transmitted from the second circuit board 2250 to the first coil 2120 via the supporting members 2220-1 to 2220-4 and the upper springs 2150-1 to 2150-4, and induced voltage of the coil chip 2170 may be transmitted to the circuit board 2250.

For example, induced voltage of the coil chip 2170 may be transmitted to the circuit board 2250 via the first and second upper springs 2150-1 and 2150-2 and the first and second supporting members 2220-1 and 2220-2.

In addition, for example, a driving signal may be transmitted from the circuit board 2250 to the first coil 2120 via the third and fourth upper springs 2150-3 and 2150-4 and the third and fourth supporting members 2220-3 and 2220-4.

Each of the supporting members 2220-1 to 2220-4 may be formed of a member that is separate from the upper elastic member 2150, and may be realized as an elastic supporting member, such as a leaf spring, a coil spring, or a suspension wire. Also, in another embodiment, the supporting members 2220-1 to 2220-4 may be integrally formed with the upper elastic member 2150.

The base 2210 may have an opening corresponding to the opening of the bobbin 2110 and/or the opening of the housing 2140, and may have a shape coinciding with or corresponding to the shape of the cover member 2300, such as a quadrangular shape.

Referring to FIG. 42, the base 2210 may have a stair 2211, which may be coated with an adhesive when fixing the cover member 2300 by adhesion. In this case, the stair 2211 may guide the cover member 2300 coupled to the upper side thereof, and may face the lower end of the side plate of the cover member 2300.

The base 2210 may be disposed under the bobbin 2110 and the housing 2140, and a supporting recess or prop portion 2255 may be formed at the side surface of the base 2210 facing the portion of the circuit board 2250 at which a terminal 2251 is formed. The prop portion 2255 of the base 2210 may support a terminal surface 2253 of the circuit board 2250.

The base 2210 may be provided in each corner thereof with a concave recess 2212. In the case in which the corners of the cover member 2300 protrude, protrusions of the cover member 2300 may be fastened to the base 2210 in the concave recesses 2212. However, the disclosure is not limited thereto. In another embodiment, the base 2210 may have no concave recess 2212.

The base 2210 may be provided in the upper surface thereof with settlement recesses 2215-1 and 2215-2, in which the position sensor 2240 mounted at the circuit board 2250 may be disposed or settled. According to the embodiment, two settlement recesses 2215-1 and 2215-2 may be provided in the base 2210.

The second coil 2230 may be disposed at the upper portion of the circuit board 2250, and the position sensor 2240 may be disposed at the lower portion of the circuit board 2250.

For example, the position sensor 2240 may be disposed at the lower surface of the circuit board 2250, and the lower surface of the circuit board 2250 may be a surface that faces the upper surface of the base 2210.

The circuit board 2250 may be located under the housing 2140, may be disposed on the upper surface of the base 2210, and may have an opening corresponding to the opening of the bobbin 2110, the opening of the housing 2140, and/or the opening of the base 2210. The outer circumferential surface of the circuit board 2250 may be configured in a shape coinciding with or corresponding to the shape of the upper surface of the base 2210, such as a quadrangular shape.

The circuit board 2250 may be provided with at least one terminal surface 2253 which is bent from the upper surface thereof and at which a plurality of terminals 2251 or pins for connection with the outside is provided.

A plurality of terminals 251 may be installed at the terminal surface 2253 of the circuit board 2250. For example, a driving signal for driving the first coil 2120, the second coil 2230, and the position sensor 2240 may be received through the terminals 2251 installed at the terminal surface 2253 of the circuit board 2250, and induced voltage of the coil chip 2170 may be output to the outside through the terminals 2251.

According to the embodiment, the circuit board 2250 may be an FPCB. However, the disclosure is not limited thereto. The terminals of the circuit board 2250 may be directly formed on the surface of the base 2210 using a surface electrode method or the like.

The circuit board 2250 may include holes 2250a through which the supporting members 2220-1 to 2220-4 extend. The position and number of holes 2250a may correspond to or coincide with the position and number of supporting members 2220-1 to 2220-4. Each of the supporting members 2220-1 to 2220-4 may be disposed so as to be spaced apart from the inner surface of a corresponding one of the holes 2250a of the circuit board 2250.

The supporting members 2220-1 to 2220-4 may extend through the holes 2250a of the circuit board 2250 and may be connected to circuit patterns disposed on the lower surface of the circuit board 2250 through soldering.

Also, in another embodiment, the circuit board 2250 may have no holes, and the supporting members 2220-1 to 2220-4 may be connected to circuit patterns or pads formed on the upper surface of the circuit board 2250 through soldering.

The second coil 2230 may be located under the housing 2140, and may be disposed at the upper portion of the second circuit board 2250 so as to correspond to the magnet 2130 disposed at the housing 2140.

For example, the second coil 2230 may include four OIS coils 2230-1 and 2230-4 disposed so as to correspond to four sides of the circuit board 2250. However, the disclosure is not limited thereto. One coil for the second direction and one coil for the third direction may be installed, and four or more coils may be installed.

In FIG. 42, the second coil 2230 is provided at a separate circuit member 2231, rather than the circuit board 2250. However, the disclosure is not limited thereto. In another embodiment, the second coil 2230 may be realized in the form of a circuit pattern formed at the circuit board 1250.

Alternatively, in another embodiment, the circuit member 2231 may be omitted, and the second coil 2230 may be configured in the form of a ring-shaped coil block or an FP coil, which is separate from the circuit board 2250.

An escape recess 2023 may be provided at each corner of the circuit member 2231 at which the second coil 2230 is provided. The escape recess 2023 may be formed by chamfering each corner of the circuit member 2231. Also, in another embodiment, a hole, through which the supporting member 2220 extends, may be provided in each corner of the circuit member 2231.

As described above, the housing 2140 may be moved in the second direction and/or the third direction due to interaction between the first magnet 2130 and the second coil 2230 corresponding thereto, whereby handshake compensation may be performed.

The position sensor 2240 may sense the intensity of a magnetic field of the magnet 2130 disposed at the housing 2140 due to movement of the housing 2140 in a direction perpendicular to the optical axis, and may output an output signal (e.g. output voltage) based on the result of sensing.

The displacement of the housing 2140 relative to the base 2210 in a direction (e.g. the X axis or the Y axis) perpendicular to the optical axis (e.g. the Z axis) may be detected based on the output signal from the position sensor 2240.

The position sensor 2240 may include two OIS position sensors 2240a and 2240b in order to detect the displacement of the housing 2140 in a second direction (e.g. the X axis) perpendicular to the optical axis and a third (e.g. the Y axis) perpendicular to the optical axis.

For example, the OIS position sensor 2240a may sense the intensity of a magnetic field of the magnet 2130 due to movement of the housing 2140 and may output a first output signal based on the result of sensing, and the OIS position sensor 2240b may sense the intensity of a magnetic field of the first magnet 2130 due to movement of the housing 2140 and may output a second output signal based on the result of sensing. The controller 830 of the camera module or a controller 780 of a portable terminal 200A may detect the displacement of the housing 2140 based on the first output signal and the second output signal, and may perform OIS feedback driving based on the detected displacement of the housing 2140.

Each of the OIS position sensors 2240a and 2240b may be a Hall sensor. Any sensor may be used as long as the sensor is capable of sensing the intensity of a magnetic field. For example, each of the OIS position sensors 2240a and 2240b may be configured in the form of a driver including a Hall sensor, or may be realized as a position detection sensor, such as a Hall sensor, alone.

Each of the OIS position sensors 2240a and 2240b may be mounted on the circuit board 2250, and the circuit board 2250 may be provided with terminals connected to the OIS position sensors 2240a and 2240b.

For coupling between the second circuit board 2250 and the base 2210, a coupling protrusion (not shown) may be provided on the upper surface of the base 2210, a hole (not shown), to which the coupling protrusion of the base 2210 is coupled, may be provided in the second circuit board 2250, and both may be fixed to each other by thermal fusion or using an adhesive member such as an epoxy.

In addition, a protrusion 2029 may be provided in the upper surface of the base 2210 around the opening, and the opening 2029 may be inserted into the opening of the circuit board 2250 and into the opening of the circuit member 2231.

In general, for autofocus (AF) feedback control, the AF operation unit, e.g. an AF position sensor for sensing displacement of the bobbin, a sensing magnet, and a separate power connection structure for driving the AF position sensor, is necessary for autofocus (AF) feedback control. As a result, the structure of the lens moving apparatus may be complicated, cost may be increased, and the manufacturing process may be difficult.

In addition, the linear section of a graph between the movement distance of the bobbin and magnetic flux of the sensing magnet sensed by the position sensor (hereinafter referred to as a "first linear section") may be restricted by a positional relationship between the sensing magnet and the position sensor.

Since no additional position sensor for sensing displacement of the bobbin 2110 is necessary in the embodiment, it is possible to reduce cost of the lens moving apparatus and to improve ease in manufacturing process.

In the case in which the AF position sensor is used, six supporting members are necessary for connection among the first coil, the AF position sensor, and the circuit board. In contrast, the position sensor and the sensing magnet are omitted and the AF feedback control is performed using the coil chip 2170 in the embodiment, whereby a driving signal may be provided to the first coil 2120 using four supporting members, and induced voltage of the coil chip 2170 may be transmitted to the circuit board 2250.

In addition, since mutual induction between the first coil 2120 and the coil chip 2170 is used, a second linear section of a correlation graph between the movement distance of the bobbin and induced voltage of the coil chip 2170 may be wider than the first linear section. In the embodiment, therefore, it is possible to secure linearity over a wide section, to reduce a process defect rate, and to perform more accurate AF feedback control.

In general, since the magnitude of voltage induced in the coil chip 2170 is changed depending on a change in ambient temperature, a camera module or an optical instrument may execute a temperature compensation algorithm in order to restrain occurrence of malfunction in AF driving depending on a change in ambient temperature.

A change in ambient temperature for temperature compensation may be measured using the value of resistance of the coil chip 2170.

The value of resistance of the coil chip 2170 may be changed depending on a change in ambient temperature. A change in ambient temperature for a temperature compensation algorithm may be measured using a change in the value of resistance of the coil chip 2170 depending on a change in ambient temperature. For example, a driving signal for temperature compensation, such as alternating current or direct current, may be applied to the coil chip 2170 and a change in voltage of the coil chip 2170 based on the driving signal for temperature compensation may be measured, whereby a change in ambient temperature may be measured.

The embodiment described with reference to FIGS. 33 to 43 is illustrated as having a single coil chip 2170. However, the disclosure is not limited thereto. A lens moving apparatus according to another embodiment may include another coil chip (referred to as a "second coil chip") disposed at the inner surface of the corner 2501c opposite the corner 2501a of the housing 2140 at which the coil chip 2170 (referred to as a "first coil chip"). In this case, the upper elastic member may include first to sixth upper springs, and the supporting member may include first to sixth supporting members.

The first and second upper springs may be connected to the first coil chip, and the first and second upper springs may be connected to the first and second terminals of the circuit board 2250 via the first and second supporting members.

The third and fourth upper springs may be connected to the second coil chip, and the third and fourth upper springs may be connected to the third and fourth terminals of the circuit board 2250 via the third and fourth supporting members.

The first coil chip may be connected to the fifth and sixth upper springs, and the fifth and sixth upper springs may be connected to the fifth and sixth terminals of the circuit board 2250 via the fifth and sixth supporting members.

Figure 44A:
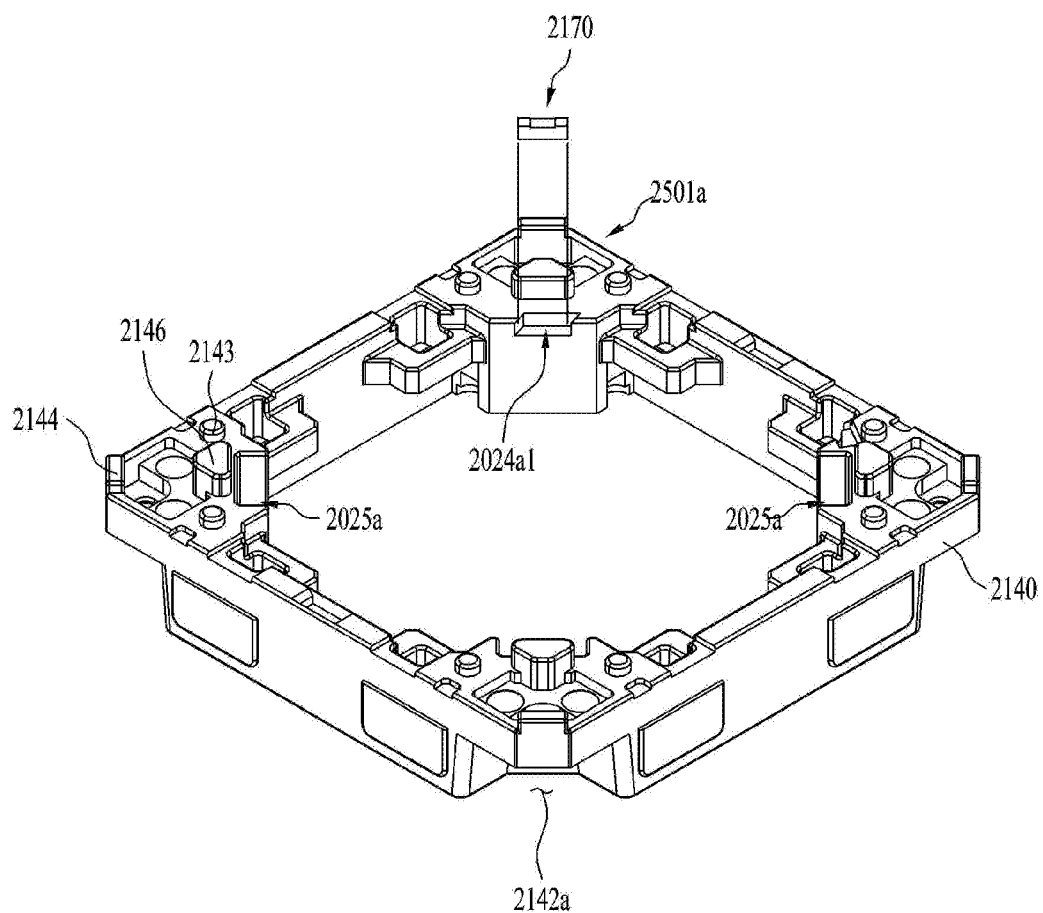
FIG. 44A shows a recess for mounting a coil chip according to another embodiment.
Figure 44B:
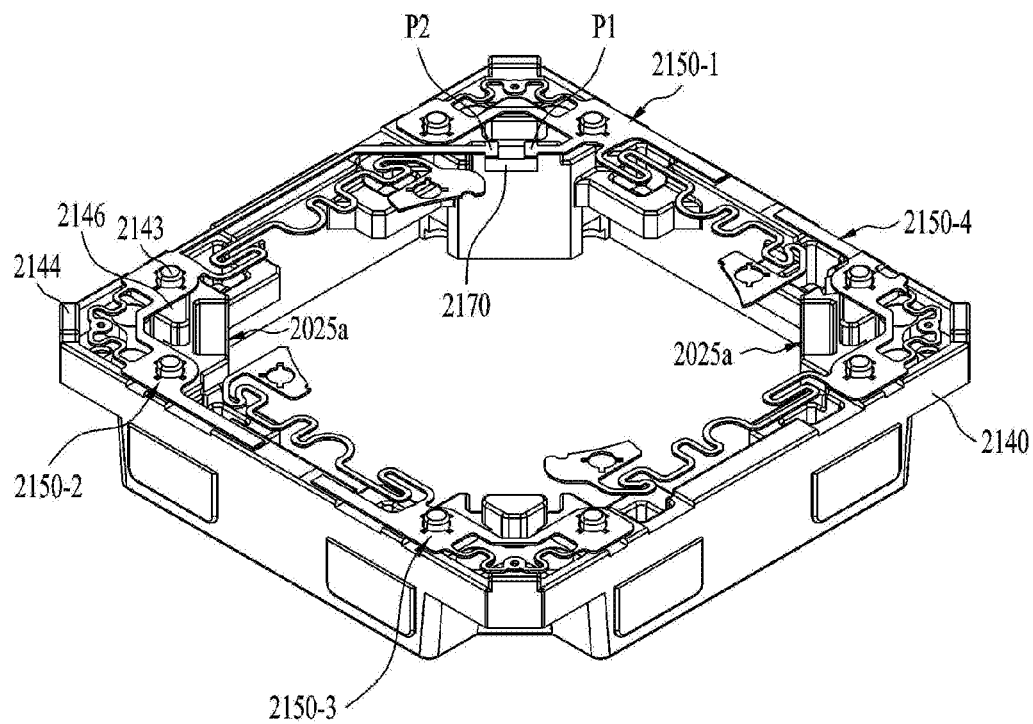
FIG. 44B shows upper springs connected to the coil chip disposed in the recess of FIG. 44A.

FIG. 44A shows a recess 2024a1 for mounting a coil chip 2170 according to another embodiment, and FIG. 44B shows the upper springs 2150-1 to 2150-4 connected to the coil chip 2170 disposed in the recess 2024a1 of FIG. 44A.

Referring to FIGS. 44A and 44B, the recess 2024a1 shown in FIGS. 44A and 44B may contact the coil chip 2170 and may support the coil chip 2170, although the recess 2024a shown in FIG. 39A is spaced apart from the coil chip 2170. For example, the coil chip 21 may be fixed to the recess 2024a1 using an adhesive member. For example, the coil chip 21 may be fixed to the recess 2024a1, whereby the coil chip 2170 may be stably fixed to the housing 2140.

Figure 45:
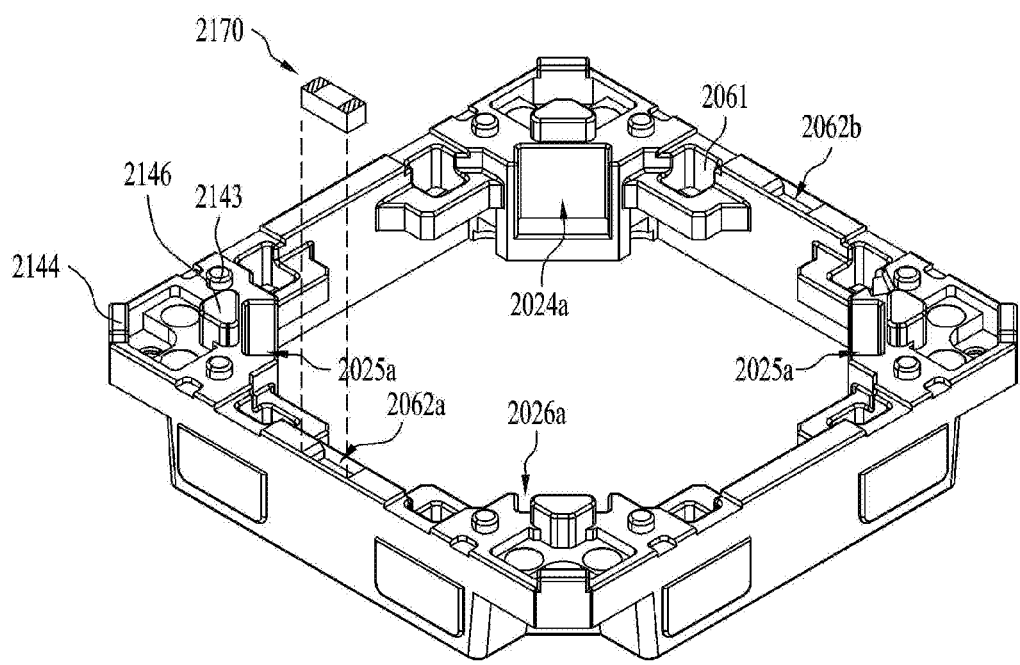
FIG. 45 shows arrangement of a coil chip according to another embodiment.
Figure 46:
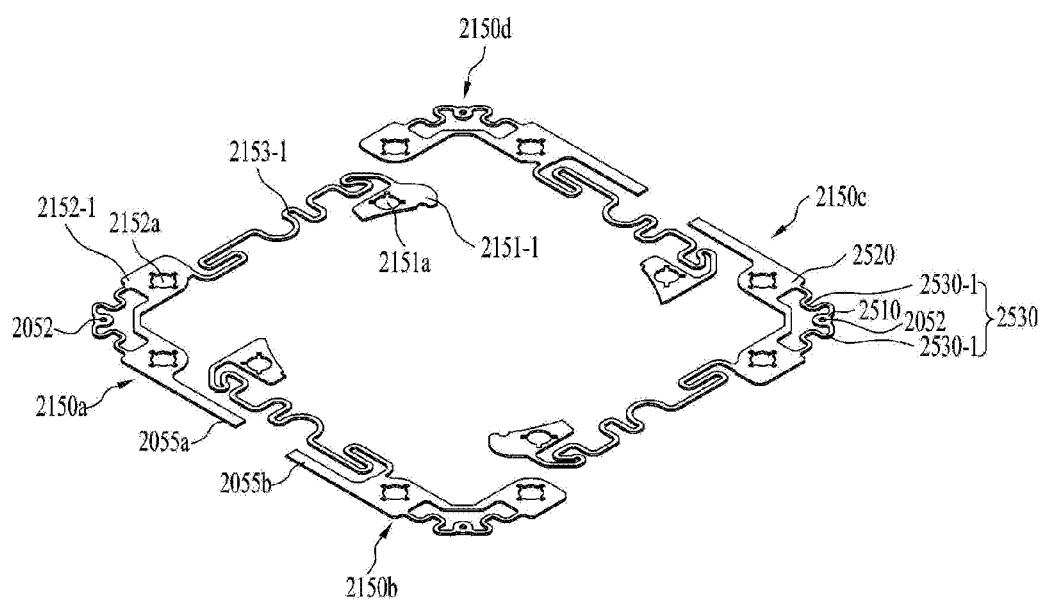
FIG. 46 shows another embodiment of the upper elastic member configured to be coupled to the coil chip shown in FIG. 45.
Figure 47:
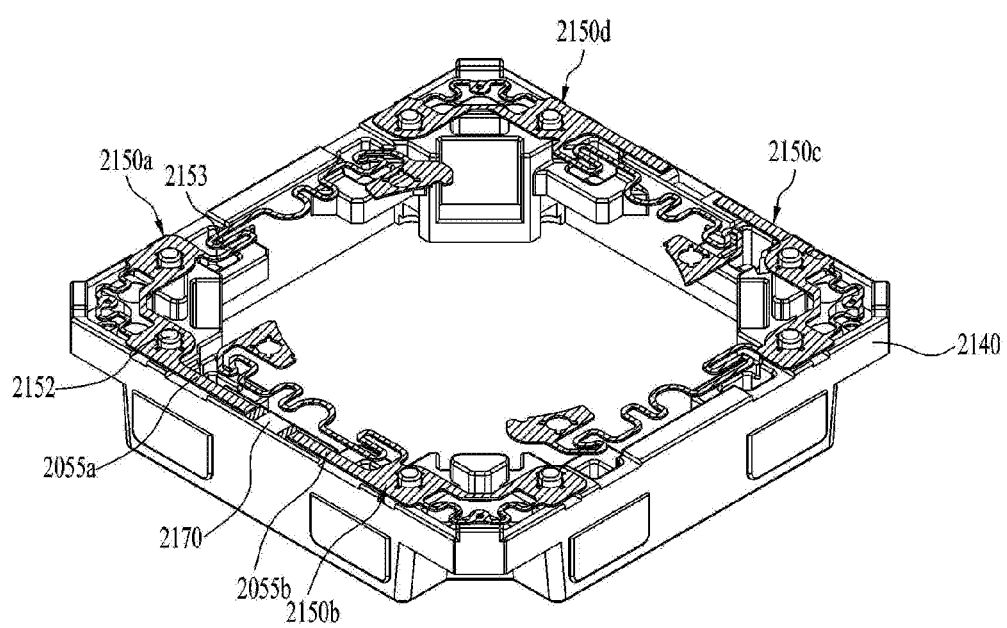
FIG. 47 shows a connection relationship between the coil chip of FIG. 46 and upper springs of FIG. 46.

FIG. 45 shows arrangement of a coil chip 2170 according to another embodiment, FIG. 46 shows another embodiment of the upper elastic member 2150 configured to be coupled to the coil chip 2170 shown in FIG. 45, and FIG. 47 shows a connection relationship between the coil chip 2170 of FIG. 46 and upper springs of FIG. 46.

Referring to FIGS. 45 to 47, the housing 2140 may have a recess 2062a provided in the upper surface of one of the side portions 2141 thereof in order to mount the coil chip 2170. In this case, the first recess 2024a and the third recess 2026a described with reference to FIG. 37a may be provided in the housing 2140. In another embodiment, however, the first recess 2024a and the third recess 2026a may be omitted.

For example, the recess 2062a may be disposed in the upper surface of the housing 2140 corresponding to the position between the first upper spring 2150a and the second upper spring 2150b.

For example, the recess 2062a may be disposed in the upper surface of the housing 2140 corresponding to the position between the extension portion 2055a of the first upper spring 2150a and the extension portion 2055b of the second upper spring 2150b.

The recess 2062a of the housing 2140 may have an opening formed in the upper surface of one of the first side portions of the housing 2140.

For weight balance of the housing 2140, the housing 2140 may further have a recess 2062a corresponding to the recess 2062a.

The recess 2062a of the housing 2140 may have a shape corresponding to the shape of the coil chip 2170, and the coil chip 2170 may be disposed or settled in the recess 2062a. The first electrode 2172a and the second electrode 2172b of the coil chip 2170 may be exposed through the opening of the recess 2062a. That is, the first electrode 2172a and the second electrode 2172b of the coil chip 2170 disposed in the recess 2062a may be exposed to the upper surface of a corresponding one of the first side portions of the housing 2140.

The coil chip 2170 disposed in the recess 2062a may not protrude from the upper surface of the first side portion of the housing 2140 in which the recess 2062a is provided.

The upper elastic member shown in FIG. 46 may include upper springs 2150a to 2150d. The upper springs 2150a to 2150d shown in FIG. 46 may have a structure similar to the structure of the first to fourth upper springs 2150-1 to 2150-4 shown in FIG. 38A. In FIG. 46, the extension portions P1 and P2 shown in FIG. 29A may be omitted.

The first outer frame 2152 of the first upper spring 2150a may include an extension portion 2055a from the coupling region of the second coupling portion 2520 to one of the first side portions of the housing 2140.

In addition, the first outer frame 2152 of the second upper spring 2150b may include an extension portion 2055b from the coupling region of the second coupling portion 2520 to one of the first side portions of the housing 2140.

The extension portion 2055a of the first upper spring 2150a may be coupled or bonded to the first electrode 2172a of the coil chip exposed from the recess 2062a via a conductive adhesive member, such as solder.

In addition, the extension portion 2055b of the second upper spring 2150b may be coupled or bonded to the second electrode 2172b of the coil chip exposed from the recess 2062a via a conductive adhesive member, such as solder.

Since the coil chip 2170 is disposed in the recess 2062a, the coil chip may not spatially interfere with the first and second upper springs 2150a and 2150b, and may be directly bonded to the first and second upper springs 2150a and 2150b using solder.

The coil chip 2170 shown in FIG. 37 may be disposed on the magnet 2130-3, and may overlap the magnet 2130-3 in the optical-axis direction.

The coil chip 2170 of FIG. 37 may not overlap the magnet 2130 in a direction perpendicular to the optical axis. The reason for this is that it is necessary to reduce interference between induced voltage generated in the coil chip 2170 due to mutual induction with the first coil 2120 and a line of magnetic force of the magnet 2130.

Figure 48:
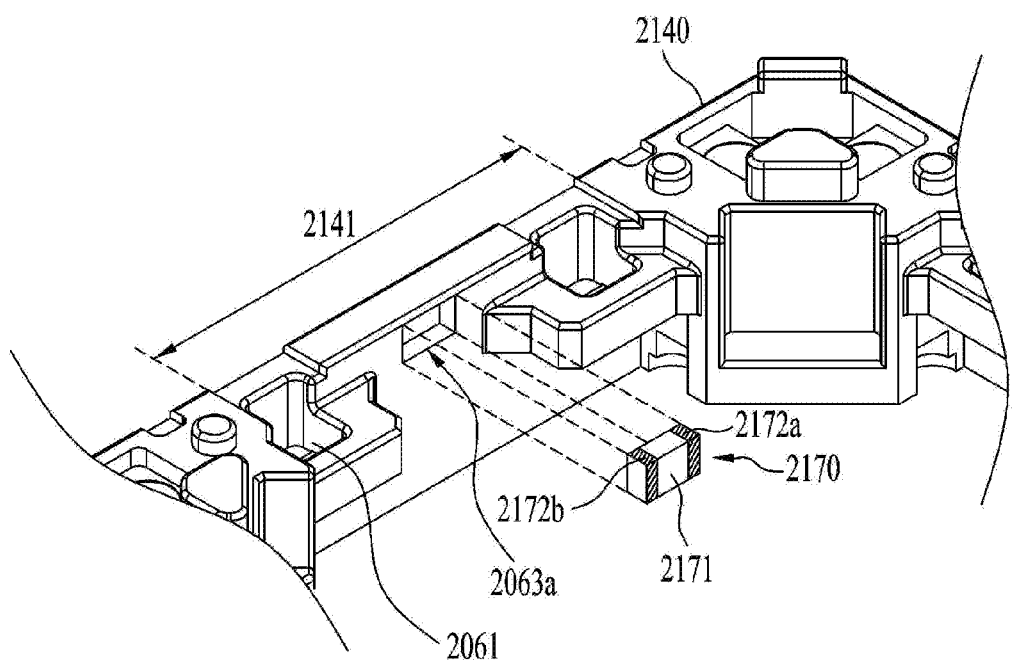
FIG. 48 shows arrangement of a coil chip according to another embodiment.
Figure 49:
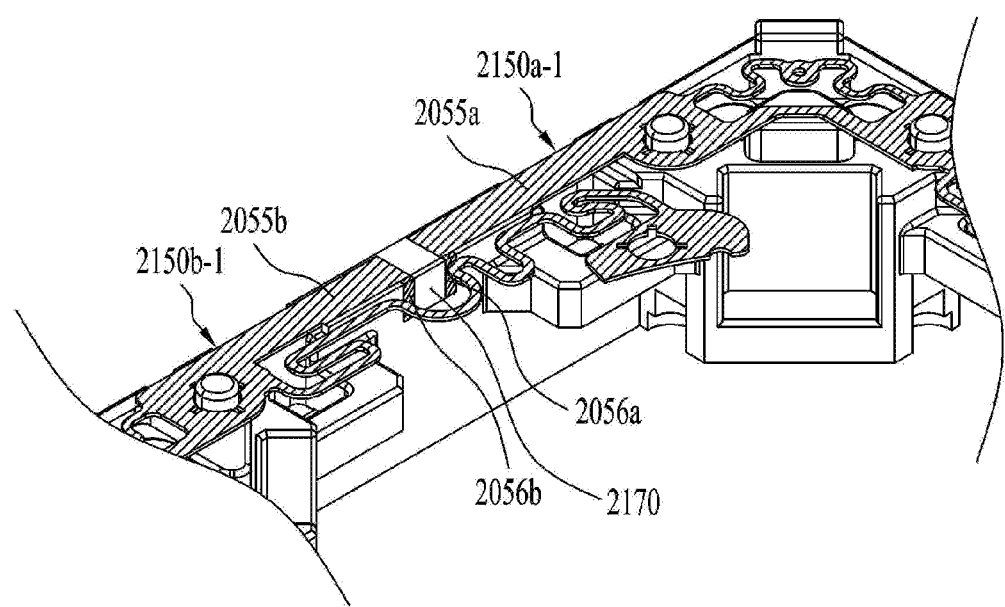
FIG. 49 shows first and second upper springs according to another embodiment configured to be coupled to the coil chip of FIG. 48.

FIG. 48 shows arrangement of a coil chip 2170 according to another embodiment, and FIG. 49 shows first and second upper springs 2150a-1 and 2150b-1 according to another embodiment configured to be coupled to the coil chip 2170 of FIG. 48.

The first and second upper springs 2150a-1 and 2150b-1 of FIG. 49 may be a modification of the first and second upper springs 2150a and 2150b of FIG. 46.

Referring to FIGS. 48 and 49, a recess 2063a may be provided in the inner surface of each of the first side portions 2141 of the housing 2140. The recess 2063a of FIG. 48 may have an opening formed in the inner surface of each of the first side portions of the housing 2140.

The coil chip 2170 may be disposed or settled in the recess 2063a of the housing 2140. The first electrode 2172a and the second electrode 2172b of the coil chip 2170 disposed or settled in the recess 2063a may be exposed through the opening of the recess 2063a. That is, the first electrode 2172a and the second electrode 2172b of the coil chip 2170 disposed in the recess 2063a may be exposed to the inner surface of a corresponding one of the first side portions of the housing 2140.

The first outer frame 2152 of the first upper spring 2150a-1 may include a first bent portion 2056a bent from the extension portion 2055a to the inner surface of the housing 2140.

The first bent portion 2056a may be connected to one side surface of the extension portion 2055a, and may be bent and extend to the first electrode 2172a of the coil chip 2170 disposed in the recess 2063a.

The first bent portion 2056a may be connected or bonded to the first electrode 2172a of the coil chip 2170 via a conductive adhesive member, such as solder.

The first outer frame 2152 of the second upper spring 2150b-1 may include a second bent portion 2056b bent from the extension portion 2055b to the inner surface of the housing 2140.

The second bent portion 2056b may be connected to one side surface of the extension portion 2055b, and may be bent and extend to the second electrode 2172b of the coil chip 2170 disposed in the recess 2063a.

The second bent portion 2056b may be connected or bonded to the second electrode 2172b of the coil chip 2170 via a conductive adhesive member, such as solder.

At the initial position of the bobbin 2110, the coil chip 2170 of FIG. 47 or 49 may be located at the upper side of the first coil 2120 based on the lower surface of the bobbin 2110.

At the initial position of the bobbin 2110, the coil chip 2170 of FIG. 47 or 49 may not overlap the first coil 2120 in the optical-axis direction or the first direction.

In addition, the coil chip 2170 of FIG. 47 or 49 may be located under the first outer frame 2152 of each of the upper springs 2150a and 2150b or 2150a-1 or 2150b-1.

Meanwhile, the lens moving apparatus 100 according to the above embodiment may be used in various fields, such as a camera module or an optical instrument.

For example, the lens moving apparatus 100, 1100, or 2100 according to the embodiment may be included in an optical instrument configured to form an image of an object in a space using reflection, refraction, absorption, interference, diffraction, etc., which are characteristics of light, to increase the visual power of the eyes, to record or reproduce an image formed by a lens, to perform optical measurement, or to propagate or transfer an image. For example, an optical instrument according to an embodiment may include a smartphone or a portable terminal equipped with a camera.

Figure 50:
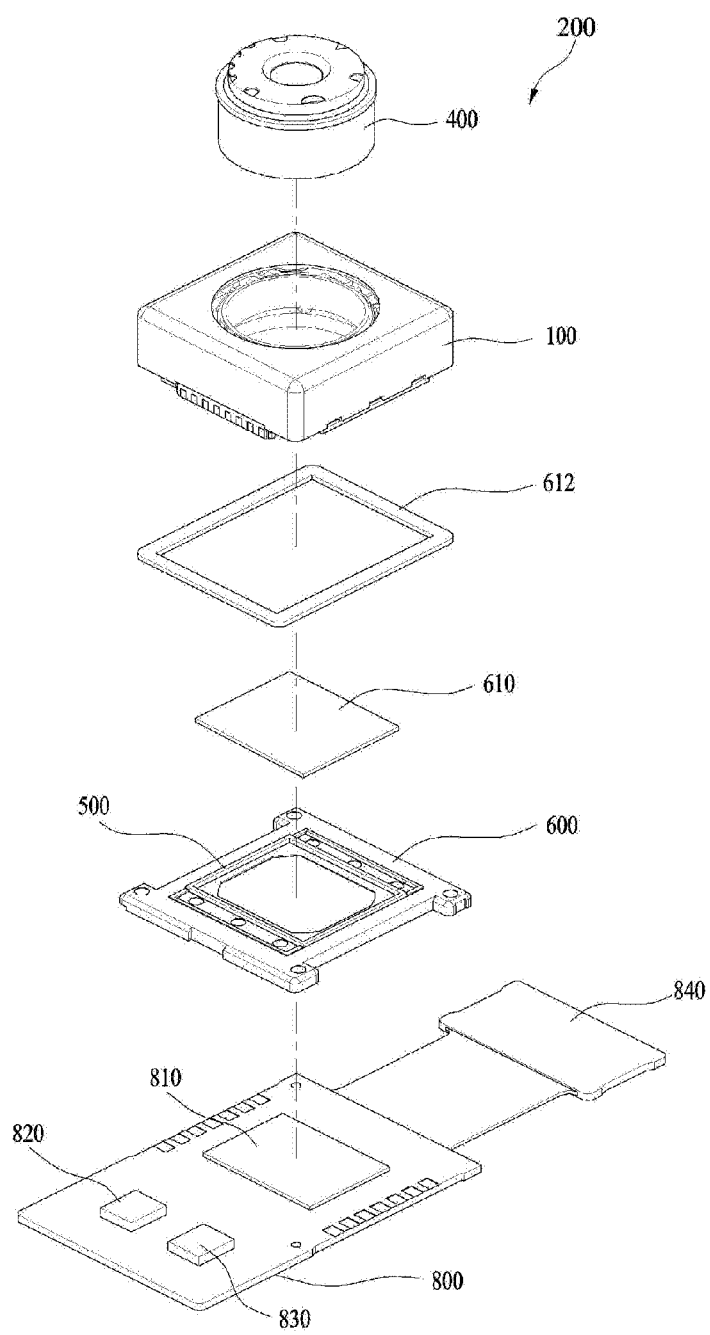
FIG. 50 is an exploded perspective view of a camera module according to an embodiment.

FIG. 50 is an exploded perspective view of a camera module 200 according to an embodiment.

Referring to FIG. 50, the camera module may include a lens barrel 400, a lens moving apparatus 100, an adhesive member 612, a filter 610, a first holder 600, a second holder 800, an image sensor 810, a motion sensor 820, a controller 830, and a connector 840. FIG. 50 shows the lens moving apparatus 100 according to the embodiment of FIG. 1. However, the disclosure is not limited thereto. A camera module according to another embodiment may include the lens moving apparatus 1100 of FIG. 17 or the lens moving apparatus 2100 of FIG. 33, instead of the lens moving apparatus 100.

The lens barrel 400 may be mounted in the bobbin 110 of the lens moving apparatus 100.

The first holder 600 may be disposed under the base 210 of the lens moving apparatus 100. The filter 610 may be mounted to the first holder 600, and the first holder 600 may be provided with a protrusion 500, on which the filter 610 is settled.

The adhesive member 612 may couple or adhere the base 210 of the lens moving apparatus 100 to the first holder 600. The adhesive member 612 may function to prevent foreign matter from being introduced into the lens moving apparatus in addition to the function of adhesion.

For example, the adhesive member 612 may be epoxy, a thermo-hardening adhesive, or an ultraviolet-hardening adhesive.

The filter 610 may function to prevent a specific-frequency-band component of light passing through the lens barrel 400 from being incident on the image sensor 810. The filter 610 may be an infrared cutoff filter; however, the disclosure is not limited thereto. In this case, the filter 610 may be disposed parallel to the x-y plane.

An opening, through which light passing through the filter 610 is incident on the image sensor 810, may be formed in the region of the first holder 600 on which the filter 610 is mounted.

The second holder 800 may be disposed under the first holder 600, and the image sensor 810 may be mounted on the second holder 600. The image sensor 810 is a region on which light passing through the filter 610 is incident in order to form an image including the light.

The second holder 800 may be provided with various circuits, elements, and a controller in order to convert an image formed on the image sensor 810 into an electrical signal and to transfer the electrical signal to an external apparatus.

The second holder 800 may be realized as a circuit board, on which the image sensor may be mounted, on which a circuit pattern may be formed, and on which various elements are coupled to each other. The first holder 600 may also be referred to as a "holder" or a "sensor base," and the second holder 800 may also be referred to as a "board" or a "circuit board."

The image sensor 810 may receive an image included in light incident through the lens moving apparatus 100, and may convert the received image into an electrical signal.

The filter 610 and the image sensor 810 may be disposed so as to be spaced apart from each other in the state of being opposite each other in the first direction.

The motion sensor 820 may be mounted on the second holder 800, and may be connected to the controller 830 via the circuit pattern provided on the second holder 800.

The motion sensor 820 outputs information about rotational angular velocity based on movement of the camera module 200. The motion sensor 820 may be realized as a two-axis or three-axis gyro sensor or an angular velocity sensor.

The controller 830 may be mounted on the second holder 800, and may be connected to the second position sensor 240 and the coil 230 of the lens moving apparatus 100. For example, the second holder 800 may be connected to the circuit board 250 of the lens moving apparatus 100, and the controller 830 mounted on the second holder 700 may be connected to the second position sensor 240 and the second coil 230 via the circuit board 250.

The controller 830 may transmit a clock signal SCL, a data signal SDA, and power signals VDD and GND for I2C communication with the first position sensor 120, and may receive the clock signal SCL and the data signal SDA from the first position sensor 170.

In addition, the controller 830 may control a driving signal for performing handshake compensation with respect to the OIS operation unit of the lens moving apparatus 100 based on output signals provided by the second position sensor 240 of the lens moving apparatus 100.

The description of the adhesive member 612, the filter 610, the first holder 600, the second holder 800, the image sensor 810, the motion sensor 820, and the controller 830 of the lens moving apparatus 100 may be applied to the lens moving apparatus 1100 or 2100.

In addition, for example, the second holder 800 may be connected to the first coil 2120, the second coil 2230, the position sensor 2240, and the coil chip 2170 of the lens moving apparatus 2100.

For example, a driving signal may be provided to each of the first coil 2120, the second coil 2230, and the position sensor 2240 via the second holder 800, and an output signal (for example, induced voltage) of the coil chip 2170 may be transmitted to the second holder 800.

The connector 840 may be connected to the second holder 800, and may have a port for connection with an external apparatus.

Figure 51:
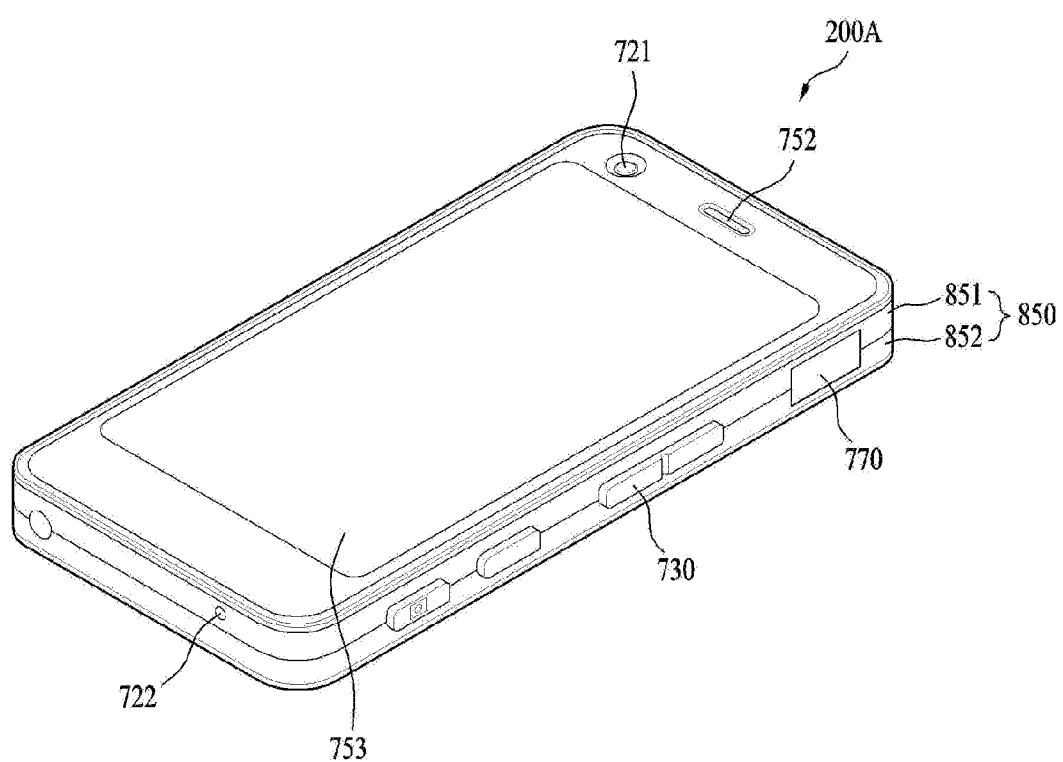
FIG. 51 is a perspective view of a portable terminal according to an embodiment.
Figure 52:
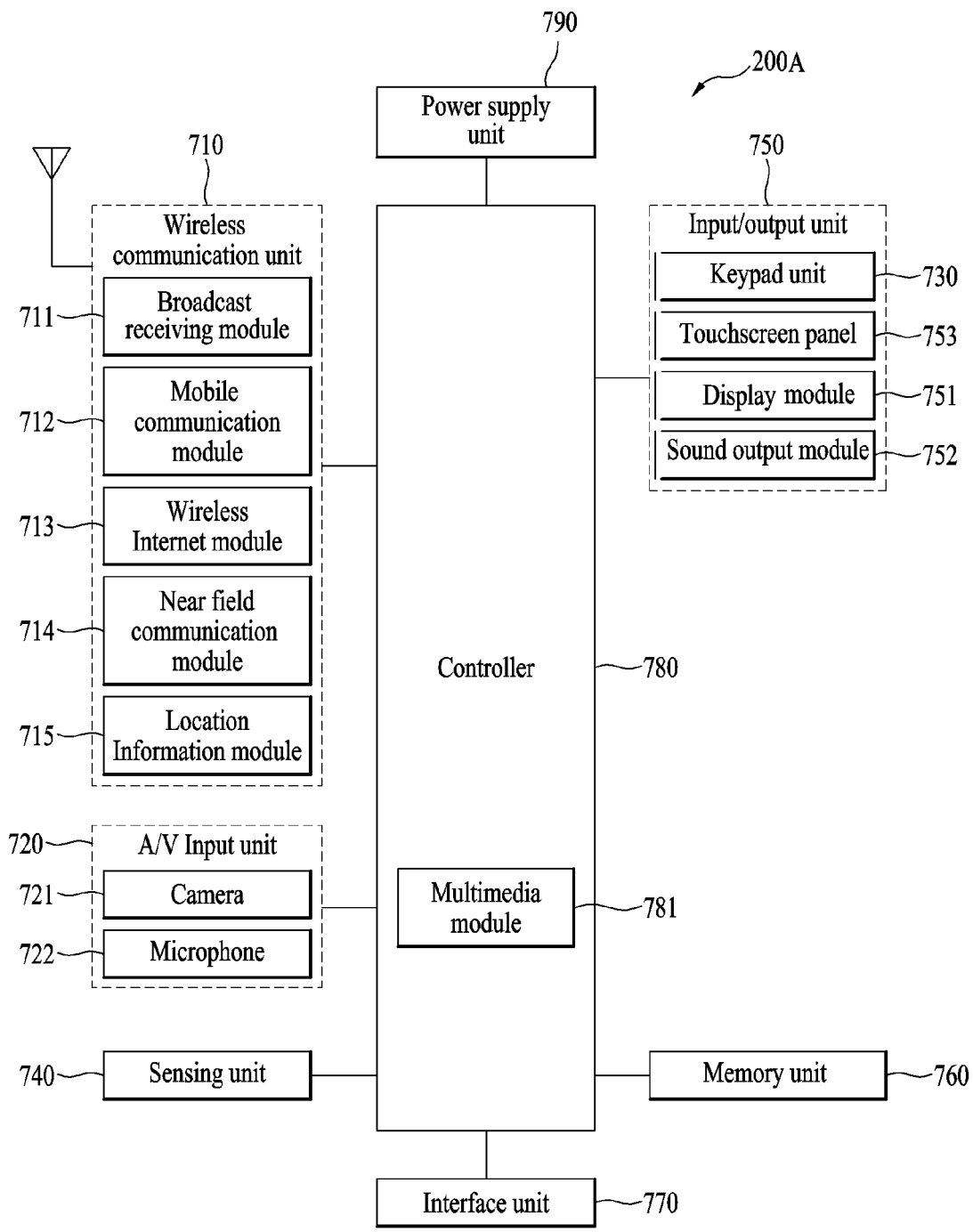
FIG. 52 shows construction of the portable terminal shown in FIG. 51.

FIG. 51 is a perspective view of a portable terminal 200A according to an embodiment, and FIG. 52 shows the construction of the portable terminal 200A shown in FIG. 51.

Referring to FIGS. 51 and 52, the portable terminal 200A (hereinafter referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 shown in FIG. 51 has a bar shape; however, the disclosure is not limited thereto. The body may have any of various structures, such as a slide type structure, a folder type structure, a swing type structure, and a swivel type structure, in which two or more sub-bodies are coupled so as to be movable relative to each other.

The body 850 may include a case (casing, housing, cover, etc.) that defines the external appearance thereof. For example, the body 850 may be divided into a front case 851 and a rear case 852. Various electronic parts of the terminal may be mounted in a space defined between the front case 851 and the rear case 852.

The wireless communication unit 710 may include one or more modules that enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a nearfield communication module 714, and a location information module 715.

The A/V (audio/video) input unit 720, which is provided to input an audio signal or a video signal, may include a camera 721 and a microphone 722.

The camera 721 may include the camera module 200 according to the embodiment shown in FIG. 50.

The sensing unit 740 may sense the current state of the terminal 200A, such as the opening and closing state of the terminal 200A, the position of the terminal 200A, whether a user contacts the terminal, the orientation of the terminal 200A, and acceleration/deceleration of the terminal 200A, in order to generate a sensing signal for controlling the operation of the terminal 200A. For example, in the case in which the terminal 200A is a slide phone, the sensing unit may sense whether the slide phone is open or closed. In addition, the sensing unit senses whether power is supplied from the power supply unit 790 and whether the interface unit 770 is coupled to an external instrument.

The input/output unit 750 is provided to generate input or output related to visual sensation, audible sensation, or tactile sensation. The input/output unit 750 may generate input data for controlling the operation of the terminal 200A, and may display information processed by the terminal 200A.

The input/output unit 750 may include a keypad unit 730, a display module 751, a sound output module 752, and a touchscreen panel 753. The keypad unit 730 may generate input data through keypad input.

The display module 751 may include a plurality of pixels, the color of which is changed according to an electrical signal. For example, the display module 751 may include at least one of a liquid crystal display, a thin film transistor-liquid crystal display, an organic light-emitting diode, a flexible display, or a three-dimensional (3D) display.

The sound output module 752 may output audio data received from the wireless communication unit 710 in a call signal reception mode, a telephone communication mode, a recording mode, a voice recognition mode, or a broadcast reception mode, or may output audio data stored in the memory unit 760.

The touchscreen panel 753 may convert a change in capacitance due to a user's touch on a specific region of the touchscreen into an electrical input signal.

The memory unit 760 may store a program for processing and control of the controller 780, and may temporarily store input/output data (for example, a telephone directory, messages, audio, still images, photographs, and video). For example, the memory unit 760 may store images, such as photographs or video, captured by the camera 721.

The interface unit 770 functions as a path for connection between the terminal 200A and an external instrument. The interface unit 770 may receive data from the external instrument, may receive electric power and transmit the received electric power to internal components of the terminal 200A, or may transfer data in the terminal 200A to the external instrument. For example, the interface unit 770 may include a wired/wireless headset port, an external charger port, a wired/wireless data port, a memory card port, a port for connection with an apparatus having an identification module, an audio input/output (I/O) port, a video input/output (I/O) port, and an earphone port.

The controller 780 may control the overall operation of the terminal 200A. For example, the controller 780 may perform related control and processing for voice communication, data communication, and video communication.

The controller 780 may have a multimedia module 781 for multimedia reproduction. The multimedia module 781 may be realized in the controller 780 or may be realized separately from the controller 780.

The controller 780 may perform pattern recognition processing that is capable of recognizing writing input or drawing input performed on the touchscreen as text or an image, respectively.

Instead of the controller 830 of the camera module 200, the controller 780 of the optical instrument 200A may transmit a clock signal SCL, a data signal SDA, and power signals VDD and GND for I2C communication with the first position sensor 120, and may receive the clock signal SCL and the data signal SDA from the first position sensor 170.

The power supply unit 790 may receive external power and internal power and supply required power to respective components under control of the controller 780.

The features, structures, and effects described in the above embodiments are included in at least one embodiment, but are not limited only to one embodiment. Furthermore, features, structures, and effects illustrated in each embodiment may be combined or modified in other embodiments by those skilled in the art to which the embodiments pertain. Therefore, it is to be understood that such combinations and modifications fall within the scope of the present disclosure.

INDUSTRIAL APPLICABILITY

Embodiments may be used in a lens moving apparatus capable of reducing magnetic field interference, reducing size, reducing current consumption, and improving sensitivity in OIS driving, and a camera module and optical instrument including the same.

The invention claimed is:

1. A lens moving apparatus comprising:
a housing comprising a first side portion, a second side portion, a third side portion, a fourth side portion, a first corner located between the first side portion and the second side portion, a second corner located between the first side portion and the fourth side portion, a third corner located between the third side portion and the fourth side portion, and a fourth corner located between the second side portion and the third side portion;
a bobbin disposed in the housing;
a first coil disposed on the bobbin;
first magnets disposed on the first to fourth corners of the housing;
a first circuit board disposed on the first side portion of the housing, the first circuit board comprising a first terminal, a second terminal, a third terminal, a fourth terminal, a fifth terminal, and a sixth terminal;
a first position sensor disposed on the first circuit board, the first position sensor being connected to the first to fourth terminals;
an upper elastic member coupled to an upper portion of the housing; and
a lower elastic member coupled to a lower portion of the housing,
wherein the upper elastic member comprises a first upper elastic unit disposed on the first corner, a second upper elastic unit disposed on the second corner, a third upper elastic unit disposed on the third corner, and a fourth upper elastic unit disposed on the fourth corner,
wherein the lower elastic member comprises first and second lower elastic units connected to the first coil,
wherein the fifth and sixth terminals of the first circuit board are positioned lower than the first to fourth terminals of the first circuit board, and
wherein the fifth terminal is coupled to the first lower elastic unit and the sixth terminal is coupled to the second lower elastic unit.

2. The lens moving apparatus according to claim 1, further comprising:
a second circuit board disposed under the first and second lower elastic units;
a first supporting member disposed at the first corner to electrically interconnect the first upper elastic unit and the second circuit board;

a second supporting member disposed at the second corner to electrically interconnect the second upper elastic unit and the second circuit board;

a third supporting member disposed at the third corner to electrically interconnect the third upper elastic unit and the second circuit board; and a fourth supporting member disposed at the fourth corner to electrically interconnect the fourth upper elastic unit and the second circuit board.

3. The lens moving apparatus according to claim 2, wherein each of the first to fourth upper elastic units comprises a first outer frame comprising:

a first coupling portion coupled to a corresponding one of the first to fourth supporting members;

a second coupling portion coupled to a corresponding one of the first to fourth corners; and a connection portion configured to interconnect the first coupling portion and the second coupling portion.

4. The lens moving apparatus according to claim 3, wherein the first outer frame comprises an extension portion extending from the second coupling portion to a corresponding one of the first to fourth terminals.

5. The lens moving apparatus according to claim 2, comprising:

a second magnet disposed on the bobbin so as to correspond to the first position sensor; and second coils disposed on the second circuit board so as to correspond to the first magnets.

6. The lens moving apparatus according to claim 1, wherein the housing comprises a first recess and a second recess, and wherein the first circuit board is disposed in the first recess and the first position sensor is disposed in the second recess.

7. The lens moving apparatus according to claim 1, wherein each of the first and second lower elastic units comprises a second outer frame coupled to the housing, wherein the fifth terminal is coupled to the second outer frame of the first lower elastic unit and the sixth terminal is coupled to the second outer frame of the second lower elastic unit.

8. The lens moving apparatus according to claim 1, wherein the first position sensor is configured to transmit signals for data communication to the first circuit board or receive the signals for data communication from the first circuit board through the first to fourth terminals.

9. The lens moving apparatus according to claim 1, wherein a transverse length of each of the first magnets decreases from a first surface to a second surface, and wherein the first surface is a surface facing an outer surface of the bobbin, and the second surface is opposite to the first surface.

10. The lens moving apparatus according to claim 1, wherein the first position sensor overlaps the first and fourth magnets in a direction parallel to a direction from the first corner to the fourth corner of the housing, and wherein the first position sensor does not overlap the first and fourth magnets in a direction perpendicular to the direction from the first corner to the fourth corner of the housing.

11. The lens moving apparatus according to claim 1, wherein the first position sensor is disposed on a first surface of the first circuit board facing the bobbin while the first to fourth terminals are disposed on a second surface of the first circuit board opposite the first surface of the first circuit board.

12. The lens moving apparatus according to claim 11, wherein the first circuit board comprises a first recess formed between the second terminal and the fourth terminal and a second recess formed between the first terminal and the third terminal, a portion of the third upper elastic unit is disposed in the first recess of the first circuit board, an end of the portion of the third upper elastic unit being coupled to the third terminal of the circuit board, and a portion of the fourth upper elastic unit is disposed in the second recess of the first circuit board, an end of the portion of the fourth upper elastic unit being coupled to the fourth terminal of the circuit board.

13. A camera module comprising:

a lens;

a lens moving apparatus according to claim 1; and an image sensor.

14. The lens moving apparatus according to claim 1, wherein one end of the first upper elastic unit extends from the first corner to the first side portion so as to be coupled to the first terminal, one end of the second upper elastic unit extends from the second corner to the first side portion so as to be coupled to the second terminal, one end of the third upper elastic unit extends from the third corner to the first side portion so as to be coupled to the third terminal, and one end of the fourth upper elastic unit extends from the fourth corner to the first side portion so as to be coupled to the fourth terminal.

15. The lens moving apparatus according to claim 1, wherein the first and second terminals are configured to provide a power signal of the first position sensor, the third terminal is configured to provide a clock signal, and the fourth terminal is configured to provide a data signal.

16. The lens moving apparatus according to claim 15, wherein the first to fourth upper elastic units are spaced apart from the bobbin.

17. The lens moving apparatus according to claim 15, wherein the first terminal of the first circuit board is one of a VDD terminal or a GND terminal, wherein the second terminal of the first circuit board is the other of the VDD terminal or the GND terminal.

18. The lens moving apparatus according to claim 15, wherein the first circuit board comprises:

a body portion at which the first to fourth terminals are disposed; and an extension portion disposed under the body portion and extending downwards from the body portion, wherein the fifth and sixth terminals are disposed on the extending portion.

19. The lens moving apparatus according to claim 18, wherein the first terminal and the second terminals are disposed adjacent to opposite ends of the body portion.

20. The lens moving apparatus according to claim 1, wherein the first position sensor is configured to generate a driving signal.

21. The lens moving apparatus according to claim 20, wherein the driving signal is provided to the first coil through the fifth and sixth terminals.

22. The lens moving apparatus according to claim 1, wherein the first position sensor comprises a Hall sensor and a driver.

23. A lens moving apparatus comprising:

a housing comprising a first corner and a second corner;

a bobbin disposed in the housing;

a first coil disposed at the bobbin;

a magnet comprising a first magnet disposed on the first corner and a second magnet disposed on the second corner;

a first circuit board disposed on a side portion of the housing between the first corner and the second corner, the first circuit board comprising a first terminal, a second terminal, a third terminal, and a fourth terminal;

a first position sensor disposed on the first circuit board;

an upper elastic unit coupled to the bobbin and the housing; and a supporting member coupled to the upper elastic member, wherein the upper elastic unit comprises a first upper elastic unit coupled to the first terminal, a second upper elastic unit coupled to the second terminal, a third upper elastic unit coupled to the third terminal, and a fourth upper elastic unit coupled to the fourth terminal, wherein the supporting member comprises:

a first supporting member disposed at the first corner of the housing and connecting the first terminal through the first upper elastic member; and a second supporting member disposed at the second corner of the housing and connecting the second terminal through the second upper elastic member, wherein the first and second terminals of the first circuit board are configured to provide a power signal of the first position sensor, wherein one of the third and fourth terminals of the first circuit board is configured to provide a clock signal, and the other of the third and fourth terminals of the first circuit board is configured to provide a data signal, wherein the first terminal among the first to fourth terminals of the first circuit board is disposed closest to the first corner, and wherein the second terminal among the first to fourth terminals of the first circuit board is disposed closest to the second corner.

* * * * *